US012589456B2

(12) United States Patent　　(10) Patent No.:　US 12,589,456 B2

Schindler et al.　　(45) Date of Patent:　Mar. 31, 2026

(54) TOOL ASSEMBLY AND A SYSTEM FOR USING IN A CARRIAGE GUIDE RAIL SYSTEM

(71) Applicant: SHL MEDICAL AG, Zug (CH)

(72) Inventors: Christoph Schindler, New Taipei City (TW); Yung-Ta Yang, Taoyuan City (TW)

(73) Assignee: SHL Medical AG, Zug (CH)

( * ) Notice: Subject to any disclaimer, the term of this patent is extended or adjusted under 35 U.S.C. 154(b) by 394 days.

(21) Appl. No.: 18/031,090

(22) PCT Filed: Oct. 25, 2021

(86) PCT No.: PCT/EP2021/079491

§ 371 (c)(1),
(2) Date: Apr. 10, 2023

(87) PCT Pub. No.: WO2022/090130

PCT Pub. Date: May 5, 2022

(65) Prior Publication Data

US 2023/0407913 A1　　Dec. 21, 2023

(30) Foreign Application Priority Data

Oct. 29, 2020　(EP) ..................................... 20204712

(51) Int. Cl.
　B23Q 1/25　　(2006.01)
　B23Q 1/26　　(2006.01)
　B65G 35/06　　(2006.01)

(52) U.S. Cl.
　CPC .............. B23Q 1/25 (2013.01); B23Q 1/262 (2013.01); B65G 35/06 (2013.01)

(58) Field of Classification Search
　CPC . B23Q 1/25; B23Q 1/26; B23Q 1/262; B23Q 1/28; B23Q 1/282; B23Q 1/285;
　(Continued)

(56) References Cited

U.S. PATENT DOCUMENTS 6,876,896 B1　　4/2005　Ortiz et al.
8,939,041 B2　　1/2015　Vodnick et al.
(Continued)

FOREIGN PATENT DOCUMENTS

CN　　　104538309 A　　4/2015
CN　　　205058061 U　　3/2016
(Continued)

OTHER PUBLICATIONS

Rho, Duk Moon. Linear Motion and Rotating Apparatus. KR 20030013868. Full Patent with Partial Machine Translation. (Year: 2003).*

(Continued)

*Primary Examiner* — Tyrone V Hall, Jr.

(74) *Attorney, Agent, or Firm* — McDonnell Boehnen Hulbert & Berghoff LLP

(57)　　　ABSTRACT

A tool assembly for attaching to two carriages of a carriage guide rail system; wherein the two carriages are movable along the carriage guide rail relative to one another, the tool assembly having a base and a linear actuator movable relative to the base; wherein the base has a first connector for attaching to one of the two carriages; wherein the linear actuator has a second connector for attaching to the other one of the two carriages; wherein the base has a first base portion attaching to the first connector; wherein the first base (Continued)

portion is arranged between at least a part of the linear actuator and the two connectors in a direction perpendicular to the carriage guide rail.

19 Claims, 23 Drawing Sheets

(58) Field of Classification Search
CPC . B23Q 1/42; B23Q 1/70; B23Q 1/706; B23Q 3/103; B25H 1/0021; B25H 1/0078; B25H 1/08; B25H 1/10; B65G 35/06; B65G 35/08
See application file for complete search history.

(56) References Cited

U.S. PATENT DOCUMENTS

| | | | |
|---|---|---|---|
| 9,472,374 | B2 | 10/2016 | Cyrankowski et al. |
| 9,555,720 | B2 | 1/2017 | Aumann et al. |
| 9,616,596 | B2 | 4/2017 | Goebel et al. |
| 10,106,339 | B2 | 10/2018 | Prüssmeier |
| 10,196,073 | B2 | 2/2019 | Pruessmeier |
| 10,512,993 | B2 | 12/2019 | Zito et al. |
| 2020/0048006 | A1 | 2/2020 | Neufeld et al. |

FOREIGN PATENT DOCUMENTS

| | | | |
|---|---|---|---|
| CN | 105773278 | A | 7/2016 |
| CN | 110425019 | A | 11/2019 |
| CN | 110814735 | A | 2/2020 |
| EP | 3084940 | B1 | 9/2017 |
| EP | 3206976 | B1 | 1/2018 |
| JP | 2020121821 | A | 8/2020 |
| KR | 20030013868 | A | 2/2003 |
| WO | 2005/110898 | A2 | 11/2005 |
| WO | 2013/110427 | A1 | 8/2013 |
| WO | 2016/083394 | A1 | 6/2016 |
| WO | 2017/202528 | A1 | 11/2017 |
| WO | 2018/192720 | A1 | 10/2018 |
| WO | 2019/049032 | A1 | 3/2019 |

OTHER PUBLICATIONS

International Search Report and Written Opinion for Int. App. No. PCT/EP2021/079491, mailed Feb. 11, 2022.

* cited by examiner

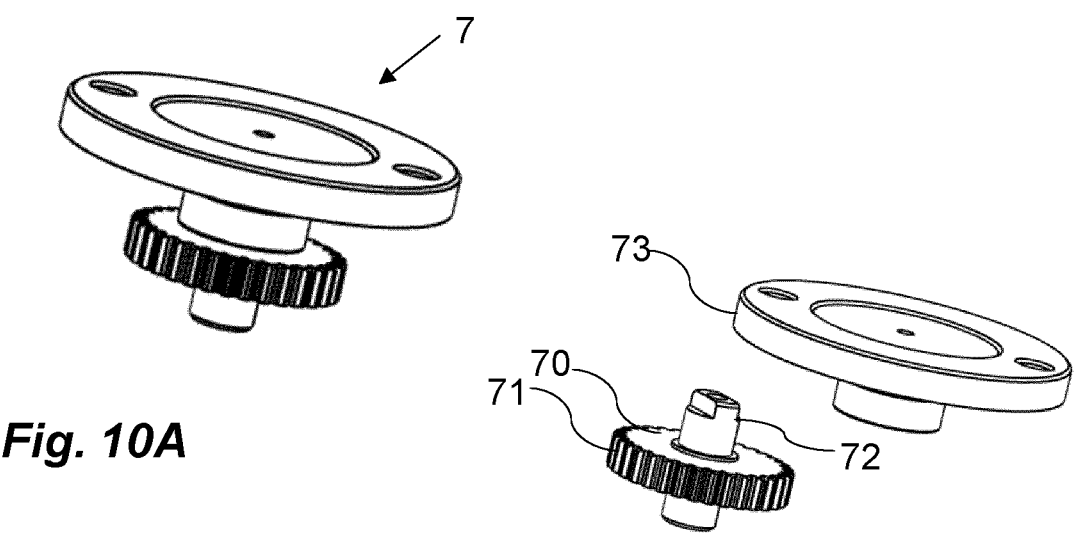
Fig. 10A
Fig. 10B
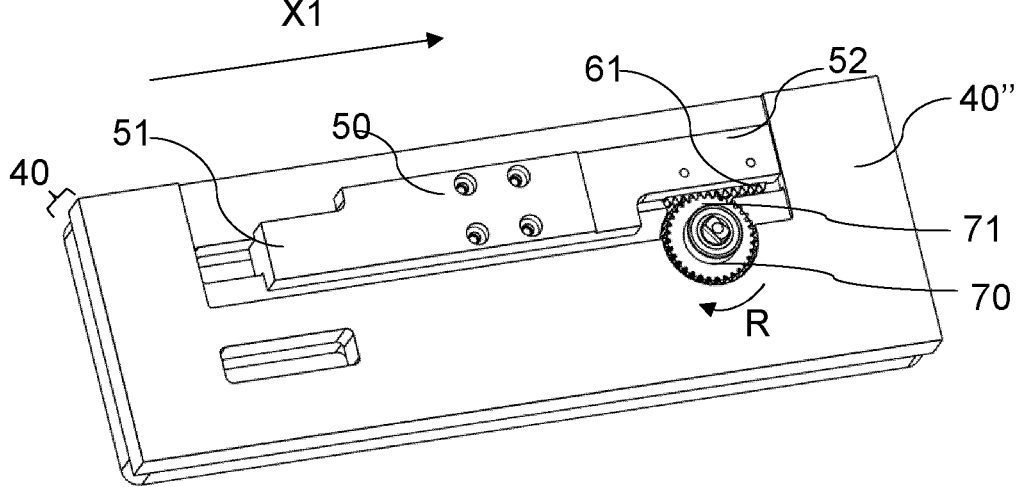
Fig. 11

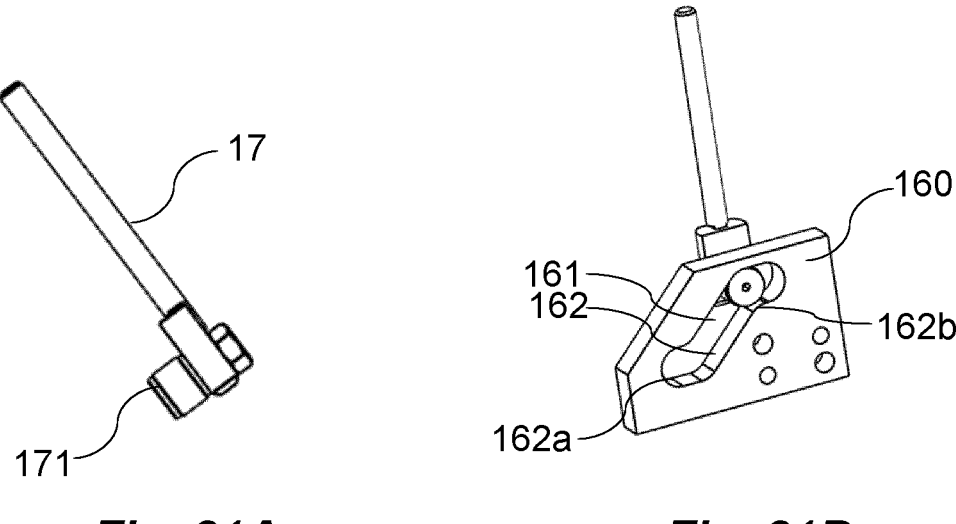
Fig. 21A              Fig. 21B
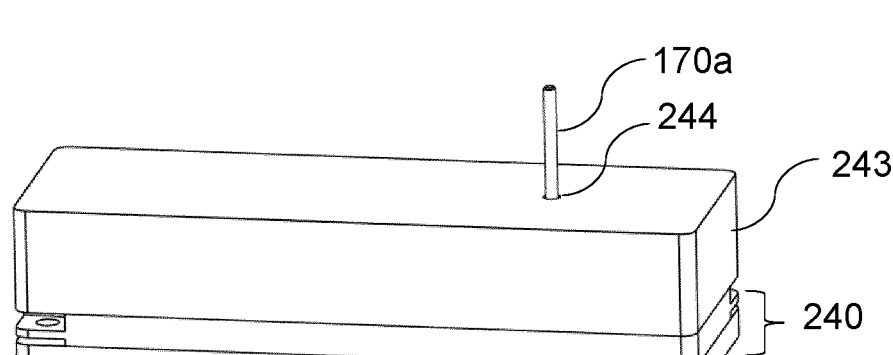
Fig. 22

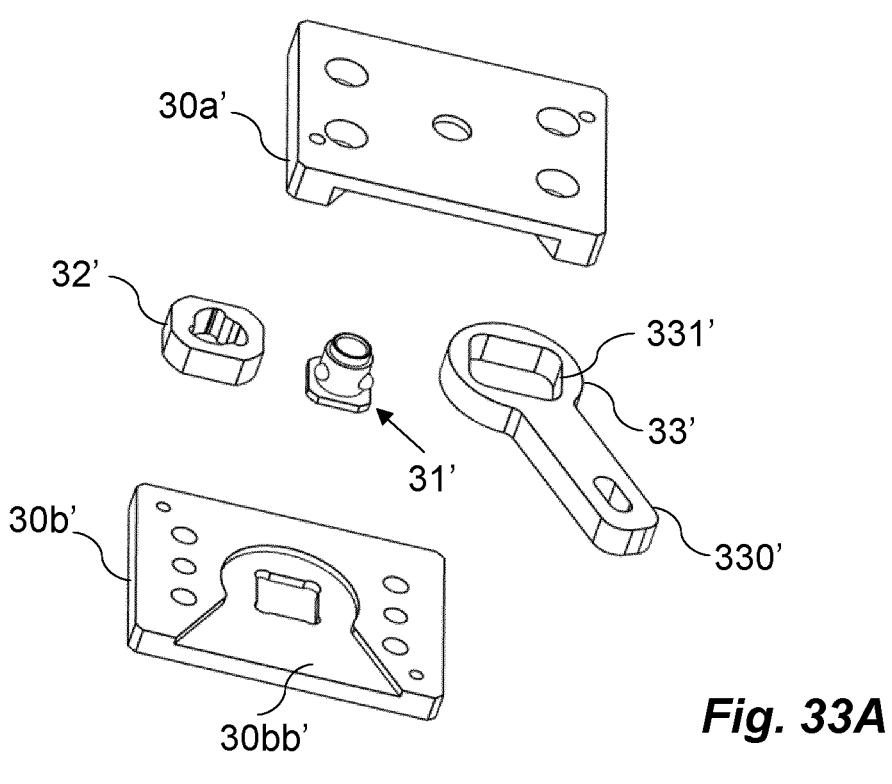
Fig. 33A
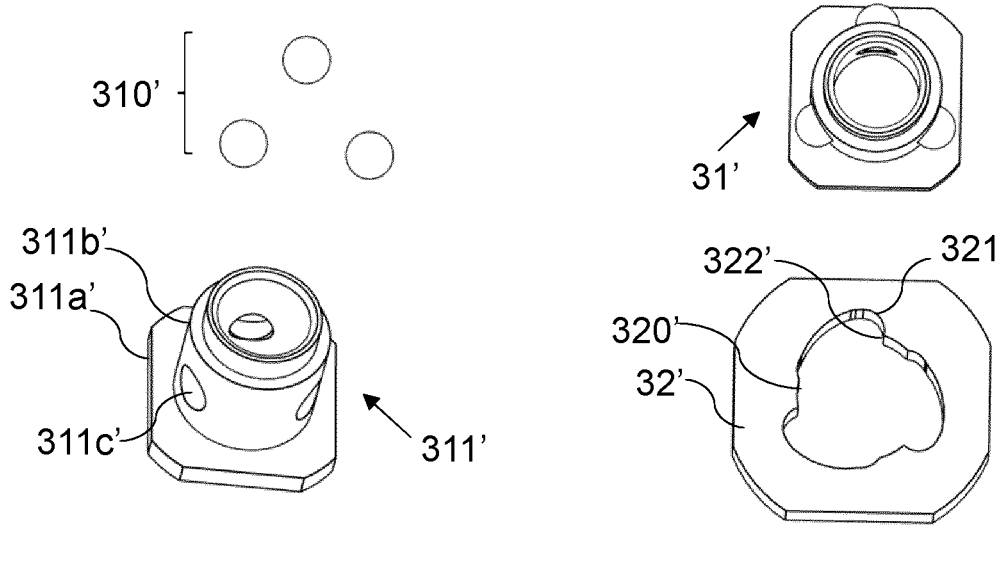
Fig. 33B            Fig. 33C

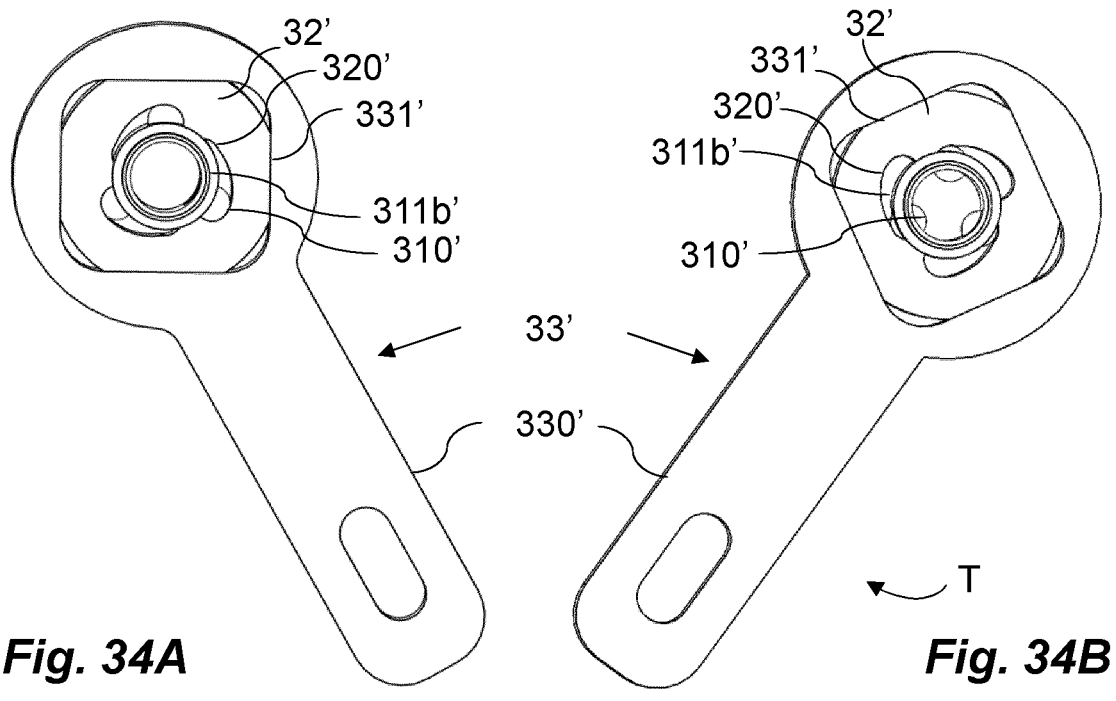
*Fig. 34A*
*Fig. 34B*
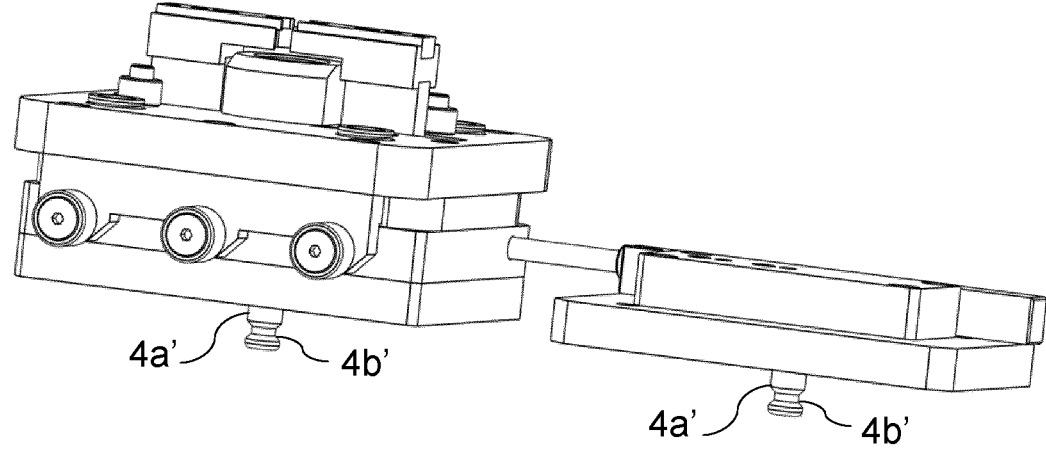
*Fig. 35*

TOOL ASSEMBLY AND A SYSTEM FOR USING IN A CARRIAGE GUIDE RAIL SYSTEM

CROSS REFERENCE TO RELATED APPLICATIONS

The present application is a U.S. National Phase Application pursuant to 35 U.S.C. § 371 of International Application No. PCT/EP2021/079491 filed Oct. 25, 2021, which claims priority to European Patent Application No. 20204712.2 filed Oct. 29, 2020. The entire disclosure contents of these applications are herewith incorporated by reference into the present application.

TECHNICAL FIELD

The present disclosure generally relates to a tool assembly and a system for using in a carriage guide rail system, and especially to a tool assembly and the system for arranging on at least two carriages of a carriage guide rail system on a carriage guide rail of the carriage guide rail system.

BACKGROUND

Carriage guide rail systems are commonly used in production lines, e.g. for manufacturing or assembling, especially a production line with automation equipment, such as manufacturing robots. Such carriage guide rail systems commonly comprise a plurality of carriages and a carriage guide rail; the plurality of carriages can be controlled and/or moved independently of one another on a transfer path. The plurality of carriages is arranged on and linearly travels along the carriage guide rail, such as known from prior art U.S. Pat. Nos. 6,876,896; 9,555,720; and 10,196,073.

In a production line, the manufacturing robots may be arranged near the carriage guide rail, the carriages linearly travel along the carriage guide rail and pass by each one of the manufacturing robots. Each one of the carriages may be used to carry components, and when each carriage passes by each of the manufacturing robots, the manufacturing robots may take a component from a carriage, or put another component on the carriage, or attach a component to a component on the carriage.

A production line is usually arranged with a plurality of carriages, so that a factory usually needs a significant number of carriages. These carriages may be constructed mainly of mechanical components, or with simple electronics, so that the cost of manufacture/assembling can be reduced. Also, for reducing the design cost and increasing the design stability of a carriage guide rail system, movement of the carriages is generally possible only in one direction along the transfer path.

When a manufacturing product comprises more and more components or needs to be assembled with more steps or with more complex actions, the demand of the number and the complexity of the manufacturing robots is also raised. However, the cost of each manufacturing robot is usually significant, so that there is a demand for introducing an arrangement that can be arranged on the carriages, and such arrangement can also provide some actions to assist the manufacture/assembling process, so that such production line can be used to produce a more complex product without having more manufacturing robots.

SUMMARY

The present disclosure is defined by the appended claims, to which reference should now be made. There is hence provided a tool assembly for attaching to two carriages of a carriage guide rail system; the two carriages are movable along the carriage guide rail relative to one another, the tool assembly comprising: a base and a linear actuator movable relative to the base; the base comprises a first connector for attaching to one of the two carriages; wherein the linear actuator comprises a second connector for attaching to the other one of the two carriages; the base comprises a first base portion attaching to the first connector; the first base portion is arranged between at least a part of the linear actuator and the two connectors in a direction perpendicular to the carriage guide rail.

Such tool assembly can therefore be used to carry different equipment or mechanical arrangement for assisting the manufacture/assembling process on the base; and since the linear actuator is movable relative to the base, when the two carriages move relative to one another, the movement of the linear actuator relative to the base can be used to initiate an action of such equipment or mechanical arrangement, so that such equipment or mechanical arrangement can output an action for assisting the manufacture/assembling process.

According to one embodiment, the first base portion is configured to carry an actuated assembly or a tool set; the at least a part of the linear actuator is configured to act on the actuated assembly or the tool set; and when one of the two carriages moves relative to the other one of the two carriages, the moves relative to the linear actuator so that a rotational and/or translational motion of at least a part of the actuated assembly or the tool set relative to the carriage guide rail is initiated by the at least a part of the linear actuator.

According to one embodiment, the linear actuator extends along a direction parallel to the carriage guide rail between a first end and a second end.

According to one embodiment, the first base portion comprises a slot extending in a direction parallel to the carriage guide rail and in a direction perpendicular to the carriage guide rail; wherein the linear actuator comprises a support attached on the first end of the linear actuator; and wherein the support of the linear actuator is movably within the slot.

According to one embodiment, the second end of the linear actuator is configured to act on the actuated assembly or the tool set when the one of the two carriages moves relative to the other one of the two carriages.

According to one embodiment, the at least a part of the linear actuator is adjacent to the first base portion.

According to one embodiment, the linear actuator is spaced apart from the base.

According to one embodiment, the tool assembly can be used in a system with an actuated assembly.

According to one embodiment, the actuated assembly comprises an extending element; the extending element extends along the direction parallel to the carriage guide rail between a first end and a second end.

According to one embodiment, the extending element is connected to the driver in the direction of the transfer path defined by the carriage guide rail.

According to one embodiment, the extending element comprises a driver arranged between the first end and the second end; and the actuated assembly comprises a driven member engaged with the driver.

According to one embodiment, the extending element is configured to be releasably attached to the linear actuator.

According to one embodiment, the extending element is configured to be pushed or pulled by an actuator body of the linear actuator when the linear actuator is attached to the extending element and the linear actuator moves relative to the base.

According to one embodiment, at least one of the first end or the second end of the extending element comprises a first transverse protrusion and a second transverse protrusion.

According to one embodiment, the first transverse protrusion comprises a wheel rotatable around a central axis of the first transverse protrusion; and the second transverse protrusion comprises a wheel rotatable around a central axis of the first transverse protrusion.

According to one embodiment, the actuator body comprises a first counter transverse protrusion; the first counter transverse protrusion is configured to be situated between the first transverse protrusion and the second transverse protrusion in the direction of a transfer path defined by the carriage guide rail.

According to one embodiment, the base comprises the guide arm; and the actuator body comprises a guide protrusion that is configured to move along the guide arm when the linear actuator moves towards the base.

According to one embodiment, where the first counter transverse protrusion comprises at least one of a first inclined surface angled to relative to a plane parallel to the transfer path defined by the carriage guide rail and the direction perpendicular to the plane parallel to the transfer path defined by the carriage guide rail and facing towards the base; and a second inclined surface angled relative to the transfer path defined by the carriage guide rail and the a direction perpendicular to the plane parallel to the transfer path defined by the carriage guide rail and facing towards the linear actuator.

According to one embodiment, the linear actuator comprises a driver attached to the second end of the linear actuator; and the actuated assembly comprises a driven member engaged with the driver.

According to one embodiment, the actuated assembly comprises a rotator attached to the first base portion; the rotator comprises a circular body; and the driven member is arranged on an outer surface portion of the circular body; the outer surface portion is spaced apart from a rotation axis that the rotator is configured to rotate around.

According to one embodiment, the driven member is a cam, and the cam radially extends from the outer surface portion of the circular body.

According to one embodiment, the driven member is a protrusion protruding from the outer surface portion of the circular body.

According to one embodiment, the driven member comprises a cogwheel; and the driver comprises a set of ratchet teeth meshed with the cogwheel.

According to one embodiment, the actuated assembly comprises a linear actuator follower; the rotator comprises a transmission member; the linear actuator follower comprises a counter transmission member; and the transmission member is engaged with the counter transmission member.

According to one embodiment, the transmission member is a plurality of ratchet teeth; the cogwheel is the transmission member; the plurality of ratchet teeth is meshed with the cogwheel.

According to one embodiment, the rotator is arranged between the set of ratchet teeth of the driver and the plurality of ratchet teeth of the linear actuator follower.

According to one embodiment, the linear actuator follower extends along the direction parallel to the carriage guide rail between a first end and a second end; wherein the linear actuator follower is movably attached to the first base portion in the direction parallel to the carriage guide rail; and wherein the plurality of ratchet teeth is attached to the second end of the linear actuator follower.

According to one embodiment, the actuated assembly or the tool set comprises: a first gripper with a first gripper surface; a second gripper with a second gripper surface faced towards the first gripper surface; the second gripper is configured to protrude from the base in a direction perpendicular to the carriage guide rail; and the first gripper surface is movable relative to the second gripper surface along the direction parallel to the carriage guide rail.

According to one embodiment, the first gripper is fixedly attached to the linear actuator.

According to one embodiment, the first gripper is fixedly attached to the base.

According to one embodiment, the second gripper is fixedly attached to the base.

According to one embodiment, the second gripper is attached to the linear actuator follower.

According to one embodiment, the actuated assembly comprises an elevating member extending along a direction perpendicular to the carriage guide rail between a first end and a second end.

According to one embodiment, the elevating member is the driven member.

According to one embodiment, the second end of the elevating member is closer to the second end of the linear actuator than the first end of the elevating member;

According to one embodiment, the driven member is on the second end of the elevating member.

According to one embodiment, at least one of the driver and the driven member comprises an inclined surface extending in the direction parallel to the carriage guide rail and the direction perpendicular to the carriage guide rail between a first end and a second end; and the second end is offset relative to the first end both in the direction parallel to the carriage guide rail and the direction perpendicular to the carriage guide rail.

According to one embodiment, at least one of the driver and the driven member comprises a cam surface.

According to one embodiment, the at least one of the driver and the driven member comprises a guide track; the inclined surface forms a part of the guide track; and the driven member is attached to the second end of the elevating member, and the driven member is positioned in the guide track.

According to one embodiment, the base comprises a second base portion; the second base portion is attached to the first base portion; and the linear actuator is arranged between the first base portion and the second base portion.

According to one embodiment, the second base portion comprises a base opening and at least a part of the actuated assembly is arranged between the first base portion and the second base portion.

According to one embodiment, the circular body of the rotator comprises a central shaft, the central shaft comprises a protruding end protruding through the opening of the second base portion; wherein a spinner is attached to the protruding end of the circular body.

According to one embodiment, the elevating member is arranged between the first base portion and the second base portion; the first end of the elevating member protrudes through the opening of the second base portion; and whereby the elevating member is immovable in a direction parallel to the carriage guide rail relative to the base.

According to one embodiment, the second base portion comprises a block; and the first end is adjunct to the block, whereby the elevating member is immovable in a direction parallel to the carriage guide rail relative to the base.

According to one embodiment, the first connector comprises a central passage, a first portion, a second portion, a locking base and a locking controller; wherein the locking controller is pivotable relative to the central passage between a locked position and a unlocked position; wherein the locking base comprises a locking unit; wherein the locking controller comprises a locking frame enclosing the locking unit.

According to one embodiment, the second connector comprises a central passage, a first portion, a second portion, a locking base and a locking controller; wherein the locking controller is pivotable relative to the central passage between a locked position and an unlocked position; wherein the locking base comprises a locking unit; wherein the locking controller comprises a locking frame enclosing the locking unit.

According to one embodiment, the least one of the base and the linear actuator comprises a connecting part; wherein the connecting part comprises a neck portion; and wherein the neck portion is adjacent a locking opening on the locking base.

According to one embodiment, the when the locking controller in the unlocked position, the locking unit is spaced apart from the neck portion of the connecting part; and wherein when the locking controller in the locked position, the locking unit is engaged with the neck portion.

According to another aspect of the invention, the tool assembly can be used with a carriage guide rail system.

According to another aspect of the present disclosure, the system can be used with a carriage guide rail system.

According to one embodiment, the carriage guide rail system comprises a carriage guide rail extending along an X-axis; a first carriage and a second carriage; the first carriage is movable relative to the second carriage along the X-axis on the carriage guide rail; and the first connector is attached to the first carriage, and the second connector is attached to the second carriage.

According another aspect of the present disclosure, the tool assembly can be operated by a method comprising the steps of: attaching the first connector to one of the two carriages of the carriage guide rail system; attaching the second connector to the other one of the two carriages of the carriage guide rail system; moving the two carriages along the carriage guide rail relative to one another; and carrying out one or more rotational and/or translational motion of the actuated assembly or the tool set relative to the carriage guide rail, in response to the movement between the two carriages along the carriage guide rail, by a contact between the at least a part of the linear actuator and the actuated assembly or the tool set.

According to another aspect of the present disclosure providing a tool assembly for attaching to two carriages of a carriage guide rail system; the two carriages are movable along the carriage guide rail relative to one another, the tool assembly comprises: a linear actuator for being attached to one of the two carriages; and a base for being attached to the other one of the two carriages; the base is arranged between at least a part of the linear actuator and the carriage guide rail in a direction perpendicular to the carriage guide rail; wherein the base is configured to carry an actuated assembly or a tool set; and the at least a part of the linear actuator is configured to act on the actuated assembly or the tool set; wherein when the first carriage moves relative to the second carriage, the linear actuator moves relative to the base and initiates a rotational and/or translational motion relative to the carriage guide rail of at least a part of the actuated assembly or the tool set.

According to another aspect of the present disclosure providing a tool assembly for attaching to two carriages of a carriage guide rail system; the two carriages are movable along the carriage guide rail relative to one another, the tool assembly comprises: a base and a linear actuator adjacent to the base; the base comprises a first connector for attaching to one of the two carriages; the linear actuator comprises a second connector for attaching to the other one of the two carriages; and the base is arranged between at least a part of the linear actuator and the carriage guide rail.

According to another aspect of the present disclosure providing a tool assembly for attaching to two carriages of a carriage guide rail system with a carriage guide rail, the carriage guide rail extends along an X-axis, the two carriages are movable along the X-axis on the carriage guide rail relative to the carriage guide rail and relative to one another, the tool assembly extending along the X-axis, a Y-axis and a Z-axis; the Y-axis is perpendicular to the X-axis; and the Z-axis is perpendicular to an XY-plane defined by the X-axis and the Y-axis, the tool assembly comprising a base, a first connector, a second connector and a linear actuator, the base is fixedly attached to the first connector, the base is movable in the X-axis direction relative to the second connector, the base comprises a first base portion extending in the Z-axis direction between a first surface and a second surface; the linear actuator extends in the X-axis direction from a first end to a second end, and the linear actuator is fixedly attached to the second connector by a support extending in the Z-axis direction between the second connector and the first end of the linear actuator; and the linear actuator is movable relative to the first connector in the X-axis direction; the first connector is configured to be attached only to one of the two carriages of the carriage guide rail system, and the second connector is configured to be attached only to the other one of the two carriages of the carriage guide rail system; the first connector is adjacent to the first surface of the first base portion; and the second end of the linear actuator is adjacent to the second surface of the first base portion.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

Embodiments of the inventive concept will now be described, by way of example only, with reference to the accompanying drawings, in which:

FIG. 5 also schematically shows a perspective view of the first connector of FIG. 3 attached to the first carriage of FIG. 2.

FIGS. 10A-10B schematically show perspective views of one embodiment of an actuated assembly of the tool assembly of FIG. 4.

FIG. 11 schematically shows a perspective view of an exemplified actuated assembly of FIGS. 10A-10B and the actuated assembly of FIGS. 10A-10B being actuated by the linear actuator with the driver of FIG. 9.

FIGS. 21A-21B schematically show perspective views of one example of a elevating member and its interaction with the driver of FIG. 19.

FIG. 22 schematically shows a perspective view of the first base portion of FIG. 20, the elevating member of FIG. 20 and an exemplified second base portion. The first base portion and the second base portion in this example formed a base.

FIGS. 33A, 33B and 33C schematically show perspective views of the first connector of FIG. 32.

FIGS. 34A-34B schematically show top views of a part of the first connector of FIG. 32.

FIG. 35 schematically shows a perspective view of the tool assembly of FIGS. 25-26 without the first connector and the second connector.

FIGS. 38-39 schematically show perspective views of the linear actuator of FIG. 37.

DETAILED DESCRIPTION

Figure 1A:
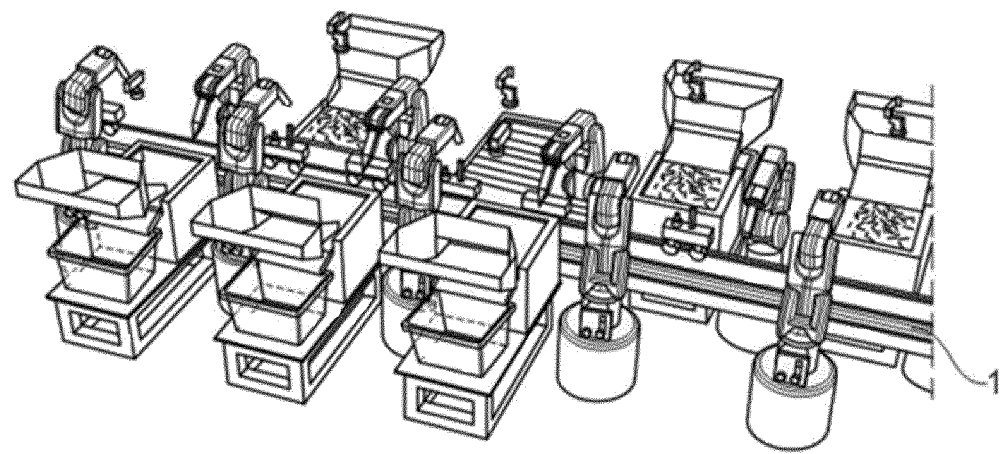
FIGS. 1A-1B schematically show perspective views of a carriage guide rail system with at least two carriages and a carriage guide rail in a production line.
Figure 1B:
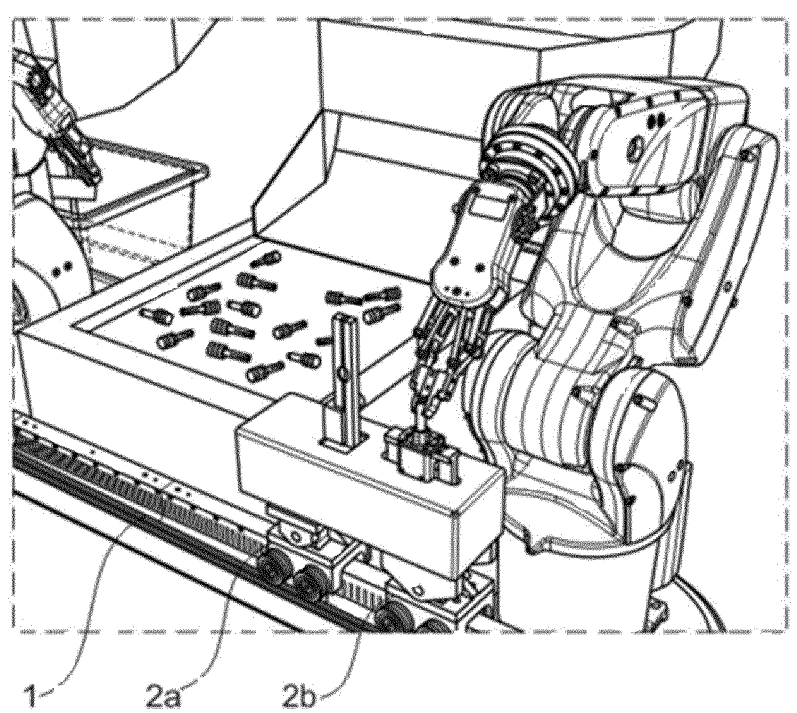
Figure 2:
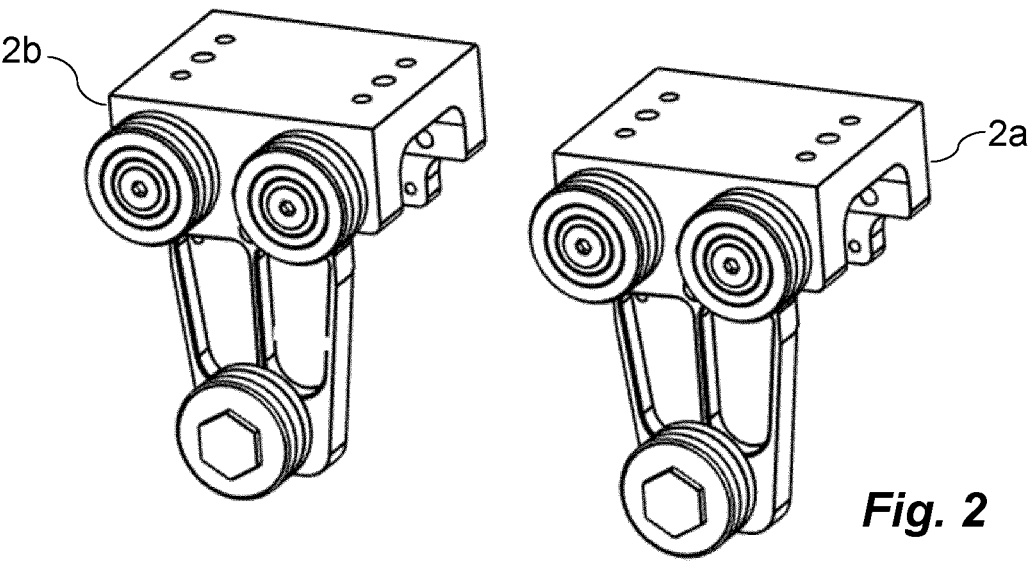
FIG. 2 schematically shows a perspective view of a first carriage and a second carriage used in the carriage guide rail system of FIGS. 1A-1B.

Embodiments of the present disclosure provide a tool assembly for attachment to two carriages 2a, 2b (as shown in FIG. 2) of a carriage guide rail system with a carriage guide rail 1, as shown in FIG. 1A-1B. Such carriage guide rail system is commonly used in a production line together with automation equipment and/or manufacturing robots.

The carriage guide rail 1 is configured to define a single axis transfer path for carriages arranged on the carriage guide rail 1.

The tool assembly comprises a base and a linear actuator adjacent to the base. The base comprises a first connector 3a; 3a' for attaching to one of the two carriages; and the linear actuator comprises a second connector 3b; 3b' for attaching to the other one of the two carriages. The base 4; 4'; 14; 24; 34 comprises a first base portion 40; 401'; 140; 240; 340 attached to the first connector 3a; 3a'; and the first base portion is arranged between at least a part of the linear actuator 5; 5' and the two connectors 3a; 3a', 3b; 3b' in a direction perpendicular to the carriage guide rail (namely, the transfer path for the carriage). Namely, the at least a part of the linear actuator 5; 5', the first base portion 40; 401'; 140; 240; 340 and the two connectors 3a; 3a', 3b; 3b' are axially offset relative to each other in the direction perpendicular to the carriage guide rail; and the first base portion 40; 401'; 140; 240; 340 is closer to the two connectors 3a; 3a', 3b; 3b' than the at least a part of the linear actuator 5; 5' in the direction perpendicular to the carriage guide rail. Possible arrangements are shown by the following two examples.

In first example, the at least a part of the linear actuator 5 is adjacent to the first base portion 40; 140; 240; 340, as shown in FIG. 1-24, so that the first base portion 40; 140; 240; 340 is directly arranged between at least a part of the linear actuator 5 and the two connectors 3a; 3a', 3b; 3b' in a direction perpendicular to the carriage guide rail.

Figure 25:
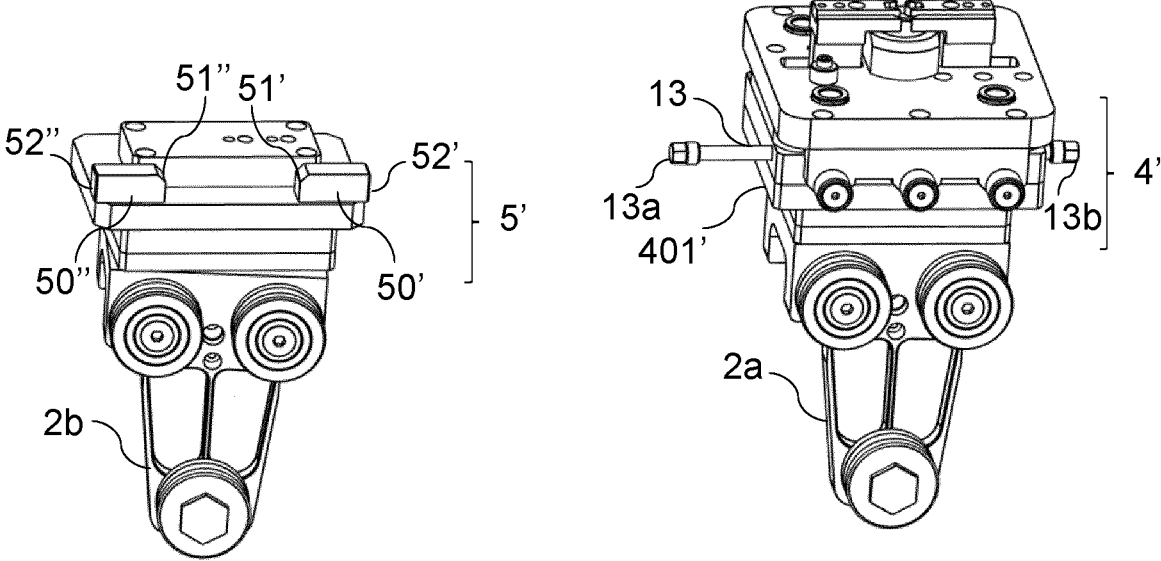
FIGS. 25-26 schematically show a perspective view of another example of the base attached to the first carriage of FIG. 2 and the linear actuator attached to the second carriage of FIG. 2.
Figure 26:
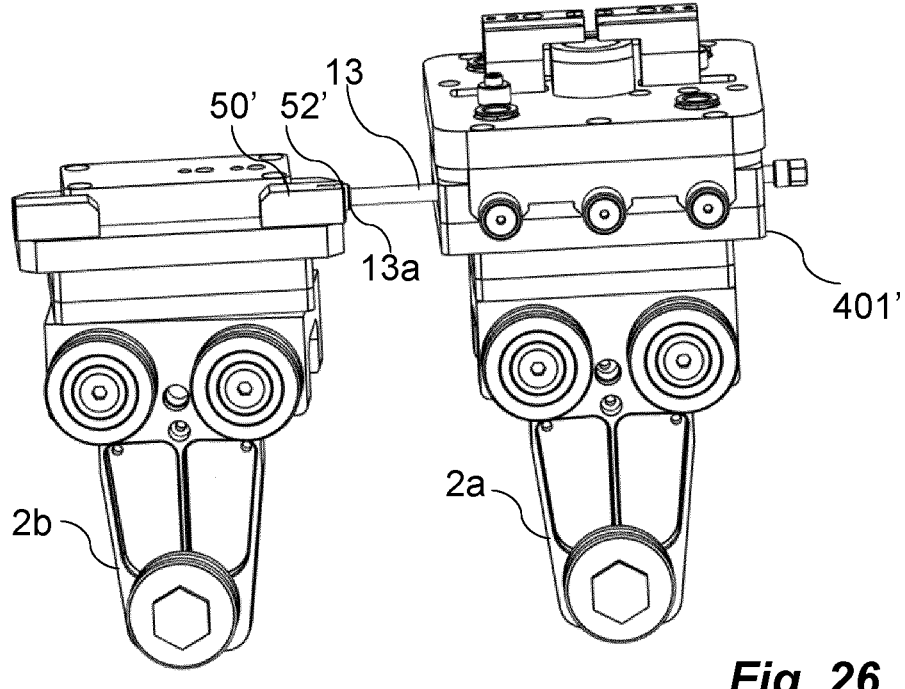

In the second example, the at least a part of the linear actuator 5' is not adjacent to the first base portion 401'. Instead, the linear actuator 5' is spaced apart from the first base portion, as shown in FIG. 25-26. However, the at least a part of the linear actuator 5', the first base portion 401' and the two connectors 3a', 3b' in this example are also axially offset relative to each other in the direction perpendicular to the carriage guide rail; and the first base portion 401' is closer to the two connectors 3a', 3b' than the at least a part of the linear actuator 5' in the direction perpendicular to the carriage guide rail. Thus, the first base portion 401' is arranged between the at least a part of the linear actuator 5' and the two connectors 3a', 3b' in the direction perpendicular to the carriage guide rail as in the previous example. Similarly to the previous example, since the linear actuator 5' is arranged further away from the connectors than the first base portion 401', the movement of the linear actuator 5' along the carrier guide rail relative to the base 4' can therefore make the at least a part of the linear actuator 5' contact a tool set or an actuated assembly situated on the first base portion 401'. Regardless of this, the linear actuator is lined up with the first base portion 401' in the direction perpendicular to the carriage guide rail.

Figure 3:
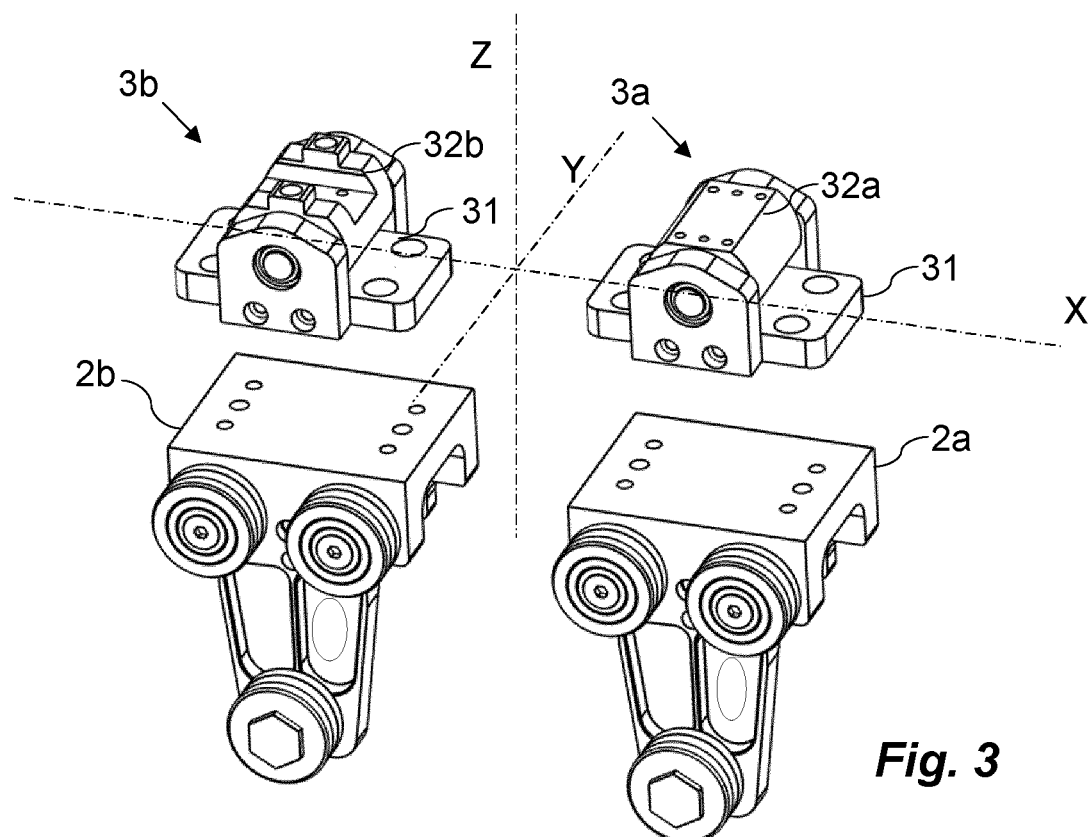
FIG. 3 schematically shows a perspective view of a first connector configured to be attached to the first carriage of FIG. 2; and a second connector configured to be attached to the second carriage of FIG. 2.

To clearly explain the present disclosure in detail, the tool assembly is defined to extend along an X-axis, a Y-axis and a Z-axis. As shown in FIG. 3, the X-axis is defined as an axis that is extending along the transfer path defined by the carriage guide rail 1 (as shown in FIG. 1A); the Y-axis is defined as an axis that is perpendicular to the X-axis and transverse to the transfer path defined by the carriage guide rail 1. The X-axis and the Y-axis form an XY-plane. The XY-plane is parallel to the carriage guide rail 1. The Z-axis is defined as an axis that is perpendicular to the XY-plane, so that the Z-axis will also perpendicular to the transfer path defined by the carriage guide rail 1. The carriages 2a, 2b are designed to move in only one dimension on the carriage guide rail 1. In all examples disclosed in this description, the carriages 2a, 2b are only movable in the X-axis direction on the carriage guide rail 1. The tool assembly is configured to be attached to two such carriages 2a, 2b that are independently movable relative to one another in the X-axis direction on the carriage guide rail 1.

It should be noted that there are many different designs of a carriage guide rail system with at least two carriages that are only movable in a single axis transfer path, as disclosed by those cited arts mentioned above, and since how to control carriages move on the carriage guide rail system, or the design of the carriage guide rail, or the design of carriages arranged on the carriage guide rail do not form part of the present disclosure, and since many different variations of such functionality can be realised, this feature will not be discussed in any further detail herein.

To explain the present disclosure in detail, the following description will use two independently movable (only in one dimension) carriages on the carriage guide rail 1 as example to explain an arrangement of the tool assembly and the interaction between the tool assembly and two carriages. The two independently movable carriages 2a, 2b can be defined as a first carriage 2a and a second carriage 2b. Also, for simplicity, the following examples of the tool assembly, as shown in all figures and described in all examples will be based on an assumption that a carriage guide rail is arranged on the ground of a factory; and all carriages are arranged on the carriage guide rails; the carriage guide rail extends in a straight line parallel to the ground of the factory, although the carriage guide rail could also be curved.

It should be noted that, the tool assembly in all embodiments can be also attached to other types of arrangements of carriage guide rail systems, such as a carriage guide rail system is built as a hanging system, where the carriage guide rail is attached to a ceiling of a factory, and the carriages are linearly movably attached to the carriage guide rail, e.g. by a magnet or suspension rail system.

As mentioned above, the first connector 3a; 3a is for being attached to one of the two carriages of the carriage guide rail system, in the following examples, the first connector 3a; 3a' is configured to be attached to the first carriage 2a, and is not attached to the second carriage 2b; the second connector 3b; 3b' is for being attached to the other one of the two carriages of the carriage guide rail system, in the following examples, the second connector 3b; 3b' is configured to be attached to the second carriage 2b, and is not attached to the second carriage 2b. In one example, as shown in FIG. 3, the first and the second connector 3a, 3b each comprise a first part 31; the first part 31 of the first and the second connector 3a, 3b are identical. The first part 31 of the first connector 3a is configured to be fixed on the first carriage 2a, for example by one or multiple screw locks, rivet locks or magnet, and not fixed to the second carriage 2b; and the first part 31 of the second connector 3b is configured to be fixed on the second carriage 2b, for example by one or multiple screw locks, rivet locks or magnet, and not fixed to the first carriage 2a. In a preferred embodiment, such fixing between the first part 31 of the first and the second connector 3a, 3b and the first and the second carriages 2a, 2b is releasable, so that the first and the second carriages 2a, 2b can be selectively attached to different tool assemblies or sometimes be used without any tool assembly, depending on a manufacturing/assembling demand.

The first connector 3a comprises a second part 32a, and the second connector 3b comprises a second part 32b. The second part 32a of the first connector 3a and the second part 32b of the second connector 3b are configured to be fixed to two different parts of the tool assembly and will be explained in detail later.

The first part 31 and the second part 32*a* of the first connector 3*a* can be a single integral part or can be formed as two independent pieces directly or indirectly fixed together, e.g. by screw, rivet, pin or snap-fit element. The first part 31 and the second part 32*b* of the second connector 3*b* can be a single integral part or can be formed as two independent pieces directly or indirectly fixed together, e.g. by screw, rivet, pin or snap-fit element.

Figure 4:
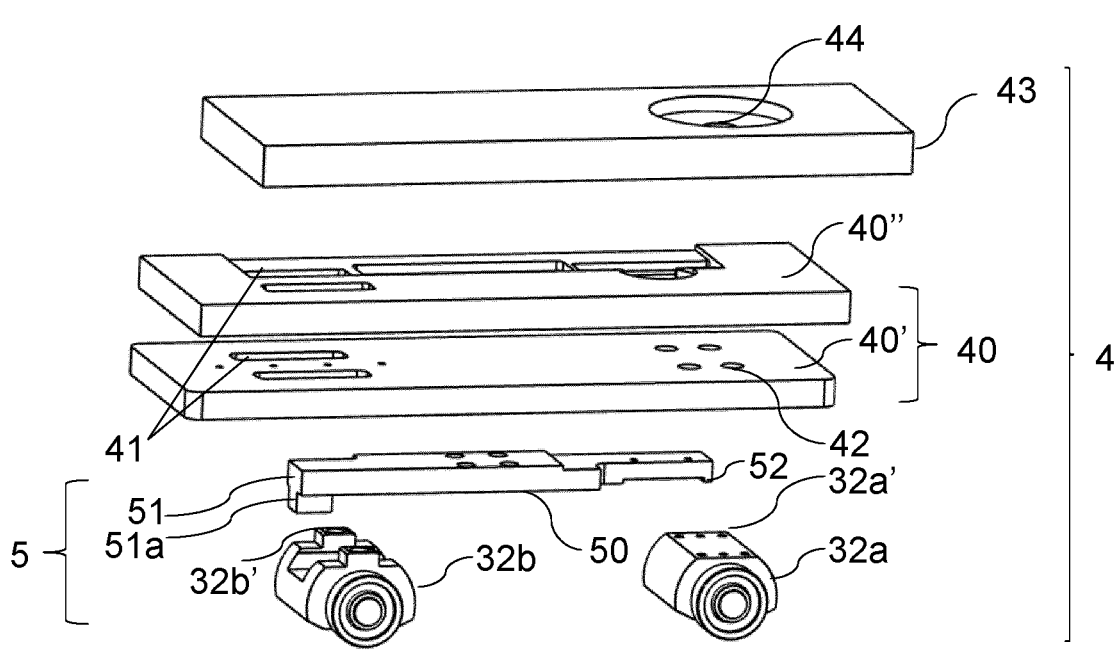
FIG. 4 schematically shows a perspective view of a tool assembly in one embodiment for being used in a carriage guide rail system such as that shown in FIG. 1.
Figure 5:
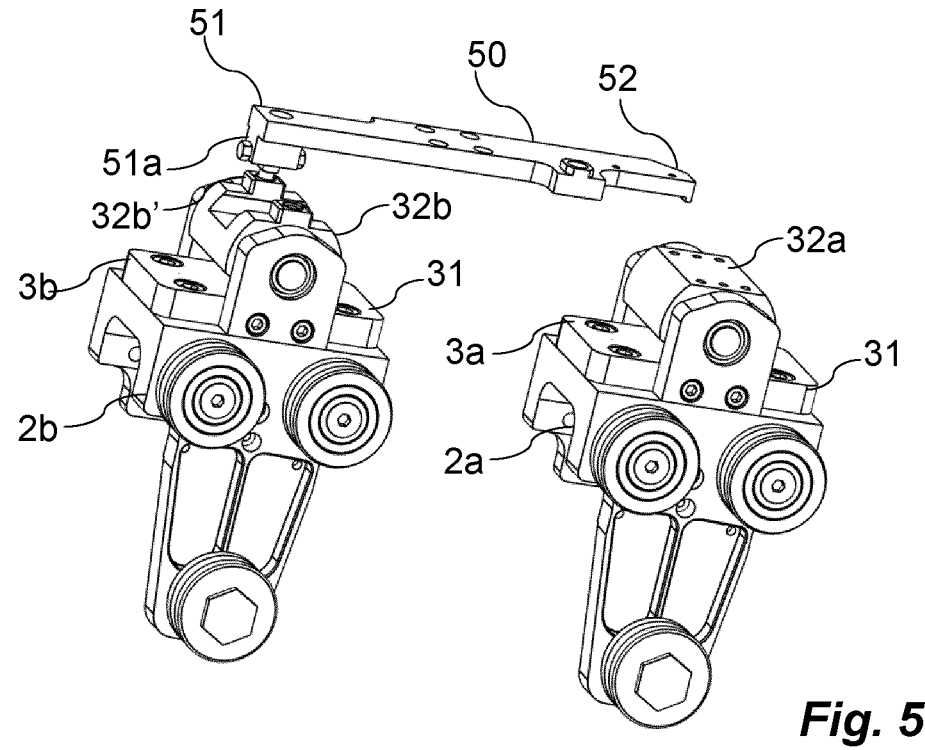
FIG. 5 schematically shows a perspective view of a linear actuator from the tool assembly of FIG. 4 being attached to the second carriage of FIG. 2 by the second connector of FIG. 3.

The tool assembly comprises the base and a linear actuator, with a first example shown in FIGS. 4-5. FIG. 4 illustrates the base 4 in one embodiment; and since the first parts 31 of the first and the second connectors 3*a*, 3*b* are identical to each other, FIG. 4 only illustrates the second part 32*a* of the first connector 3*a*, and the second part 32*b* of the second connector 3*b*.

On the other hand, in another example, the first connector 3*a*' and the second connector 3*b*' can be fixed to the linear actuator and/or the base via a pivot locking mechanism, as shown in FIG. 31-35. In this example, the first connector 3*a*' and the second connector 3*b*' may comprise the first parts 31, as mentioned above, to connect with the two carriages; but the corresponding second parts can be identical in this example. Alternatively, the first connector 3*a*' and the second connector 3*b*' can be identical to each other, and attaching the two carriages through any suitable connection, such as a screw, rivet or magnet. In this example, the cost and the complexity of manufacturing and assembling the tool assembly can be reduced. The first connector 3*a*' and the second connector 3*b*' in this example are identical to each other, so the following explanation about the first connector 3*a*' and/or the second connector 3*b*' should be applied to both the first connector 3*a*' and the second connector 3*b*'.

Figures 31, 32:
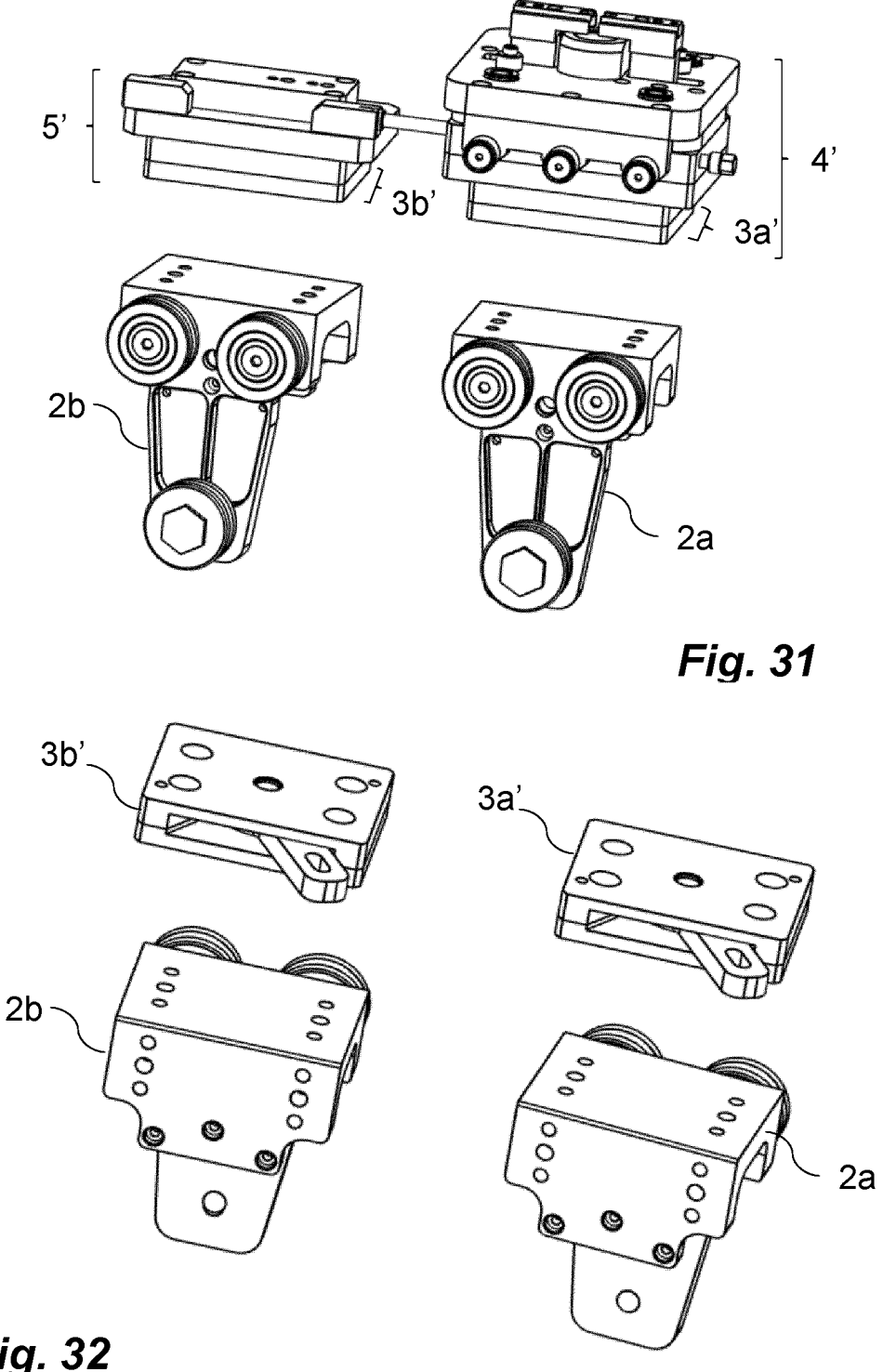
FIG. 31 schematically shows a perspective view of the base of FIGS. 25-26 attached to the first carriage of FIG. 2 and the linear actuator of FIGS. 25-26 attached to the second carriage of FIG. 2.
FIG. 32 schematically shows a perspective view of the first connector and the second connector in another example.

The first connector 3*a*' as shown in FIG. 32 comprises a central passage configured to receive a connecting part on either the base 4; 4' or the linear actuator 5'; 5'.

As shown in FIG. 33A, the first connector 3*a*' (and also the second connector 3*b*' in this example) comprises a first portion 30*a*', a second portion 30*b*', a locking base 31', optionally a locking element 32' and a locking controller 33'.

The first portion 30*a*' is attached to the second portion 30*b*'. The first portion 30*a*' and the second portion 30*b*' at least partially overlap each other in the Z-axis direction. The first portion 30*a*' and the second portion 30*b*' can generally be any suitable shape, such as a rectangular, square, hexagon, octagon, oval, circular, triangle or trapezoid, when viewed from the XY-plane. Similarly, viewing from either a plane defined by the X-axis and Z-axis or a plane defined by the Y-axis and the Z-axis, the first portion 30*a*' and the second portion 30*b*' can generally be any suitable shape, such as a rectangular, square, hexagon, octagon, oval or trapezoid.

In a preferred example, a length of the first portion 30*a*' measured along the X-axis or Y-axis is greater than a length of the first portion 30*a*' and the second portion 30*b*' measured along the Z-axis. Similarly, a length of the second portion 30*b*' measured along the X-axis or Y-axis is greater than a length of the first portion 30*a*' and the second portion 30*b*', when the first portion 30*a*' is attached to the second portion 30*b*', measured along the Z-axis. Further, a length of the first portion 30*a*' and the second portion 30*b*' measured along the X-axis or Y-axis is greater than a length of the first portion 30*a*' and the second portion 30*b*' measured along the Z-axis.

The second portion 30*b*' is configured to engage with either the first carriages 2*a* or the second carriages 2*b*; The first portion 30*a*' is configured to engage with either the base or the linear actuator.

The second portion 30*b*' is configured to be fixed to either the first carriage 2*a* or the second carriage 2*b*. The second portion 30*b*' can be fixed to either the first carriage 2*a* or the second carriage 2*b* by any suitable fixing mechanism, such as screw, rivet, glue or magnet.

The first portion 30*a*' is configured to support either the base or the linear actuator. It is not necessary that the first portion 30*a*' is positively fixed to either the base or the linear actuator. For example, if the carriage guide rail system is built on the ground of a factory, either the base or the linear actuator will be placed on the first portion 30*a*', in this example, the first portion 30*a*' doesn't need to be positively fixed to either the base or the linear actuator.

In a preferred example, the first portion 30*a*' comprises a central opening, and the second portion 30*b*' comprises a central recess. The central opening is aligned with the central recess in the Z-axis direction when the first portion 30*a*' is attached to the second portion 30*b*'. In another preferred example, the first portion 30*a*' comprises a first recess, the central opening is arranged within the first recess. The second portion 30*b*' comprises a second recess, the central recess is arranged within the second recess. The first recess and the second recess face each other in the Z-axis direction when the first portion 30*a*' is attached to the second portion 30*b*'.

In a preferred example, the locking base 31', the locking element 32' and the locking controller 33' are configured to be received within the first recess of the first portion 30*a*' and the second recess of the second portion 30*b*' when the first connector 3*a*' itself has been assembled.

In a preferred example, the second recess of the second portion 30*b*' comprises a first part and a second part. The first part of the second recess of the second portion 30*b*' comprises a first length measuring along the Z-axis direction. The second part of the second recess of the second portion 30*b*' comprises a second length measuring along the Z-axis direction. The sum of the first length and the second length is equal to a length of the second portion 30*b*' measuring along the Z-axis direction.

In a preferred example, as shown in FIG. 33B, the locking base 31' comprises a lock unit 310', an attached base 311*a*' for being attached to the second portion 30*b*', a tubular body 311*b*' extending from the attached base 311*a*' and a locking opening 311*c*' on the tubular body 311*b*'. The lock unit 310' can be a spherical shape or a disc shape or any other shaped elements.

In a preferred example, the attached base 311*a*' is positioned in the second part of the second recess of the second portion 30*b*'. The attached base 311*a*' can be fixed to the second base portion 30*b*' by any suitable fixing mechanism in both X-axis direction and the Y-axis direction, e.g. glue, weld, magnet, snap-fit, form-fit, screw or rivet. For example, when the attached base 311*a*' is positioned in the second part of the second recess of the second portion the attached base 311*a*' can be any suitable shape, such as a rectangular, square, hexagon, octagon or trapezoid; and the second part of the second recess of the second portion 30*b*' is a corresponding shape matched with the shape of the attached base 311*a*'. When the attached base 311*a*' is positioned within the second part of the second recess of the second portion 30*b*', the shape of the attached base 311*a*' will be snugly surrounded by the second part of the second recess of the second portion 30*b*', so that the attached base 311*a*' and the second part of the second recess of the second portion 30*b*' are fixed to each other in both the X-axis direction and the Y-axis direction.

In a preferred embodiment, the locking base 31' may comprise more locking openings and more locking units. In this example, the number of locking openings should be equal or greater than the number of lock units.

The tubular body 311b' comprises a central tube portion. The central tube portion is configured to be aligned with both the central opening of the first portion 30a' and the central recess of the second portion 30b'.

The locking element 32' is an optional element of the first connector 3a'. The locking element 32' can be formed in any suitable shape, such as a rectangular, square, hexagon, octagon, oval, triangle or trapezoid, viewed from the XY-plane. Similarly, viewed from either a plan defined by the X-axis and Z-axis or a plane defined by the Y-axis and the Z-axis, the locking element 32' can be generally any suitable shape, such as a rectangular, square, hexagon, octagon, oval or trapezoid.

The locking element 32' comprises a central cut-out. The central cut-out is configured to align with the central opening of the first portion 30a' and the central recess of the second portion 30b'. The tubular body 311b' of the locking base 31' is configured to be located in the central cut-out of the locking element 32'.

The locking controller 33' can be formed in any suitable shape, such as a rectangular, square, hexagon, octagon, oval, circular, triangle or trapezoid, or a combination thereof, viewing from the XY-plane. Similarly, viewing from either a plane defined by the X-axis and Z-axis or a plane defined by the Y-axis and the Z-axis, the locking controller 33' can be generally any suitable shape, such as a rectangular, square, hexagon, octagon, oval or trapezoid.

The locking controller 33' comprises a cut-out, and optionally a handle portion 330'. In a preferred example, if the first connector 3a' comprises the locking element 32', the cut-out of the locking controller 33' is formed as a corresponding shape that is matched with the shape of the locking element (observed from the XY-plane).

The cut-out of the locking controller 33' defines an inner frame around the cut-out, as a locking frame 331'. The locking controller 33' is at least partially arranged within the first part of the second recess of the second portion 30b'. The cut-out is concentric relative to the central opening of the first portion 30a', the central recess of the second portion 30b', the central tube portion of the tubular body 311b' of the locking base 31' and the central cut-out of the locking element 32' (if the first connector 3a' comprises the locking element 32').

The central passage of the first connector 3a' extends through the central opening of the first portion 30a', the central recess of the second portion 30b', the central tube portion of the tubular body 311b' of the locking base 31', the central cut-out of the locking element 32', and is terminated at the second part of the second recess of the second portion 30b'; so that the connecting part of either the base or the linear actuator can pass through the first portion 30a', the locking base 31', the locking element 32' and the locking controller 33', but will not pass through the second portion 30b'.

In a preferred example, the locking controller 33' is pivotably, relative to the central passage, arranged within the first part of the second recess of the second portion 30b'.

In a preferred embodiment, the locking base 31' is at least partially concentrically arranged within the locking frame 331' of the locking controller 33'; and the locking base 31' is attached to the second portion 30b' as mentioned above.

In another preferred embodiment, as shown in FIG. 33C, the central cut-out of the locking element 32' defines an inner frame 320' by an edge of the central cut-out that is radially facing toward the central passage. The inner frame 320' defined by the central cut-out of the locking element 32' is configured to at least partially surround the tubular body 311', and therefore surround the locking unit 310' and the locking opening 311c'.

The locking element 32' is also concentrically arranged within the locking frame 331' of the locking controller 33'. The locking frame 331' is adjacent to the locking element 32', so that when the locking frame 331' is rotated together with the locking controller 33', by the user pivoting the locking controller 33' relative to the central passage with the handle 330', the locking element 32' is rotated.

The inner frame 320' defined by the central cut-out of the locking element 32' comprises a release portion 321' and a locking portion 322'. A radial distance between each release portion 321' to the central passage is greater than a radial distance between each locking portion 322' to the central passage. In a preferred embodiment, the number of the release portion and the number of the locking portions are equal or greater than the number of the plurality locking units 310'.

The plurality locking units 310' is adjacent to the inner frame 320' of the locking element 32'.

The locking element 32' is concentrically arranged between the locking frame 331' of the locking controller and at least a partial portion of the locking element 32'. The inner frame 320' of the locking element 32' is shaped to enclose the locking unit 310' and the locking opening 311c'.

FIG. 34A shows the locking element 32' in an unlocked position of the locking controller 33'. In the unlocked position, the locking unit 310' is received between the release portion 321' of the locking element 32' and the tubular body 311b' of the locking element 32'. When the locking controller 33' is rotated, along an arrow T, to a locked position of the locking controller 33', as shown in FIG. 34B, the locking element 32' is also rotated by the locking frame 331' of the locking controller 33'. When the locking portion 322' of the inner frame 320' of the locking element 32' has been rotated to align with the locking unit 310', since the radial distance between the locking portion 322' to the central passage is smaller than the radial distance between the release portion 321' to the central passage, the locking unit 310' will be pushed into the locking opening 311c', as shown in the FIG. 34B, the locking unit 310' therefore protrudes into the central passage.

As shown in FIG. 35, the connecting part on either the base 4; 4' or the linear actuator 5; 5' comprises a rod 4a' with a neck portion 4b'. The rod 4a' is configured to be at least partially received within the central passage of either the first connector 3a' or the second connector 3b', so that the rod 4a' is at least partially enclosed by the tubular body 311b' of the locking base 31'. The neck portion 4b' is aligned with the locking opening 311c', such that when the locking element is in the locked position, as shown in FIG. 34B, the locking unit 310' protrude from the locking opening 311c' and engage with the neck portion 4b' of the rod 4a'; the connecting part and either the base or the linear actuator are therefore locked to the first and/or second connector.

It should be noted that the locking element 32' is not necessary for the pivot locking mechanism. For example, the locking portion and the release portion on the inner frame 320' of the locking element 32' can be arranged on the the locking frame of the locking controller, such that the rotation of the locking controller 33 can move the locking unit 310' into the locking opening 311c' when the locking controller moves from the unlocked position to the locked position.

The base 4; 4' is fixedly attached to the first connector 3*a*; 3*a*' in the X-axis direction and is movable relative to the second connector 3*b*; 3*b*' in the X-axis direction. The base 4; 4' comprises the first base portion 40; 401' and optionally a second base portion 43. The first base portion 401' can be formed as a single layer rectangular plate shape component, as shown in FIG. 25; or, as shown in FIG. 4, a multi-layer rectangular plate shape component.

In the example, as shown in FIG. 4, the first base portion 40 comprises a first layer 40' and a second layer 40".

The connecting surface of the first layer 40' of the first base portion 40 is fixed to the counter connecting surface of the second layer 40" of the first base portion 40, e.g. by magnet, screws or rivets, so that the first layer 40' is fixed to the second layer 40". The second base portion 43 is fixed to the first base portion 40. In this example, the first base portion 40 is fixed to the first connector 3*a* in the X-axis direction via, for example, a screwing or rivet connection between a fixing part 42 of the first layer 40' of the first base portion 40 with a counter fixing part 32*a*' on the second part 32*a* of the first connector 3*a*, so that the first base portion 40 is immovable relative to the first connector 3*a* in the X-axis direction, so as the base 4 is therefore fixedly attached to the first connector 3*a*. On the other hand, there is no fixing connection in the X-axis direction between the base 4 and the second connector 3*b*, so that the second connector 3*b* is not being prevented from moving relative to the base 4 in the X-axis direction. Preferably, the fixing part 42 and the counter fixing part 32*a*' are releasably fixed to each other; so that the first connector 3*a* can be reusable, or can be selectively attached to different type of bases for the tool assembly, depending on a manufacturing/assembling demand.

The first base portion is configured to carry an actuated assembly or a tool set; and the at least a part of the linear actuator 5; 5' is configured to act on the actuated assembly or the tool set; such that when one of the two carriages moves relative to the other one of the two carriages, the base moves relative to the linear actuator 5; 5' so that a rotational and/or translational motion of at least a part of the actuated assembly or the tool set relative to the carriage guide rail is initiated by the at least a part of the linear actuator 5; 5'.

The tool set may be any suitable tool/equipment for production line or manufacture/assembling process in the market, the design of such tool set itself is not formed a part of the present disclosure. The present disclosure includes the detail design of the actuated assembly and will be explained in detail later.

The actuated assembly or tool set can be carried by the first base portion 40; 401', in the shown example, can be the first layer 40' or the second layer 40" of the first base portion or in a case that the first base portion is a single layer component, the actuated assembly or the tool set can be carried by one surface of the first base portion; the actuated assembly or the tool set can be also received between the first base portion and the second base portion.

In one preferred embodiment, the linear actuator 5; 5' comprises an actuator body 50'; 50" extending along the X-axis between a first end 51; 51'; 51" and a second end 52; 52'; 52", as shown in FIG. 5 and FIG. 25. The actuator body 50' 50'; 50" can be any suitable shape, such as rod-shaped, tube-shaped, generally rectangular or a combination of different polygons.

In another example, as shown in FIG. 5, the first end 51 comprises a support 51*a* extending in a Z-axis direction. The support 51*a* may be an integral part of the first end 51 of the linear actuator 5, or releasably attached to the first end 51 of the linear actuator 5. The support 51*a* is configured to attach to the second connector 3*b* (as shown in one example) via a connection, for example, a screw or rivet connection, between the support 51*a* and a fixing part 32*b*' on the second part 32*b* of the second connector 3*b*. Alternatively, the support 51 may comprise a connecting element with the rod 4*a* and the neck portion 4*b*, so that the support can be fixed to the second connector 3*b*' by the pivot locking mechanism as mentioned above.

The support 51*a* is therefore fixedly attached to both the first end 51 of the linear actuator 5 and the second connector 3*b*; 3*b*', so that the linear actuator 5 is fixed to the second connector 5*b* by the support 51*a*. There is no fixing connection between the linear actuator 5 and the first connector 3*a*; 3*a*'/the base 4 in the X-axis direction, so that the linear actuator 5 is movable relative to both the first connector 3*a*; 3*a*' and the base 4. Preferably, the support 51*a* and the fixing part 32*b*' are releasably attached to each other; so that the tool linear actuator 5 and the second connector 3*b* can be reusable; the tool assembly can be more compact by keeping the tool assembly in a disassembled state during storage and/or transport.

The second end 52; 52'; 52" of the linear actuator 5; 5' is configured to directly or indirectly act on at least a part of the actuated assembly or the tool set that is received/carried by the base 4; 4'. The first base portion 40; 401' may be arranged as close as possible to the first carriage 2*a* so as to keep a center of gravity of the first base portion 40; 401' together with the actuated assembly or the tool equipment carried by the first base portion 40; 401' close to the first carriage 2*a*, so that the tool assembly can be gripped tight on the first carriage 2*a*.

The second end 52; 52'; 52" of the linear actuator 5; 5' is configured to directly or indirectly interact with the actuated assembly or the tool set that is received/carried by the base 4; 4', so that placing the first base portion 40; 401' between the at least a part of the linear actuator 5; 5' and the two connectors 3*a*; 3*a*', 3*b*; 3*b*', may bring more design flexibility for the design of the tool assembly.

As shown in FIG. 5-24, the second end 52 of the linear actuator 5 can be placed adjacent to a part of the actuated assembly or the tool set carried by the first base portion 40; or the second end 52 may be fixed to a driver (will be explained in detail later) or an extension; such driver or the extension is adjacent to a part of the actuated assembly or the tool set. The extension may extend from the second end 52 of the linear actuator 5 in at least one of the X-axis, Y-axis and Z-axis directions.

On the other hand, as shown in FIG. 25, the actuated assembly, which is carried by the base 4', may comprise an extending element 13 with a driver 6'; 36 adjacent to the actuated assembly. The extending element 13 extends along the X-axis direction between a first end 13*a* and a second end 13*b*. At least one of the first end 13*a* and the second end 13*b* protrude from the first base portion 401' in the X-axis direction, and the protruding first end 13*a* and/or second end 13*b* are configured to be moved by the second end 52'; 52" of the linear actuator 5' when the second carriage 2*b* moves relative to the first carriage 2*a*.

The extending element 13 may be formed as any suitable shape, e.g. rod-shaped, tube-shaped or generally rectangular. For example, as shown in FIG. 25-30, the extending element 13 is a rod-shaped element. Preferably, the extending element 13 comprises an elongated body in the X-axis direction. In another preferred example, a part of the extending element 13 protrudes out from the base 4' in the X-axis direction, so that the linear actuator 5' can easily contact and move the extending element 13.

The position of the second end 52; 52'; 52" of the linear actuator 5; 5' is dependent on the location of the actuated assembly or the tool set that is received/carried by the base 4; 4'.

In the example as shown in FIG. 5, the position of the second end of the linear actuator 5 in the Z-axis direction can be adjusted by the length of the support 51a in the Z-axis direction. In a preferred example, the first base portion comprises a slot that extends through one or more layers of the first base portion; and the support 51a of the linear actuator 5 protrudes partially or entirely through the slot, when the linear actuator 5 is attached to the first base portion 40. In the example shown in FIGS. 4-5, the slot 41 extends through both the first and the second layers 40', 40" of the first base portion 40; and the support 51a of the linear actuator 5 protrudes through the slot 41 on both the first and the second layers 40', 40" of the first base portion 40, when the linear actuator 5 is attached to the first base portion 40; so that the second end 52 of the linear actuator 5 or the driver/extension fixed to the second end 52 of the linear actuator 5 can be placed adjacent to a part of the actuated assembly or the tool set that is received/carried by the base 4.

The base 4; 4' is fixed to the first connector 3a; 3a', and not fixed to the second connector 3b; 3b', the base 4; 4' is therefore fixed to the first carriage 2a and not fixed to the second carriage 2b; and the linear actuator 5; 5' is fixed to the second connector 3b; 3b', and not fixed to the first connector 3a; 3a', the linear actuator 5; 5' is therefore fixed to the second carriage 2b, and not fixed to the second carriage 2b (as shown in FIG. 5 or FIG. 25); and since the first carriage 2a and the second carriage 2b are movable relative to one another in the X-axis direction, the linear actuator 5; 5' is therefore movable (together with the second connector 3b; 3b' and the second carriage 2b) relative to the base 4; 4' in the X-axis direction.

Because the slot 41 provides a space in the X-axis direction to the support 51a of the linear actuator 5, the second end 52 of the linear actuator 5 can be moved relative to the base 4 and the actuated assembly or the tool set that is received/carried by the base 4.

The second end 52; 52'; 52" of the linear actuator 5; 5' is configured to be, directly or indirectly (via the driver or the extension), in contact with and/or move a part of the actuated assembly or the tool set that is received/carried by the base 4; 4' while the linear actuator 5; 5' moving relative to the base 4; 4' in the X-axis direction.

Such contact or movement may be designed as a trigger action for such tool set that is received/carried by the base 4; 4', for example, the base 4; 4' may receive an oscillator configured to be switched on by such trigger action; or such contact or movement may be designed as a process action for a component that is fixed to such the tool set that is received/carried by the base 4; 4', for example, the base 4; 4' may carry a shelf for carrying a component; the second end 52; 52'; 52" of the linear actuator 5; 5' may be fixed to a pin with stamp head (in this example the stamp head is the extension), so that such process action can stamp a mark on such component; or in another example, the second end 52; 52'; 52" of the linear actuator 5; 5' may be fixed to an inspection probe (in this example the inspection probe is the extension), so that such process action can make the inspection probe sufficiently close to such component and perform an inspection.

It should be noted that, it is not necessary that the support 51a needs to protrude through the first base portion, in this case, the first base portion 40 may not have the slot 41. The linear actuator may be moved closer or further relative to the base to adjust a distance between the second end of the linear actuator or the driver/extension fixed to the second end of the linear actuator and the actuated assembly or the tool set that is received/carried by the base 4 in the X-axis direction. The former may be more user-friendly to the user, since the former can fix the distance between the linear actuator and the base in the X-axis direction and provide a "zero" reference position for the user, so that the user can easily calculate a speed or distance for the second carriage to move towards the first carriage that can result such trigger/process action. The latter may provide a better design flexibility.

In another example, the base 4; 4' may also slidably connect with the second connector 3b. In this example, the base 4; 4' is movably fixed to the first connector 3a in the X-axis direction as mentioned above, and movably (in the X-axis direction) placed on the second connector 3b. Such an arrangement is preferred if the base 4; 4' is heavy or relatively long in the X-axis direction, so that the both the first connector 3a (along with the first carriage 2a) and the second connector 3b (along with the second carriage 2b) can support the base 4; 4' in the Z-axis direction. In the example as shown in FIGS. 4-7, the base 4; 4' can be simply placed on the second connector 3b without being attached to the base 4; 4' and the second connector 3b. In another example, especially if the tool assembly is attached to a carriage guide rail system that is a hanging system, the base may be arranged under the second connector 3b; in this case, the base may be connected with the second connector by a suspension rail connection.

Figure 6:
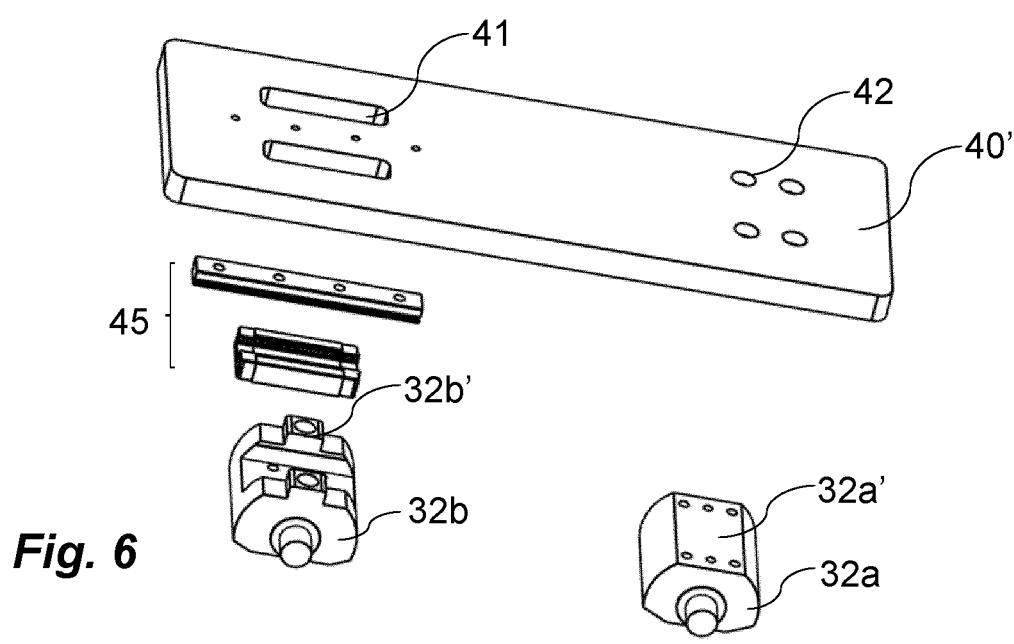
FIG. 6 schematically shows a perspective view of a first layer of a first base portion of a base, a linear guide unit of the tool assembly of FIG. 4, a second part of the first connector of FIG. 3 and a second part of the second connector of FIG. 3.
Figure 7:
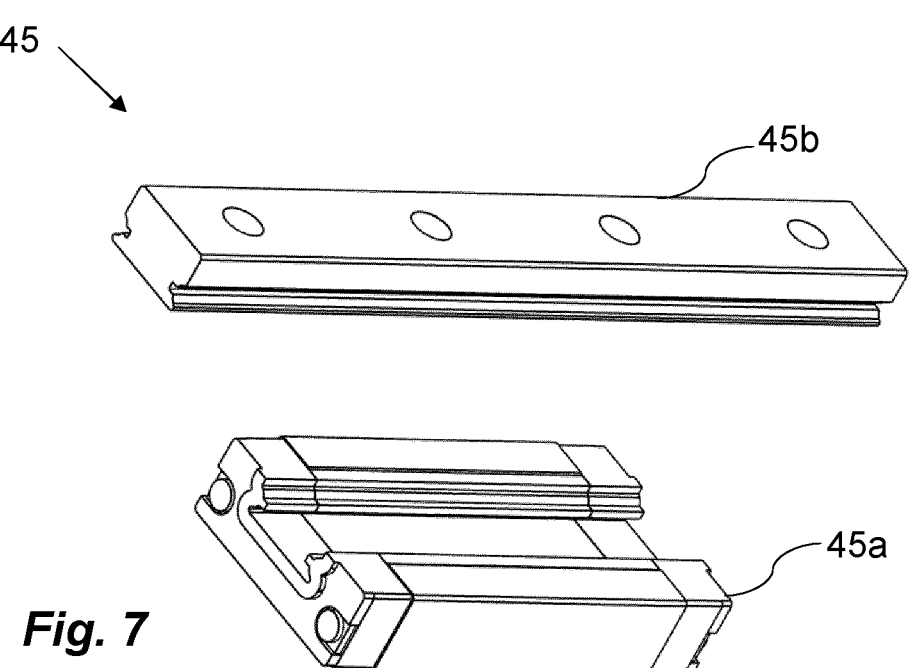
FIG. 7 schematically shows a perspective view of a linear guide rail and a linear guide follower to form the linear guide unit for the tool assembly of FIG. 6.

In a preferred example, for reducing friction between the base 4; 4' and the second connector 3b that is created during the relative sliding movement, an optional linear guide unit 45 can be arranged between the base 4; 4' and the second connector 3b. In an example as shown in FIGS. 6-7, the linear guide unit 45 may be formed by a linear guide rail 45a and a linear guide follower 45b. In one example as shown in FIG. 6, the second connector 3b comprises the linear guide rail 45a and the base 4; 4' comprises the linear guide follower 45b configured to be slidably (along the X-axis) arranged within the linear guide rail 45a, e.g. by a groove and ridge (facing to each other) connection. Such a groove and ridge connection may be designed to face to each other in the Z-axis direction and/or the Y-axis direction. Alternatively, the second connector may comprise the linear guide follower, and the base may comprise the linear guide rail.

Figure 8:
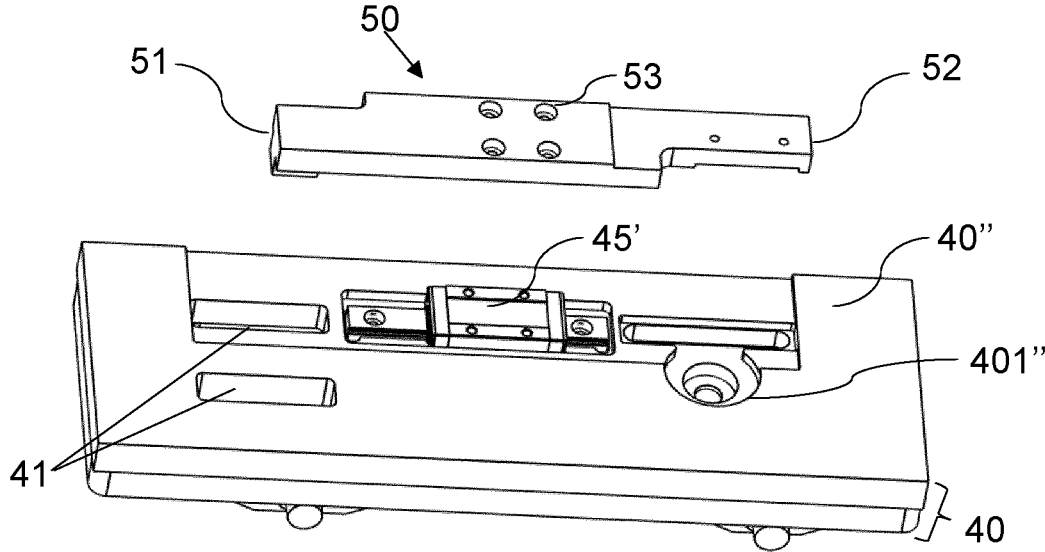
FIG. 8 schematically shows a perspective view of the linear actuator of the tool assembly of FIG. 4, the first base portion of the tool assembly of FIG. 4, and a linear guide unit.

The same linear guide unit can also be arranged between two other elements that are slidable relative to each other, so that a friction between such two elements created during the relative sliding movement can be reduced. For example, another linear guide unit 45' can be arranged between linear actuator 5 and the first base portion 40 as shown in FIG. 8. The linear actuator 5 may be releasably attached to the linear guide rail, for example on a portion 53 between the first end 51 and the second end 52 of the linear actuator 5. The first base portion 40 may be releasably attached to a linear guide follower, or alternatively, the linear actuator may comprise the linear guide follower, and the first base portion may comprise the linear guide rail. The linear guide follower is slidably (along the X-axis) arranged within the linear guide rail.

The present disclosure provides a tool assembly that can provide one or multiple actions to participate in the manufacturing/assembling process, and all of the actions provided by the tool assembly can be initiated by linear movement of the second carriage 2b on the carriage guide rail 1, along the X-axis, relative to the first carriage 2a, by moving the linear actuator 5; 5' in the X-axis direction. As mentioned above, the linear actuator 5; 5' is fixed to the second connector 3b; 3b by, for example, the support 51a or the pivot locking mechanism, and is not fixed to the first connector 3a; 3a'; so that the linear actuator 5; 5' is therefore fixed to the second carriage 2b via the second connector 3b; 3b', but not fixed to the first carriage 2a. The base 4; 4' is fixed to the first connector 3a; 3a', and not fixed to the second connector 3b; 3b'; so that the base 4; 4' is fixed to the first carriage 2a and not fixed to the second carriage 2b; and since the first carriage 2a and the second carriage 2b are movable relative to one another in the X-direction, the linear actuator 5; 5' is therefore movable (together with the second connector 3b; 3b' and the second carriage 2b) relative to the base 4; 4' in the X-axis direction.

The linear actuator 5; 5' is configured to interact with the actuated assembly or the tool set received or carried by the base; and the linear actuator 5; 5' is also configured to control (by the second end of the linear actuator) one or more actions of the actuated assembly or the tool set/equipment received or carried by the base by the relative movement along the X-axis between the linear actuator 5; 5' and the base as mentioned above.

It should be noted that the first base portion is configured to receive or carry at least a part of the actuated assembly or the tool set, so that the shape of the first base portion can be modified depending on the size and/or shape of such actuated assembly or the tool set/equipment. In the presented example, as shown in figures, the first base portion is formed by multiple rectangular plates attached to one another; and the second base portion is a rectangular plate. However, the first and/or the second base portion could be formed in other shape, e.g. circular, oval or triangle plate; or a cube shaped; and such plate or cube can be attached to one another.

Four embodiments of the actuated assembly are outlined below describing the linear movement of the second carriage 2b on the carriage guide rail 1 in the X-axis direction, relative to the first carriage 2a; or more specifically, the linear movement of the linear actuator 5; 5' along the X-axis relative to the first carriage 2a, to control, generally in a mechanical way, one or more actions that the tool assembly and the actuated assembly are going to provide to the manufacturing/assembling process. The actuated assembly in those four embodiments may optionally comprise the extending element 13.

In the first, second, and fourth embodiments, the actuated assembly, preferably, the actuated assembly is constructed with purely mechanical components and arrangements; so that the cost of the tool assembly can be reduced.

The actuated assembly is attached to the base, for example, the actuated assembly can be carried by the first base portion or be received between the first base portion and the second base portion. The actuated assembly is configured to directly or indirectly be in contact with the second end 52; 52'; 52" of the linear actuator 5; 5', and to either contact with second end 52; 52'; 52" of the linear actuator 5; 5' or contact the driver or the extension that is fixed to the second end 52; 52'; 52" of the linear actuator 5; 5' (as mentioned above). The actuated assembly is configured to output one or more actions (such as at least one of rotation, gripping movement and straight movement in the Z-axis direction) in response to the relative movement in the X-axis direction between the linear actuator 5; 5' and the base (specifically the relative movement in the X-axis direction between the second end 52; 52'; 52" of the linear actuator 5; and the actuated assembly), to the manufacturing/assembling process or can be connected with the tool set that is configured to be controlled by the linear actuator 5; 5' (as mentioned above).

In the first, second, and fourth embodiments of the actuated assembly, the linear actuator 5 comprises the driver 6; 16; 26; alternatively, the linear actuator 5' does not comprise a driver; instead, the actuated assembly, which is attached to the base 4', comprises the extending element 13, and the extending element 13 comprises a driver 6'; 36. The actuated assembly comprises a driven member; the driven member is engaged with the driver, so that when the driver is moved in the X-axis direction together with the linear actuator 5; 5', the driven member will be moved by the driver.

Figure 9:
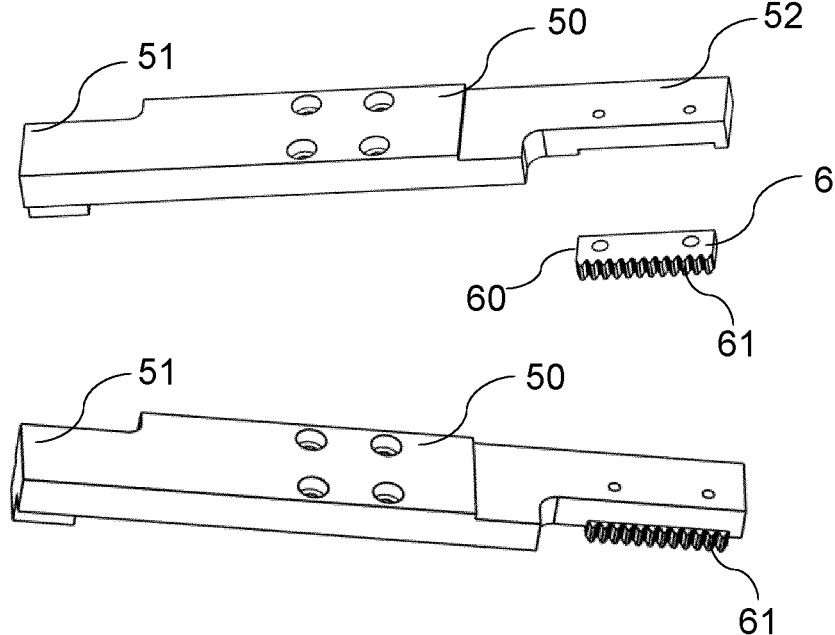
FIG. 9 schematically shows a perspective view of one embodiment of a driver for attaching to the linear actuator of FIG. 8.

In the first embodiment of the actuated assembly, when the second end of the linear actuator is adjacent to the actuated assembly. The driver 6 can be an integral part of the second end 52 of the linear actuator 5; or fixedly attached to the second end 52 of the linear actuator 5. The driver is preferably releasably attached to the second end 52 of the linear actuator In a preferred example, the driver 6 comprises a driver body 60 with a set of ratchet teeth 61 facing in the Y-axis direction, as shown in FIG. 9.

On the other hand, in the first embodiment of the actuated assembly, the actuated assembly may comprise the extending element 13. The linear actuator 5' in this example is configured to interact with the actuated assembly by contacting the extending element 13. The driver 6' can be an integral part of the extending element 13; or can be fixedly attached to the extending element 13. The driver is preferably releasably attached to the extending element 13. In a preferred example, the driver 6' comprises a driver body 60' with a set of ratchet teeth 61' facing in the Y-axis direction, as shown FIG. 27.

Figure 27:
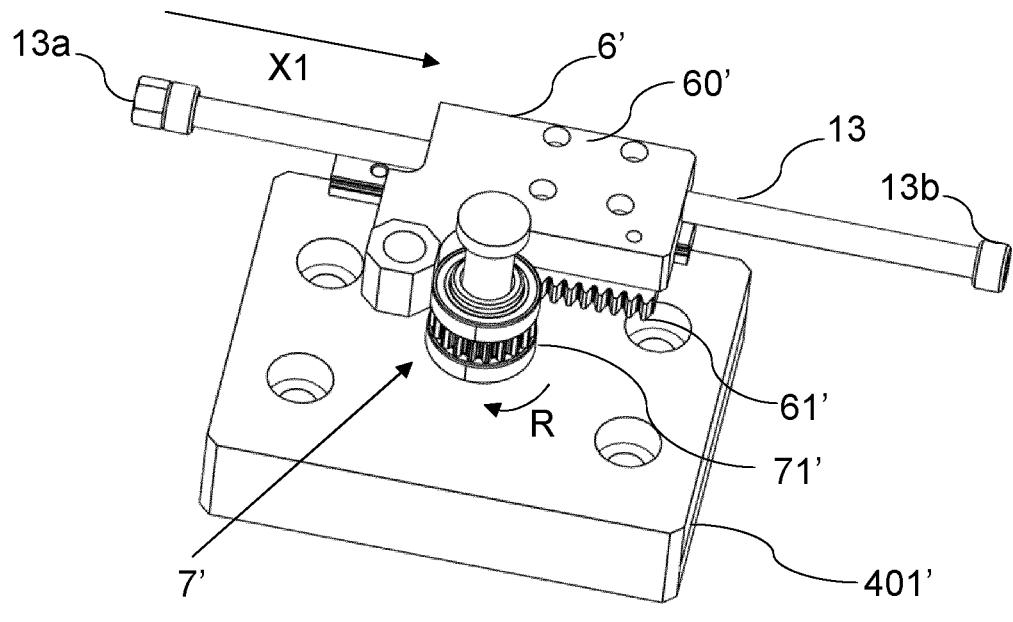
FIG. 27 schematically shows perspective views of the tool assembly of FIGS. 25-26 with an actuated assembly in one embodiment.

In the first embodiment of the actuated assembly, as shown in FIGS. 10A-10B and FIG. 27, the actuated assembly is a rotator 7; 7'. The actuated assembly disclosed in the example as shown in FIG. 10A-10B is similar to that disclosed in FIG. 27, so that most of the following explanation for the example as shown in FIG. 10A-10B is applicable to the example shown in FIG. 27.

The rotator 7 comprises a circular body 70 and a central shaft 72. The central shaft 72 extends along the Z-axis direction, the central shaft 72 comprises a protruding end. The protruding end extends away from the first base portion 40 in the Z-axis direction, or as shown in FIG. 11 away from the second layer 40" of the first base portion 40 in the Z-axis direction. In one example as shown in FIG. 12A, the protruding end extends away from the first base portion 40 towards the second base portion 43 in the Z-axis direction, the protruding end protrudes through a base opening 44 of the second base portion 43 when the actuated assembly is attached to the base 4.

Figure 12A:
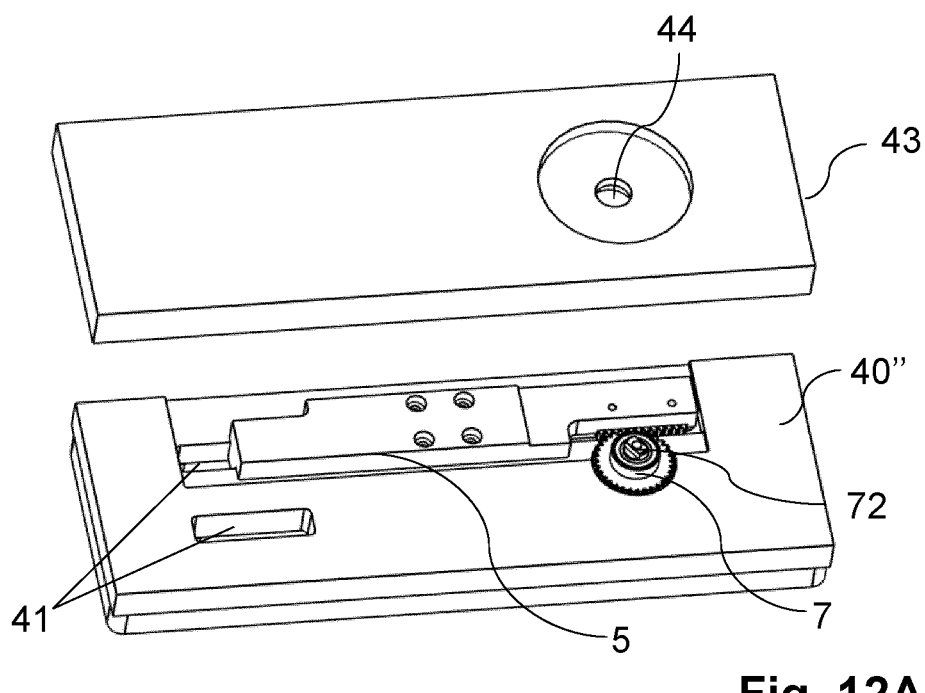
FIG. 12A schematically shows a perspective views of one example of a second base portion for the tool assembly of FIG. 4 the first base portion of the tool assembly of FIG. 4, the linear actuator of the tool assembly of FIG. 4, and the actuated assembly of FIGS. 10A-10B.

The base opening 44 is arranged on the second base portion as a through hole, in the presented example in FIG. 12A, the base opening 44 is a circular shaped through hole, but the base opening can also be formed in other shape, such as oval, rectangular or square. The second base portion may comprise a generally flat surface parallel to the XY-plane, the base opening can be arranged on such flat surface; or the base portion may comprise generally flat surface parallel to the XY-plane; the flat surface comprises a recess portion recessing in the Z-axis direction. The base opening can be arranged within such recess portion. As one example as shown in FIG. 12A-12B, when the rotator 7 is attached to the base 4, between the first base portion 40 and the second base portion 43 in the Z-axis direction, the protruding end will protrude through the base opening 44 in the Z-axis direction and therefore protruding from the second base portion 43.

Figure 12B:
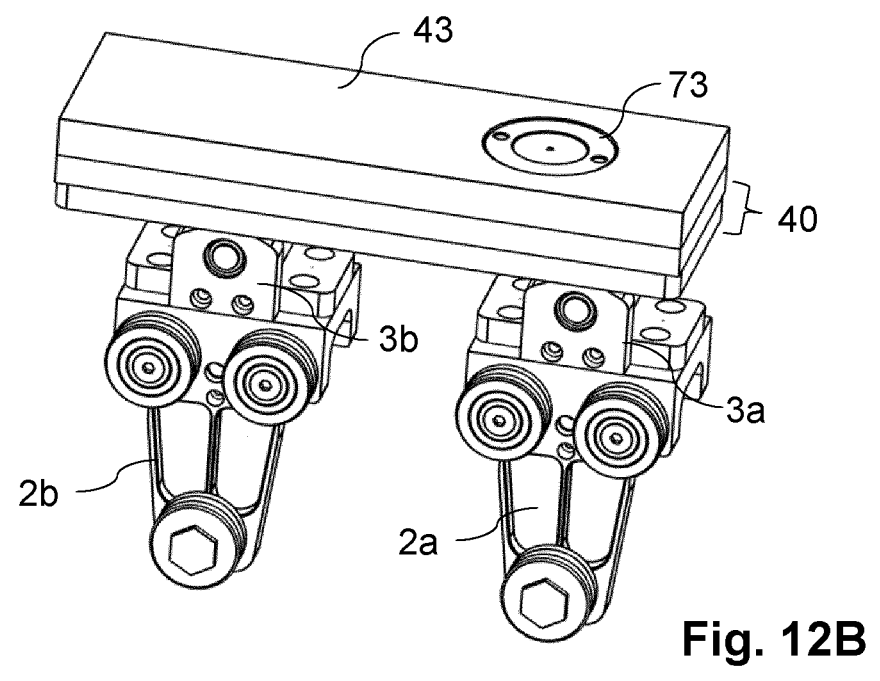
FIG. 12B schematically shows a perspective views of the tool assembly of FIG. 4 with the second base portion of FIG. 12A; the tool assembly is attached to the first carriage and the second carriage by the first connector and the second connector.

The rotator 7 optionally comprises a spinner 73 attached to the protruding end of the central shaft 72, as shown in FIGS. 12A-12B. The recess portion of the second base portion 43 is configured to receive the spinner 73. In a preferred example, the rotator 7 is rotatable around the Z-axis. In the preferred example, as shown in FIG. 12A-12B, the linear actuator 5 and the actuated assembly are positioned between the first base portion 40 and the second base portion 43 in the Z-axis direction, so that the second base portion 43 can provide a function of covering, so that the second base portion 43 can prevent dust, components or fragment of a component from entering or blocking the linear actuator 5 and/or the actuated assembly, and therefore causing the tool assembly to malfunction.

In this embodiment, the driven member 71; 71' of the actuated assembly is arranged on an outer surface portion of the circular body 70, the outer surface portion is peripheral from a rotation axis that the rotator 7 is configured to rotate around, so when the driven member 71; 71' is rotated (as explained in detail later) the rotator 7; 7' (the circular body the central shaft 72 and the spinner 73) is also rotated.

Preferably, the driven member is a cogwheel 71; 71' rotating around the rotation axis as the rotator 7; 7'. In the example as shown in FIGS. 10A-10B and FIG. 27, the rotator 7; 7' and the cogwheel 71; 71' are configured to rotate around the Z-axis.

The rotator 7; 7' is attached to the first base portion 40; 401', by e.g. the central shaft 72 rotationally fixed to the first base portion 40; 401' or a shape of a part of the first base portion 40; 401' that linearly restricts the circular body 70 of the rotator 7; 7' in the X-axis direction. For example, in the case that the rotator 7; 7' is fixed to the first base portion 40; 401' by the central shaft 72, the first base portion 40; 401' may comprise a fixing member. The fixing member may generally enclose the central shaft 72, so that the central shaft 72 can rotate relative to the first base portion 40 without a linear movement/or only with a slight linear movement (due to a tolerance/friction) in the X-axis direction.

In another example, when the rotator 7; 7' is fixed to the first base portion 40; 401' by the shape of the part of the first base portion 40; 401', the first base portion 40; 401' may comprise a curve recess curves towards the Y-axis (e.g. a recess shaped like a circle that has a segment removed) to partially surround the circular body 70 of the rotator 7; 7'; or more specifically in the presented example in FIG. 11, partially surround the cogwheel 71; 71', so that the cogwheel 71; 71' and the rotator 7; 7' are slidably fixed and rotatable relative to the first base portion 40; 401'.

In this example, the linear actuator 5; 5' is acting on the actuated assembly via the driver 6. The linear actuator 5; 5' is slidable relative to the first base portion 40 and the second end 52 of the linear actuator 5/the extending element 13 is adjacent to the cogwheel 71; 71', and the set of ratchet teeth 61; 61' on the driver 6; 6' is meshed with the cogwheel 71; 71'. As shown in FIG. 11 and FIG. 27, for example, when the second carriage 2b slides relative to the first carriage 2a along the X-axis in a direction as shown by arrow X1, the second connector 3b; 3b' and the linear actuator 5; 5' also slide along the X-axis relative to the base 4; 4' in the X1 direction. Due to the mesh between the set of ratchet teeth 61; 61' and the cogwheel 71; 71', the linear movement of the linear actuator 5; 5' in the X1 direction causes the cogwheel 71; 71', and therefore the rotator 7; 7', to rotate in a clockwise direction (as shown in arrow R). In this case, the actuated assembly therefore generates a rotational motion (by the rotator 7; 7' and/or the spinner 73) in response to the linear movement of the linear actuator 5; 5' relative to the base 4; 4'.

On the other hand, if the driver 6' is fixed to the extending element 13, then the linear actuator 5' acts on the actuated assembly via the extending element 13, as shown in FIG. 26-27, when the linear actuator 5' is slidable relative to the first base portion 401' and the extending element 13 is adjacent to the cogwheel 71', and the set of ratchet teeth 61' on the driver 6' is meshed with the cogwheel 71'. As shown in FIG. 27, for example, when the second carriage 2b slides relative to the first carriage 2a along the X-axis in a direction as shown by arrow X1, the second connector 3b' and the linear actuator 5' also slide along the X-axis relative to the base 4' in the X1 direction. Due to the mesh between the set of ratchet teeth 61' and the cogwheel 71', the linear movement of the linear actuator 5' in the X1 direction causes the cogwheel 71', and therefore the rotator 7', to rotate in a clockwise direction (as shown by arrow R). In this case, the actuated assembly therefore generates a rotational motion (by the rotator 7' and/or the spinner 73) in response to the linear movement of the linear actuator 5' relative to the base 4'.

The rotation angle of the cogwheel may be determined by the linear moving distance of the second carriage along the X-axis towards the first carriage; also, the spinner may connect to the central shaft with a rotation ratio conditioning arrangement, for example, an eccentric gear, so that the rotation angle of the rotator may be different from the spinner.

It should be noted that, alternatively, the rotator may comprise a cam as the driven member, with the cam radially extending from the outer surface portion of the circular body, the outer surface portion is peripheral from a rotation axis that the rotator is configured to rotate around; or in another alternative, the rotator may comprise a protrusion (as the driven member) protruding along the Z-axis from the outer surface portion of the circular body. In this case, the outer surface portion of the circular body may comprise a radially extending ledge or a ring-shaped part; the protrusion is arranged on such ledge or ring-shaped part. The driver may comprise a protrusion extending in the direction of the Y-axis, the protrusion engages with the cam or protrusion of the rotator. In this example, the rotator may only output a certain angular degree of rotation while the second carriage 2b is sliding relative to the first carriage 2a. The angular degree can be determined by the location of the cam or protrusion relative to the rotator.

The spinner 73 is configured to rotate together with the rotator, due to the connection between the central shaft 72 and the spinner 73. The spinner 73 is configured to interact with a manufacturing/assembling component or another manufacturing/assembling machine, e.g. a manufacturing robot, so that the output rotation can be transferred to the manufacturing/assembling component or the manufacturing/assembling machine. The spinner 73 may comprise a shape that depends on the demand of the manufacturing/assembling.

For example, as shown in FIG. 12B, the spinner 73 may be a plate shape, so that a manufacturing/assembling component may be placed on the plate; or the spinner may be a shaft that is configured to protrude at least partially into the manufacturing/assembling component. Also, the spinner 73 may be the only actuated assembly that is positioned on the second base portion 43, so that a manufacturing/assembling component/tool/equipment can be placed on the rest of space on the second base portion 43 without an impact to the actuated assembly.

Figure 13A:
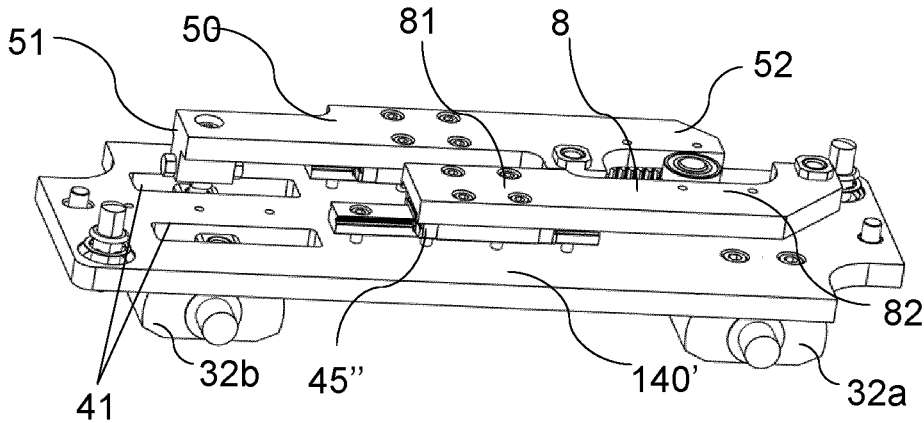
FIGS. 13A-13B schematically show a perspective view and a top view respectively of an exemplified linear actuator follower for the actuated assembly of FIGS. 10A-10B, the linear actuator of the tool assembly of FIG. 4, another example of a layer of a first base portion for the tool assembly of FIG. 4, the second part of the first connector of FIG. 3 and the second part of the second connector of FIG. 3.
Figure 13B:
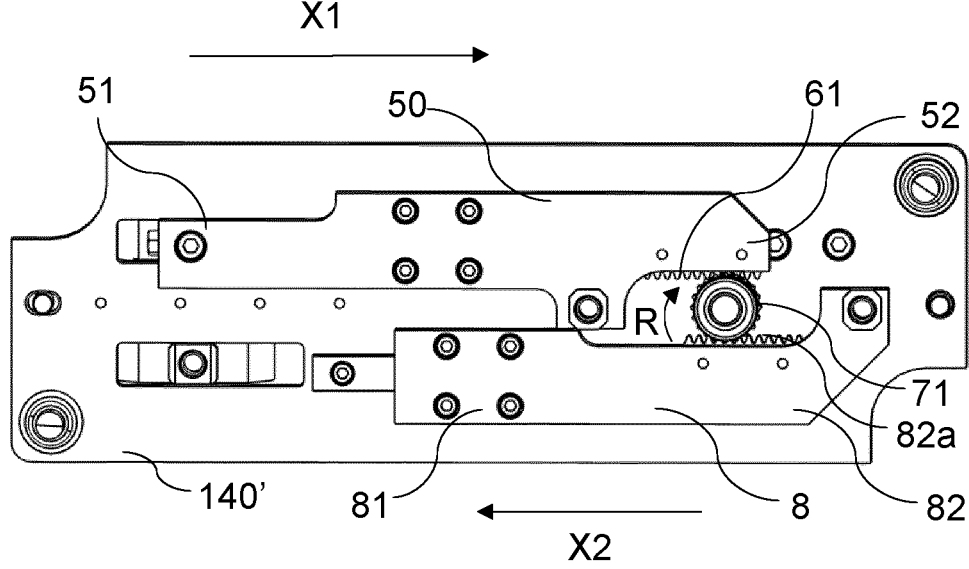
Figure 28:
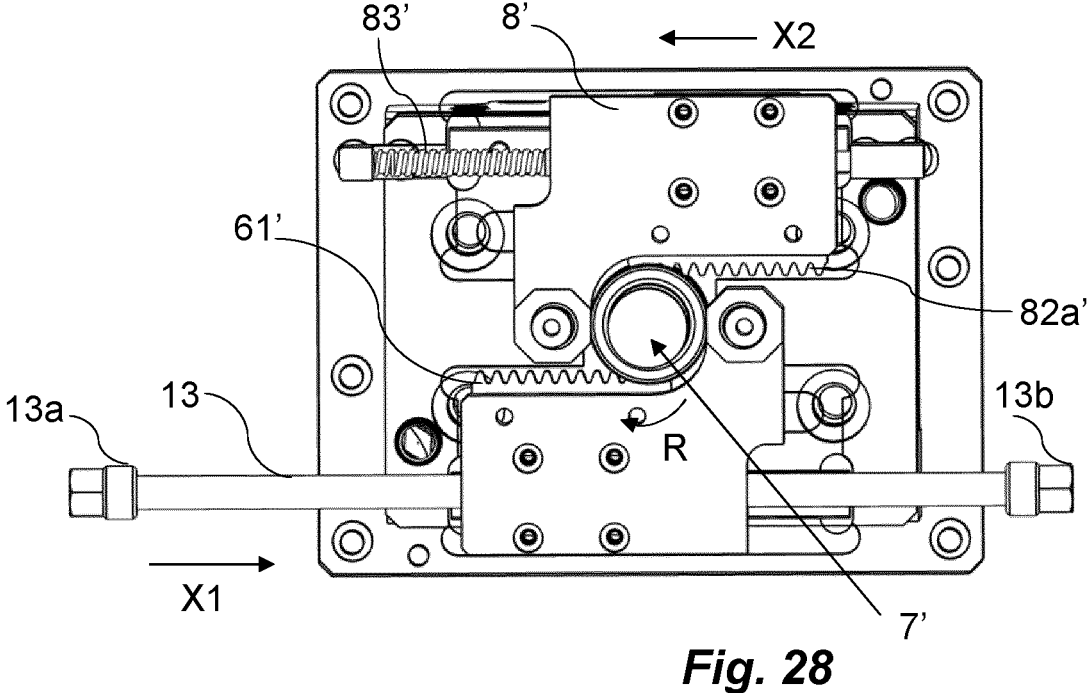
FIG. 28 schematically shows perspective views of the tool assembly of FIGS. 25-26 with an actuated assembly in another embodiment.

In the second embodiment of the actuated assembly, the actuated assembly comprises a linear actuator follower 8; 8', as shown in FIGS. 13A-13B and FIG. 28. In this embodiment, the first and the second connector 3a; 3a', 3b; 3b', the base 14; 4', the linear actuator 5; 5', the driver 6; 6', the rotator 7; 7', and the connection thereof are similar as described in the first embodiment of the actuated assembly.

The linear actuator follower 8; 8' is configured to be moved by the rotator while the rotator is rotated by the linear actuator 5; 5'. The rotator 7; 7' comprises a transmission member, the transmission member is configured to engage with the counter transmission member on the linear actuator follower. The actuated assembly disclosed in the example as shown in FIG. 13A-13B is similar to that disclosed in FIG. 28, so that most of the following explanation for the example as shown in FIG. 13A-13B is applicable to the example shown in FIG. 28.

For example, as shown in FIG. 13A, the linear actuator follower 8 extends along the X-axis between a first end 81 and a second end 82. The linear actuator follower 8 is movable in X-axis direction relative to the first base portion 140 (shown in FIG. 14). Preferably, to reduce friction between the linear actuator follower 8 and the first base portion 140, another linear guide unit 45" can be arranged between the linear actuator follower 8 and the first base portion 140. The linear guide unit 45" is similar as mentioned in the first embodiment of the actuated assembly. In the example as shown in FIG. 13A, a part 140' of the first base portion 140 comprises a linear guide rail, and the first end 81 of the linear actuator follower 8 comprises a linear guide follower that is slidably on the linear guide rail. Alternatively, the part 140' of the first base portion 140 may comprise a linear guide follower, and the first end 81 of the linear actuator follower 8 may comprise a linear guide rail.

In a preferred example, the first base portion 140 comprises a slot as described in the above embodiment. The support 51a of the linear actuator 5 is configured to protrude through the slot of the first base portion.

In the same example, the second end 82 of the linear actuator follower 8; 8' comprises a plurality of ratchet teeth 82a; 82a' as the counter transmission member. The second end 82 of the linear actuator follower 8; 8' is adjacent to the first base portion 140.

The rotator 7 may comprise a cogwheel 71, as mentioned in one example in the first embodiment of the actuated assembly. In this example, the cogwheel 71 is the driven member of the actuated assembly and the transmission member of the rotator 7. The plurality of ratchet teeth 82a are meshed with the cogwheel 71. In the preferred example, the cogwheel 71 is positioned between the set of rachet teeth 61; 61' of the driver 6; 6' on the second end 52 of the linear actuator 5, and the plurality of ratchet teeth 82a; 82a' of the second end 82 of the linear actuator follower 8; 8'.

The base 14 in this embodiment is fixedly attached to the first connector 3a in the X-axis direction and movable relative to the second connector 3b in the X-axis direction as mentioned above. The linear actuator 5; 5' can therefore move relative to the base 14 in the X-axis direction when the second carriage 2b move relative to the first carriage 2a as mentioned above. As shown in FIG. 13B, the cogwheel 71 is meshed with both the set of rachet teeth 61 and the plurality of ratchet teeth 82a. When the linear actuator 5; 5' moves along the X-axis in the X1 direction relative to the base 14 (or only the part 140' of the first base portion 140 can be seem in FIG. 13B), such linear movement will cause the cogwheel 71 to rotate in the clockwise direction as shown by arrow R. The rotation of the cogwheel 71 will then cause the linear actuator follower 8; 8' to linearly move along the X-axis in the X2 direction relative to the part 140' of the first base portion 140 in the shown example.

It should be noted that the linear actuator follower can be a different shape and/or comprises a movement in different direction depending on the demand of manufacturing/assembling processes. For example, the linear actuator follower 8; 8' in the example shown in FIGS. 13A-13B and FIG. 28 is configured to move linearly in the X-axis direction, so that the tool assembly can output (by the actuated assembly) two translation motions along the X-axis in opposite directions, along with one rotational motion to be used in the manufacturing/assembling process, when the linear actuator 5; 5' moves relative to the base along the carriage guide rail. Also, the linear actuator follower may be configured to move linearly in the Y-axis direction, by arranging the connecting point between the linear actuator and the cogwheel, and the connecting point between the linear actuator follower and the cogwheel with 90-degree angular offset. Alternatively, the linear actuator follower can be designed as another cogwheel meshed with the cogwheel 71 of the rotator 7. In this alternative example, the linear actuator follower will rotate in the opposite direction relative to the cogwheel 71 of the rotator 7 when the linear actuator 5; 5' linearly moves in the X1 direction. In this example, the tool assembly can output (by the actuated assembly) two rotational motions, one in the clockwise direction, and the other in the anti-clockwise direction, along with one translational motion to be used in the manufacturing/assembling process, when the linear actuator 5 moves relative to the base along the carriage guide rail.

Also, as mentioned above, instead of using the cogwheel as the driven member of the actuated assembly, the cam or the protrusion arranged on the outer surface portion of the circular body of the rotator can also be the driven member. In these cases, for moving the linear actuator follower with the plurality of ratchet teeth (as shown in FIGS. 13A-13B and FIG. 28 or if the linear actuator follower comprises a cogwheel), the rotator may comprise the cam or the protrusion on one half of the outer surface portion of the circular body of the rotator and comprise a series of ratchet teeth on the other half of the outer surface portion of the circular body of the rotator.

The linear actuator follower 8' may also comprise a spring 83 as shown in FIG. 28. In the example shown, when the extending element 13 is moved by the linear actuator 5' in the X1 direction, the linear actuator follower 8' moves in the X2 direction (due to the engagement between the transmission member and the counter transmission member). When the linear actuator 5' is no longer in contact with one end of the extending element 13, the spring 83 pushes the linear actuator follower 8' in the X1 direction; and due to the engagement between the transmission member and the counter transmission member, the extending element 13 is moved in the X2 direction.

In another example, the rotator may comprise a tubular shaped body extending along in the Z-axis direction. In this example, the driven member and the transmission member can both be arranged on a periphery of the tubular body of the rotator, the periphery of the tubular body is peripheral from the rotation axis of the rotator, and offset relative to each other along the Z-axis, so that the linear actuator follower can be offset relative to the linear actuator 5 along the Z-axis, or the linear actuator follower can be moved in different dimension, for example, linearly moved along the Y-axis when the linear actuator 5; 5' moves in the X1 direction.

In another example, the transmission member and the counter transmission member can be a guide track and a pin; for example, the rotator may comprise a pin on the outer surface portion of its circular body, the pin may extend along the Z-axis. The linear actuator follower may comprise a guide track configured to receive the pin. In this example, the linear movement of the linear actuator in the X1 direction, for example, may cause the linear actuator follower to move in the direction of X-axis and the Y-axis or to move with a curved path depending on the design of the guide track.

Figure 14:
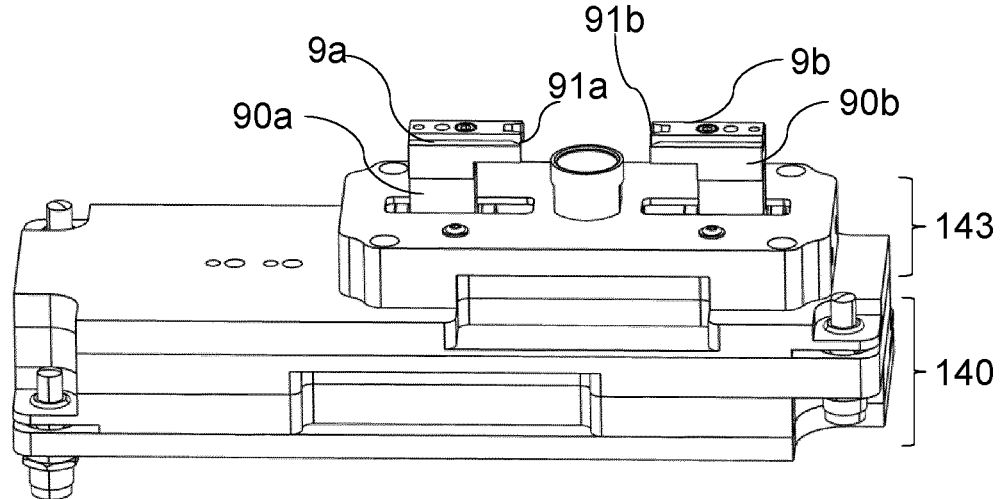
FIG. 14-15 schematically show a perspective view of the tool assembly in another embodiment.
Figure 15:
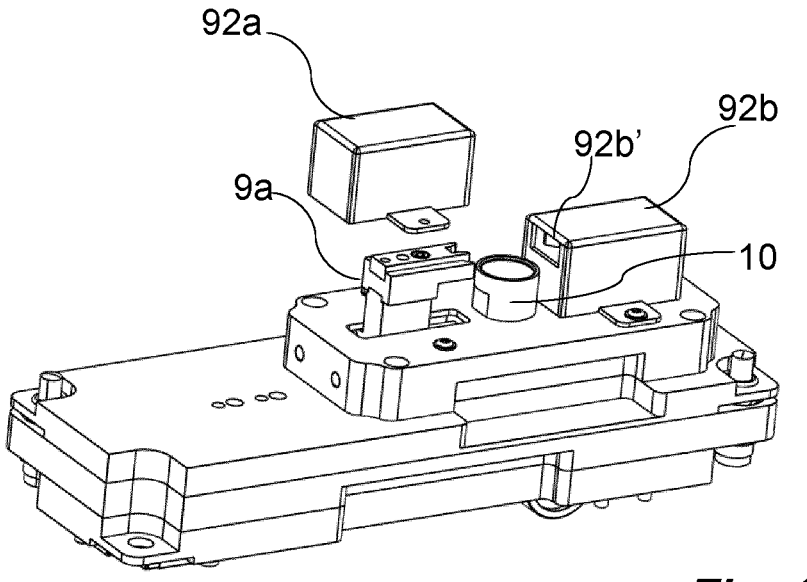

In a third embodiment of the actuated assembly, as shown in FIGS. 14-15, the tool assembly comprises a first gripper 9a and a second gripper 9b. In this embodiment, the base 14 is fixedly attached to the first connector 3a, and movable relative to the second connector 3b in the X-axis direction as mentioned above. In one example, at least one of the first gripper 9a and the second gripper 9b is configured to protrude from the base 14 in a Z-axis direction; and the other one of the first or second gripper 9a, 9b is movable relative to the base 14 along the X-axis. The first gripper 9a comprises a first gripper surface 91a; and the second gripper 9b comprises a second gripper surface 91b. The first gripper surface 91a and the second gripper surface 91b are facing each other in the X-axis direction. The first gripper 9a comprises a first gripper body 90a, and the second gripper 9b comprises a second gripper body 90b.

In one example, as shown in FIG. 14, the first gripper body 90a comprises a first portion and a second portion. The first portion of the first gripper body 90a extending along the Z-axis direction between a first end and a second end. The second portion of the first gripper body 90a extending along the X-axis direction between a first end and a second end. The second end of the first portion of the first gripper body 90a is connected to the first end of the second portion of the first gripper body 90a. The first gripper surface 91a is fixed to the second end of the second portion of the first gripper body 90a. In a preferred example, the first end of the first portion of the first gripper body 90a is directly or indirectly fixed to the second end 52 of the linear actuator 5 (not shown) in the X-axis direction. The second gripper body 90b comprises a first portion and a second portion. The first portion of the second gripper body 90b extending along the Z-axis direction between a first end and a second end. The second portion of the second gripper body 90b extending along the X-axis direction between a first end and a second end. The second end of the first portion of the second gripper body 90b is connected to the first end of the second portion of the second gripper body 90b. The second gripper surface 91b is fixed to the second end of the second portion of the second gripper body 90b. In one example, the first end of the first portion of the second gripper body 90b is directly or indirectly fixed to the base 14, so that the second gripper 9b is fixedly attached to the base 14.

In this example, the tool assembly is not necessary to be arranged with the actuated assembly; since the first gripper 9a is attached to the linear actuator 5 and the second gripper 9b is attached to the base, when the linear actuator 5 is moved, together with the second carriage 2b via the second connector 3b, towards the second gripper 9b in the X-axis direction, the first gripper surface 91a will also linearly move towards the second gripper surface 91b, so that a component can be gripped between the first and the second gripper surface 91a, 91b. In this example, the tool assembly doesn't need to comprise the driver on the linear actuator 5; and the actuated assembly doesn't need to comprise the driven member matched with the driver.

Alternatively, the first gripper body can be formed as a rod extending along the Z-axis or inclining along both the Z-axis and the X-axis between a first end and a second end; the second gripper body can be formed as a rod extending along the Z-axis or inclining along both the Z-axis and the X-axis between a first end and a second end. The first end of the first gripper is attached to the linear actuator; and the first end of the second gripper is attached to the base. The first gripper surface is arranged on the second end of the first gripper body; and the second gripper surface is arranged on the second end of the second gripper body.

The base 14 in this embodiment comprises a first base portion 140 and a second base portion 143. The first base portion 140 is similar to the first base portion 40 used in the first and second embodiments of the actuated assembly. The linear actuator 5 is movable along the X-axis relative to the first base portion 140 as mentioned in the first and the second embodiments. In a preferred example, the linear actuator 5 and the actuated assembly are positioned between the first base portion 140 and the second base portion 143 in the Z-axis direction, so that the second base portion 143 can provide a function of covering as mentioned above.

Further, as shown in FIG. 15, the tool assembly optionally comprises a cover set 92a, 92b for covering the first and the second grippers 9a, 9b. In one example, the cover set comprises a first cover 92a and a second cover 92b. The first cover 92a is configured to cover the first gripper 9a, and the second cover 92b is configured to cover the second gripper 9b. In the example as shown in FIG. 15, the first cover 92a may cover the second portion of the first gripper body 90a; and the second cover may cover the second portion of the second gripper body 90b. The first cover 92a, may comprise a first cover opening; and the second cover 92b may comprise a second cover opening; such as the second opening 92b' as shown in FIG. 15. The first and the second gripper surface 91a, 91b can extend out from the first and the second cover 92a, 92 through the first cover opening and the second cover opening respectively.

Figure 16A:
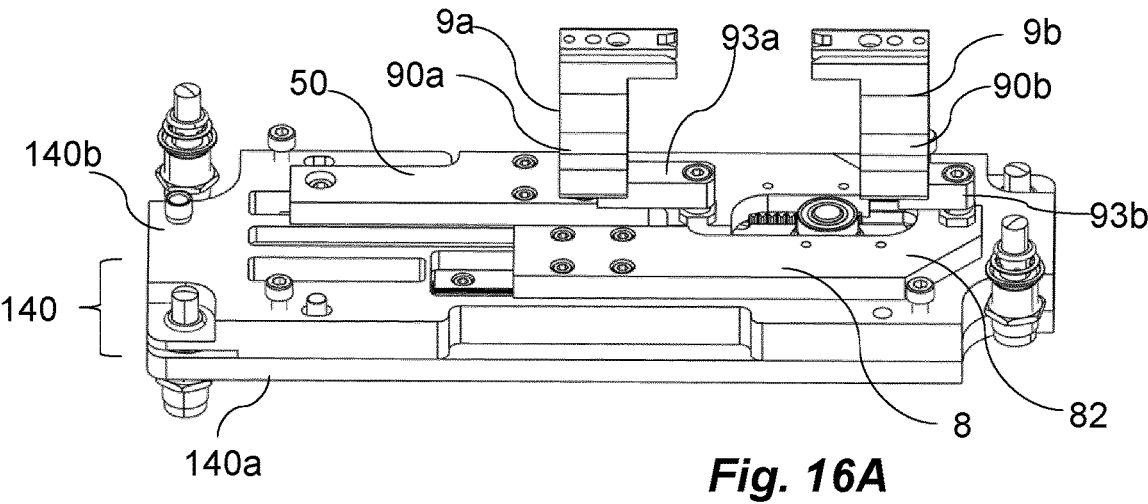
FIGS. 16A-16B schematically show a perspective view and a top view of a partially disassembled tool assembly of FIG. 14.
Figure 16B:
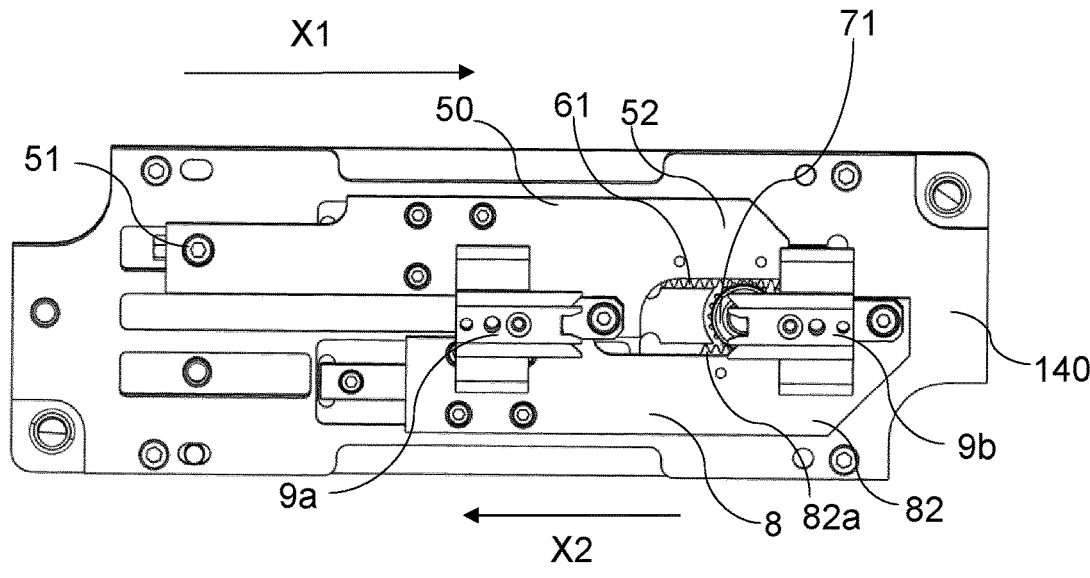

In another example, the first and second gripper 9a, 9b can both be configured to move relative to the base 14 in the X-axis direction. For example, the tool assembly may be arranged with the actuated assembly, preferably with the linear actuator follower, in this case; the first end of the first portion of the first gripper body 90a can be directly or indirectly fixed to the second end 52 of the linear actuator 5; and the first end of the first portion of the second gripper body 90b can be directly or indirectly fixed to the second end 82 of the linear actuator follower 8 (the linear actuator follower 8 has been described in detail in the second embodiment of the actuated assembly above), as shown in FIG. 16A-16B. The translational motion of linear actuator follower 8 causes the second gripper 9b move towards the first gripper 9a.

In one example, the tool assembly comprises a first connecting element 93a, an exemplified first connecting element 93a extending along the X-axis between a first end and a second end, the first end of the first connecting element 93a is attached to the second end 52 of the linear actuator 5; the second end of the first connecting element 93a is attached to the first end of the first portion of the first gripper body 90a. Similarly, an exemplified second connecting element 93b extending along the X-axis between a first end and a second end, the first end of the second connecting element 93*b* is attached to the second end 82 of the linear actuator follower 8; the second end of the second connecting element 93*b* is attached to the first end of the first portion of the second gripper body 90*b*, as shown in FIG. 16A.

It should be noted that, alternatively, the first connecting element can be integral with or releasably attached to the linear actuator, for example, with the second end of the linear actuator. The second connecting element can be integral with or releasably attached to the linear actuator follower, for example, the second end of the linear actuator follower. Also, the first gripper body can be integral with or releasably attached to the linear actuator, for example, with the second end of the linear actuator. The second gripper body can be integral with or releasably attached to the linear actuator follower, for example, the second end of the linear actuator follower.

In the example as shown in FIG. 16A-16B, as mentioned above in the second embodiment of the actuated assembly, the actuated assembly may comprise a driven member, such as the rotator 7. The rotator 7 may comprise a cogwheel 71 as the driven member. The linear actuator 5 may comprise a driver on the second end 52 of the linear actuator 5. The driver in this example comprises the set of rachet teeth 61. The linear actuator follower 8 in this example comprises the plurality of ratchet teeth 82*a*. In this example, the cogwheel 71 is meshed with both the set of rachet teeth 61 and the plurality of ratchet teeth 82*a*. The linear actuator 5 can move relative to the base 14 in the X-axis direction when the second carriage 2*b* move relative to the first carriage 2*a* as mentioned above. When the linear actuator 5 moves along the X-axis in the X1 direction relative to the base 14 (or only the first base portion 140 can be seem in FIG. 16A), such linear movement will cause the cogwheel 71 to rotate in the clockwise direction. The rotation of the cogwheel 71 will then cause the linear actuator follower 8 to linearly move along the X-axis in the X2 direction relative to the first base portion 140 of the first base portion 140 in the shown example.

The first gripper 9*a* is moved in the X1 direction together with the linear actuator and the second gripper 9*b* is moved in the X2 direction together with the linear actuator follower 8, so that the first gripper surface 91*a* and the second gripper surface 91*b* are therefore linearly moved towards each other in the X-axis direction, so that a component can be gripped between the first and the second gripper surface 91*a*, 91*b*.

Figure 17:
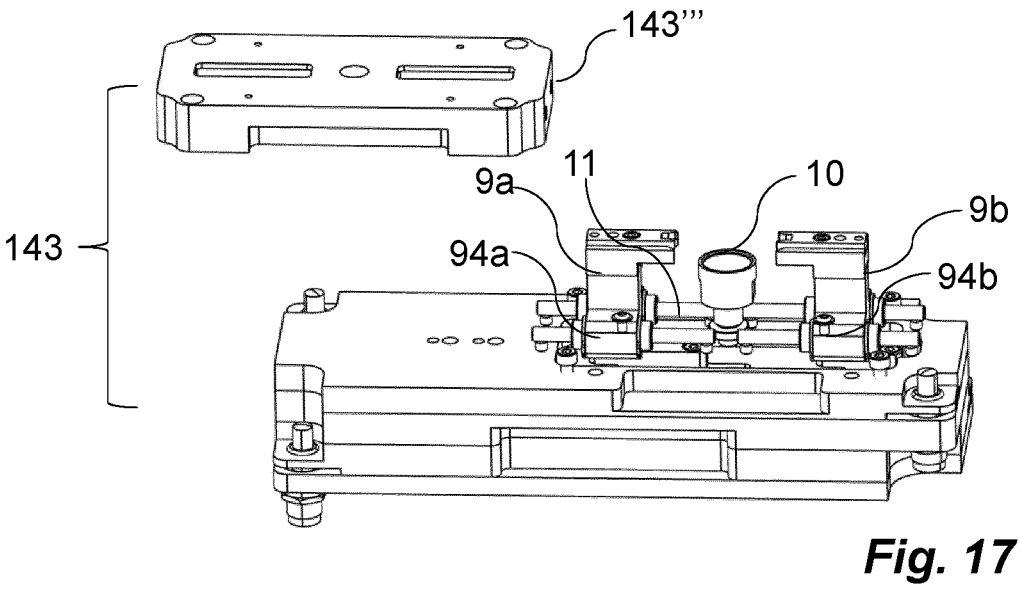
FIG. 17 schematically shows a perspective view of the tool assembly in another embodiment.
Figure 18:
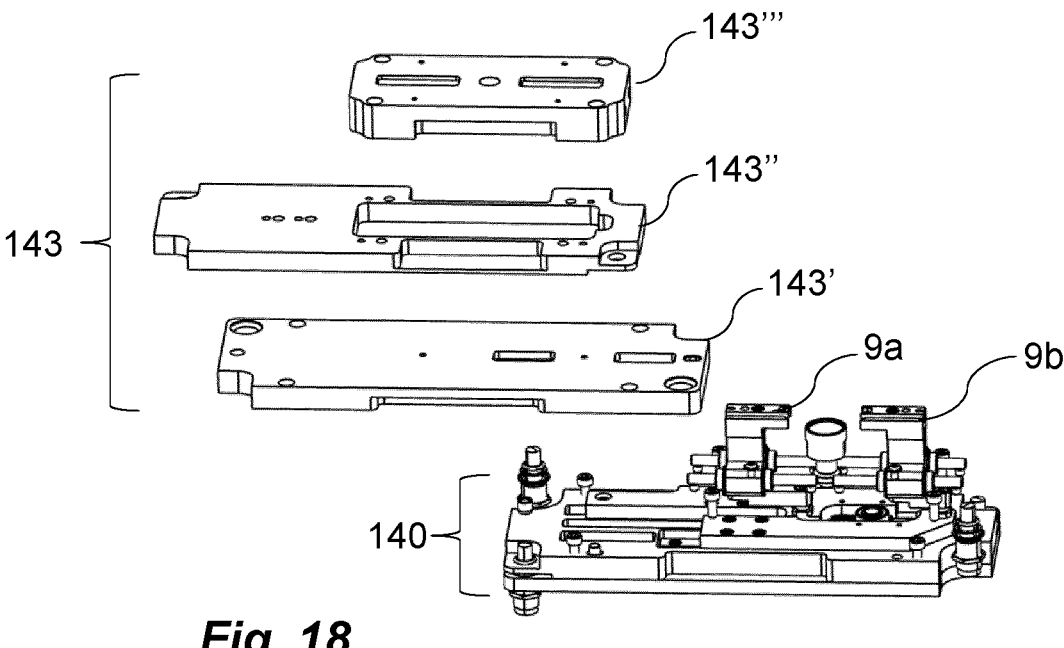
FIG. 18 schematically shows perspective views of the tool assembly of FIG. 17; and an exploded view of the second base portion of FIG. 17.

Also, in another example, the base optionally comprises a gripping support 10 for supporting a component that will be gripped between the first and the second gripper surface. The gripping support 10 may be fixed to the base, for example, fixed to the second base portion as shown in FIG. 17; or the gripping support can be fixed with the spinner of the rotator or another, e.g. motor driven, spinner unit, so that the gripping support can rotate the component that is placed on it. In the former example, the gripping support can make the gripping on the component be more stable, and the latter example may be suitable for a component that needs to be processed. For example, the first and the second gripping surfaces may comprise blades, so that the component can be, for example, ground evenly on the tool assembly.

The gripping support 10 may be arranged between the first and the second gripper surface in the X-axis direction and offset in the Z-axis direction relative to the first and the second gripper surface.

Further, the base optionally comprises a gripper guide rail 11 as shown in FIG. 17. In this example, the first and second gripper 9*a*, 9*b* comprise a first rail connector 94*a* and a second rail connector 94*b* respectively. The gripper guide rail 11, in one example, extends along the X-axis. The guide rail 11 is preferably formed by two cylinders. The first rail connector 94*a* can be attached to the first gripper body 90*a*, or can be an integral part of the first gripper body 90*a*. The first rail connector 94*a* is attached to the gripper guide rail 11, and slidable in the X-axis direction on the gripper guide rail 11. In a preferred example, the first rail connector 94*a* comprises two ring shaped portions, and each of the two ring shaped portions is configured to surround one of the cylinders of the gripper guide rail 11. The second rail connector 94*b* is attached to the second gripper body 90*b* or can be an integral part of the second gripper body 90*b*. The structure of the second rail connector 94*b* is identical to the first rail connector 94*a*. Alternatively, the connection between the first and the second rail connectors and the gripper guide rail can be formed by grooves and ridges facing each other in the Y-axis direction.

In another example, the first gripper 9*a* comprises the first rail connector 94*a*, and the second gripper 9*b* does not comprise the second rail connector 94*b*; especially if only the first gripper is configured to move relative to the base 140 and the second gripper is fixedly attached to the base 140. Also, in another example, the gripper guide rail 11 may incline in both the X-axis direction and the Y-axis direction, depending on the design of a moving path for the at least the first and the second gripper.

The gripper guide rail 11 can support at least one of the first gripper 9*a* and the second gripper 9*b*, especially the first gripper 9*a* and/or the second gripper 9*b* that is movable in the X-axis direction. In one example, as shown in FIG. 17, the gripper guide rail 11 is fixed to the second base portion 143; in the example that the first gripper 9*a* is fixed to the second end of the linear actuator 5, the gripper guide rail 11 can bear a weight of the first gripper 9*a* in the Z-axis direction. In the example that the tool assembly is placed on the first and the second carriages 2*a*, 2*b*, the linear actuator 5 doesn't need to bear a normal force created by the weight of the first gripper 9*a*; therefore, the friction between the linear actuator 5 and the first base portion can be reduced. In the example that the first and the second carriages are used in a hanging carriage guide rail system, the linear actuator 5 doesn't need to bear the weight of the first gripper 9*a*; therefore, such weight of the first gripper 9*a* will not pull and bend the linear actuator 5 in the Z-axis direction. In the example that the second gripper 9*b* is fixed to the linear actuator follower 8, the gripper guide rail 11 can again bear a weight of the first gripper 9*a* in the Z-axis direction. Similar as previously mentioned, in the example that the tool assembly is placed on the first and the second carriages 2*a*, 2*b*, the linear actuator follower 8 doesn't need to bear a normal force created by the weight of the second gripper 9*b*; therefore, the friction between the linear actuator follower and the first base portion can be reduced. In the example that the first and the second carriages are used in a hanging carriage guide rail system, the linear actuator follower 8 doesn't need to bear the weight of the second gripper 9*b*; therefore, such weight of the second gripper 9*b* will not pull and bend the linear actuator follower in the Z-axis direction.

The gripper guide rail 11 can also provide a flexibility to design a relative movement between the first gripper 9*a* and the second gripper 9*b*, for example, the relative movement between the first gripper 9*a* and the second gripper 9*b* may be a movement in the Y-axis direction, or a movement in both the X-axis direction and the Y-axis direction. Such relative movement between the first gripper 9*a* and the second gripper 9*b* can be designed by a selected position and/or direction of the gripper guide rail 11. It should be noted that, for keeping the gripping function, the first gripper surface 91a has to face to the second gripper surface 91b, even the relative movement between the first gripper 9a and the second gripper 9b may be varying.

In this example, the first or the second base portion may comprise a part that can carry and/or receive the gripper guide rail arrangement. One example can be found in FIG. 18. The second base portion 143 may comprise three plate shaped components arranged adjacent to one another; each plate shaped component comprises one or two slots for allowing the first and the second gripper body to protrude through and slide relative to the second base portion 143. One plate shaped component of the three plate shaped components comprises a support surface that the gripper guide rail can be placed on; another plate shaped component of the three plate shaped components comprises an opening that is able to receive the gripper guide rail; preferably, such plate shaped component is placed on the layer with the support surface; the other plate shaped component of the three plate shaped components comprises is configured to cover both the gripper guide rail and the first and the second rail connectors, preferably, such plate shaped components is placed on the plate shaped components with the opening or the plate shaped component with the support surface.

It should be noted that the above mechanism and the arrangement is also applicable when the tool assembly is constructed with the linear actuator 5' spaced apart from the base 4', and the actuated assembly comprising a extending element 13, preferably with the driver 6', as shown in FIG. 25-31.

FIGS. 19-24 and FIG. 29-30 illustrate two examples for carrying out an operation of the actuated assembly in a fourth embodiment of the actuated assembly; in this embodiment, the first and the second connector 3a; 3a', 3b; 3b', the base, the linear actuator 5; 5', and the connection thereof are similar as described in the first embodiment of the actuated assembly. The actuated assembly in the fourth embodiment comprises a driven member; the driven member is configured to be in contact with a driver attached to the second end 52 of the linear actuator 5 or attached to the extending element 13.

In one example, the driver 16; 26 used in the fourth embodiment of the actuated assembly comprises an inclined surface 162; 261 extending in the X-axis direction and the Z-axis direction between a first end 162a; 261a and a second end 162b; 261b. The second end 162b; 261b; (shown in FIG. 21B and FIG. 24) is offset relative to the first end 162a; 261a in the X-axis direction and the Z-axis direction.

Figure 19:
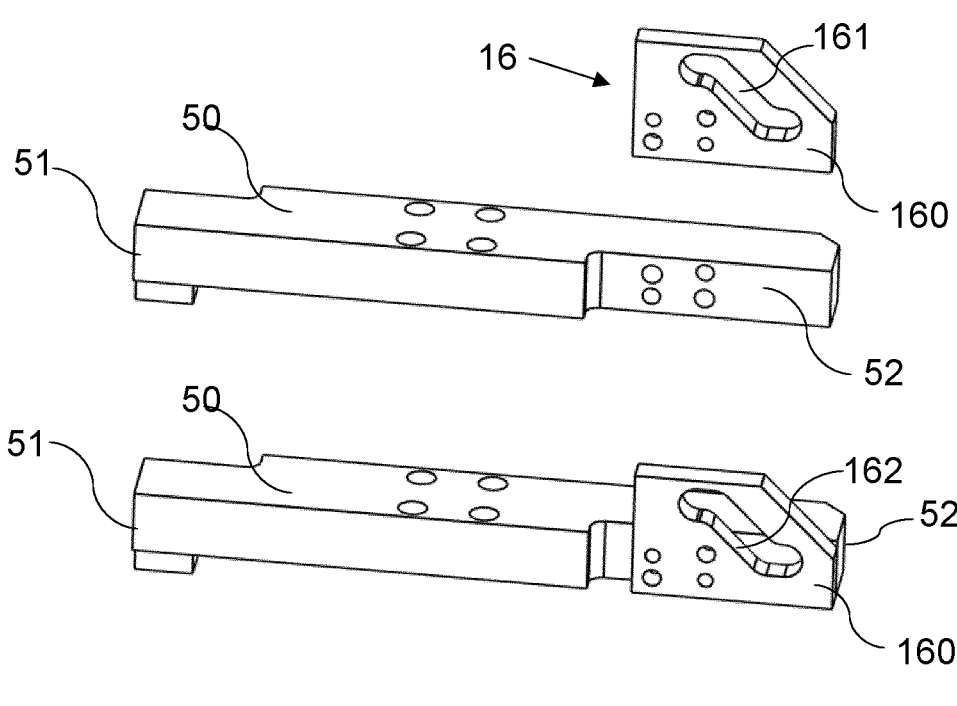
FIG. 19 schematically shows a perspective view of another embodiment of a driver attached to the linear actuator of FIG. 8.

In one example, the driver 16 comprises a driver body 160 fixedly attached (e.g. releasably attached/non-releasably attached or an integral part of the second end 52 of the linear actuator 5) to the second end 52 of the linear actuator 5. The driver body 160 comprises a guide track 161. The guide track 161 can be formed by cut-out or a recess. The cut-out or recess comprises an opening facing in the direction of the Y-axis. The inclined surface 162 forms a part of the guide track 161, as shown in FIG. 19.

Figure 20:
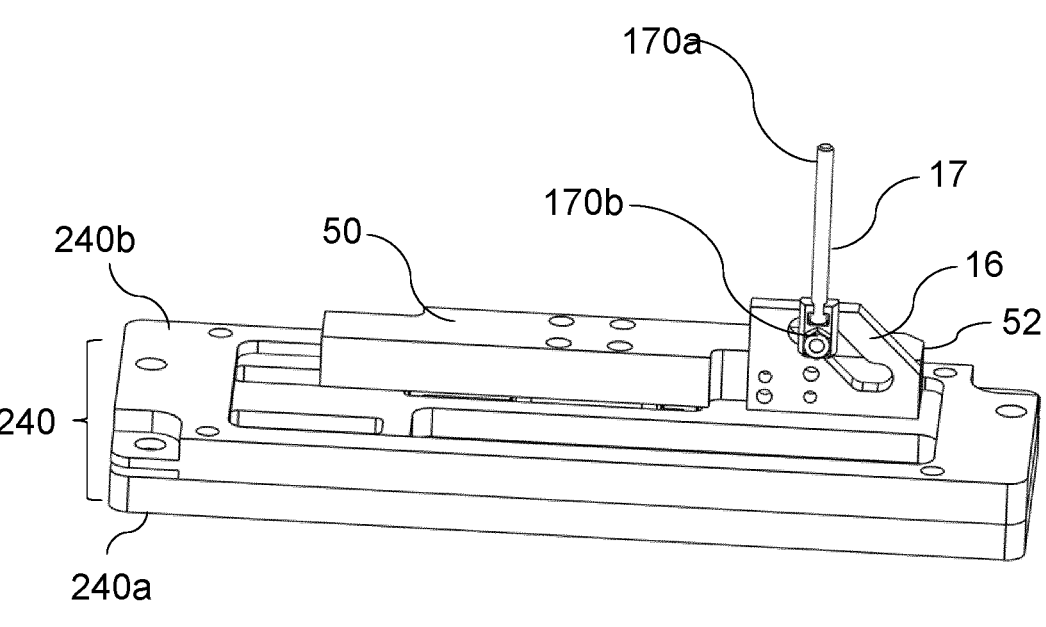
FIG. 20 schematically shows a perspective view of the linear actuator of FIG. 19, the driver of FIG. 19, an exemplified first base portion of a base, and a elevating member.
Figure 24:
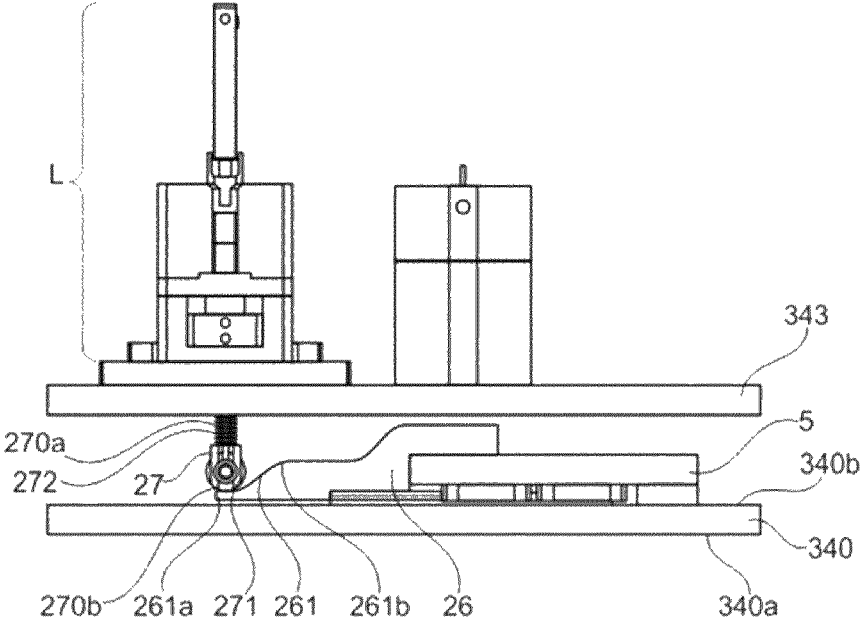
FIG. 24 schematically shows a side view of another example of a driver attached to the linear actuator of FIG. 8; and another example of the actuated assembly for the tool assembly of FIG. 4.

The actuated assembly in this embodiment comprises an elevating member 17; 27 as shown in FIGS. 20 and 24. The actuated assembly in this embodiment is configured to output a translational motion in the Z-axis direction by the elevating member 17; 27 when the linear actuator 5 moves relative to the base 24, 34.

In one example, the elevating member 17; 27 extends along the Z-axis between a first end 170a, 270a and a second end 170b, 270b, as shown in FIG. 20 and FIG. 24. The driven member 171; 271 of the actuated assembly is arranged on the second end 170b; 270b of the elevating member 170; 270. The driven member 171; 271 engages with the inclined surface 162; 261, and the driven member 171; 271 is configured to move along the inclined surface 162; 261 from the first end to the second end of the inclined surface 162, 261.

The elevating member 17; 27 is immovable in the X-axis direction relative to the base; preferably, the elevating member is also immovable in the Y-axis direction relative to the base; So that the elevating member 17; 27 can provide a linear movement in the Z-axis direction when the second carriage 2b linearly moves along the X-axis relative to the first carriage 2a.

For example, the elevating member may be blocked in the X-axis direction by a part of the first base portion or a part of the second base portion, or a manufacturing/assembling robot or tool other than the tool assembly of this present disclosure. Also, in the case that the elevating member being blocked in the Y-axis direction, the elevating member may be blocked by a part of the first base portion or a part of the second base portion, or a manufacturing/assembling robot or tool other than the tool assembly of this present disclosure. In an example as shown in FIG. 22, the base 24 comprises a first base portion 240 and a second base portion 243. The first base portion 240 is similar to the first base portion in the first embodiment of the actuated assembly.

For example, the first base portion 240 may comprise a slot; the support 51a of the linear actuator 5 is configured to protrude though the slot. The second base portion 243 comprises a base opening 244.

The base opening 244 is arranged on the second base portion 243 as a through hole, in the presented example in FIG. 22, the base opening 244 is a circular shaped through hole, but the base opening can also be formed in other shape, such as oval, rectangular or square. The second base portion 243 may comprise a generally flat surface parallel to the XY-plane, the base opening 244 can be arranged on such flat surface as shown in FIG. 22. However, the second base portion 243 may also comprise a surface with convex and/or concave relative to the XY-plane.

When the actuated assembly is attached to the base 24, between the first base portion 240 and the second base portion 243 in the Z-axis direction, the first end 170a of the elevating member 17 is protruding through the base opening 244. Preferably, a shape of an inner contour of the base opening 244 is matched with a shape of an outer contour of a part of the elevating member 17, so that the base opening 244 closely surrounds the part of the elevating member 17 and therefore blocks the movement of the elevating member 17 in the X-axis direction relative to the second base portion 243 and the Y-axis direction relative to the second base portion 243.

Blocking the elevating member both in the X-axis direction relative to the base and the Y-axis direction relative to the base reduces the force transferred from the linear actuator, via the driver and the driven member, to the elevating member being derived to multiple directions; so that the elevating member in this example may be suitable for pushing on/lifting a ridge or heavy component.

In a preferred example, the linear actuator 5 and the actuated assembly are positioned between the first base portion 240 and the second base portion 243 in the Z-axis direction, so that the second base portion 243 can provide a function of covering as mentioned above. In a preferred example, the elevating member 17, 27 is arranged between the first base portion 240, 340 and the second base portion 243, 243.

In one example, the driven member 171 comprises the guide track 161, as shown in FIG. 21B. The driven member 171 protrudes in the Y-axis direction, as shown in FIG. 21A. When the elevating member 17 is attached to the driver 16, the driven member 171 at least partially protrudes into the cut-out or the recess of the guide track 161. The base 24 in this embodiment is fixedly attached to the first connector 3a in the X-axis direction and movable relative to the second connector 3b in the X-axis direction as mentioned above.

Figure 23:
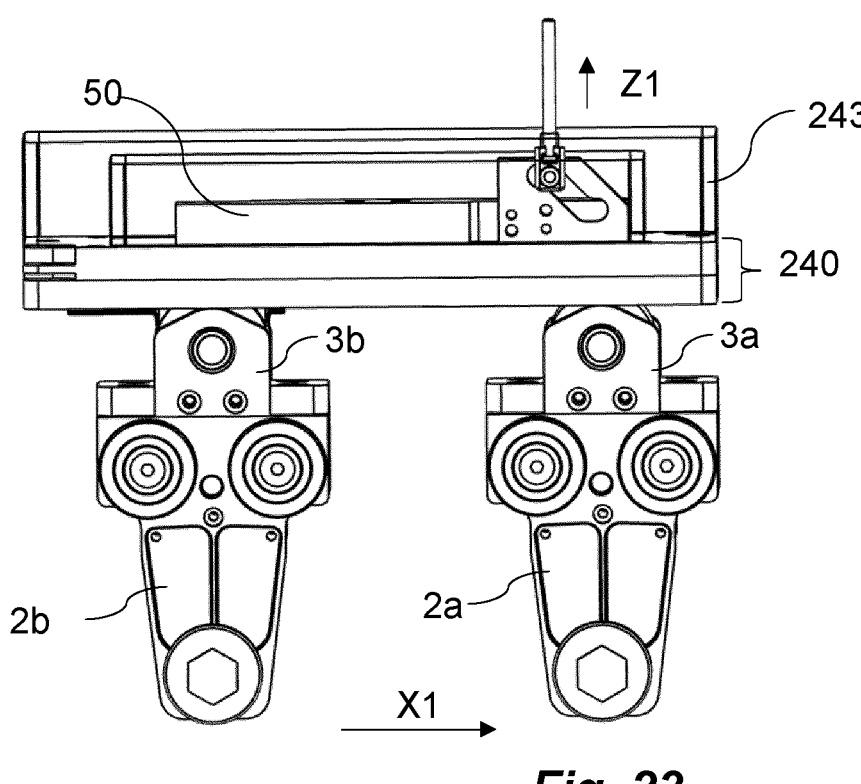
FIG. 23 schematically shows a side view of the tool assembly comprising the actuated assembly of FIGS. 20-22, the tool assembly is attached to the first carriage of FIG. 2 by the first connector of FIG. 3 and attached to the second carriage of FIG. 2 by the second connector of FIG. 3.

When the guide track 161 and the inclined surface 162 move in the X1 direction together with the linear movement of the linear actuator 5, the second connector 3b and the second carriage 2b, as shown in FIG. 23 (the second carriage 2b is moving relative to the first carriage 2a in X1 direction), the driven member 171 is moved from the first end 162a to the second end 162b That's because the elevating member 17 is immovable relative to the base 24 in the X-axis direction, so that the driven member 171 and the elevating member 17 can therefore only move in the Z-axis direction (in this example, the elevating member 17 and the driven member 171 is moved in the Z1 direction) when the inclined surface 162 moves in the X axis direction together with the linear actuator 5, the second connector 3b, and the second carriage 2b.

In another example, as shown in FIG. 24, the driver 26, as mentioned above, is fixedly arranged on the second end 52 of the linear actuator 5. The driver 261 comprises the inclined surface 261 but doesn't have a guide track. The elevating member 27 is similar to that previously mentioned, but since the driver 261 in this example doesn't have a guide track, the driven member 271 doesn't need to protrude in the direction of Y-axis. The driven member 271 in this example can be simply the second end 270b of the elevating member 27.

The base in this embodiment is fixedly attached to the first connector 3a in the X-axis direction and movable relative to the second connector 3b in the X-axis direction; and the first base portion 340 extends along the Z-axis, as mentioned above.

The elevating member 27 in this example is immovable in the X-axis direction relative to the base (only the first and the second base portions 340, 343 are shown in FIG. 24), and optionally is also immovable in the Y-axis direction relative to the base as mentioned above. When the driver 26 and the inclined surface 261 move in the X-axis direction as previously mentioned, together with the linear movement of the linear actuator 5, the second connector 3b and the second carriage 2b, the driven member 271 is moved from the first end 261a to the second end 261b; and since the elevating member 27 is immovable relative to the base in the X-axis direction, the driven member 271 and the elevating member 27 can therefore only move in the Z-axis direction.

The second base portion 343, in this example, doesn't comprise a base opening. Instead, the second base portion 343 may comprise a block. The block can be formed by two protrusions aligned in the X-axis direction. The two protrusions are spaced apart from each other in the X-axis direction. The first end 270a of the elevating member 27 is arranged between such two protrusions in the X-axis direction. In another example, the block can be a recess arranged on the second base portion and faced to the first end 270a of the elevating member 27 in the Z-axis direction. Such recess may be circular, oval, rectangular and/or triangle; also the recess comprise an inner contour; the inner contour is adjacent to the first end 270a of the elevating member 27 in the X-axis direction when the first end 270a of the elevating member at least partially protrudes into the recess. In a preferred example, the shape and the size of the recess are depending on the shape of the elevating member 27, especially the shape of the first end 270a of the elevating member 27. In this example, the first end 270a of the elevating member 27 at least partially protrudes into such recess; and the first end 270a of the elevating member 27 is closely enclosed by the inner contour of the recess. The movement of the elevating member 27 in the X-axis direction relative to the base can therefore be blocked by the block of the second base portion 343. In this example, the second base portion may act as an elevating plate in the production line, such as shown in FIG. 24. A load L, e.g. a component or a sub-assembly of a product, can be placed on the second base portion, and can be elevated or lowered when the second carriage 2b linearly moves along the X-axis on the carriage guide rail 1 relative to the first carriage 2a.

The elevating member 27 optionally comprises a spring 272 arranged between the second base portion 343 and the second end 270b of the elevating member 27. Preferably, the spring is a compression spring, and preferably the spring is configured to always keep the second end 270b of the elevating member engaged with the inclined surface 261.

It should be noted that, instead of arranging the inclined surface 162, 261 as a part of the driver 16, 26 attached to the second end 52 of the linear actuator 5, the inclined surface may also be arranged as a part of the driven member. In this example, the second end 170b, 270b of the elevating member 17, 27 comprise an inclined surface extending in both the X-axis direction and the Z-axis direction between a first end and a second end; the first end of the inclined surface is offset relative to the second end of the inclined surface in both the X-axis direction and the Z-axis direction.

In this example, the second end 52'; 52" of the linear actuator 5' may act as the driver without attaching extra component; or the linear actuator may, as mentioned above. The driver in this example can be fixed to the extending element 13 of the actuated assembly. The driver can be formed with a ball shaped, oval shaped, rectangular head part configured to engage with the inclined surface on the second end 170b, 270b of the elevating member 17, 27. As mentioned above, when the linear actuator 5' moves in the X-axis direction relative to the base and also the elevating member 17, 27, the driver will move along the inclined surface on the second end 170b, 270b from the first end to the second end of the inclined surface. The elevating member 17, 27 is immovable in the X-axis direction as mentioned above, so that when the head part of the driver moves along the inclined surface on the second end 170b, 270b from the first end to the second end of the inclined surface, the elevating member 17, 27 will move in the Z-axis direction relative to the base as mentioned above.

Figure 29:
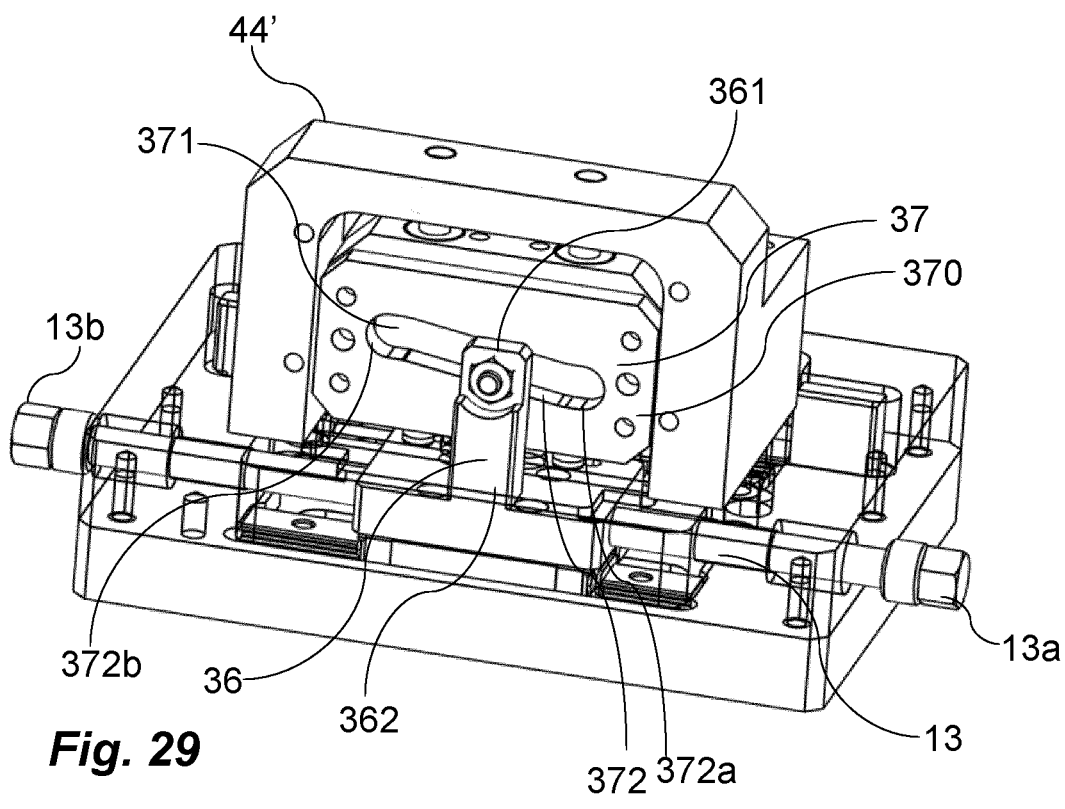
FIGS. 29-30 schematically show perspective views of the tool assembly of FIGS. 25-26 with an actuated assembly in another embodiment.
Figure 30:
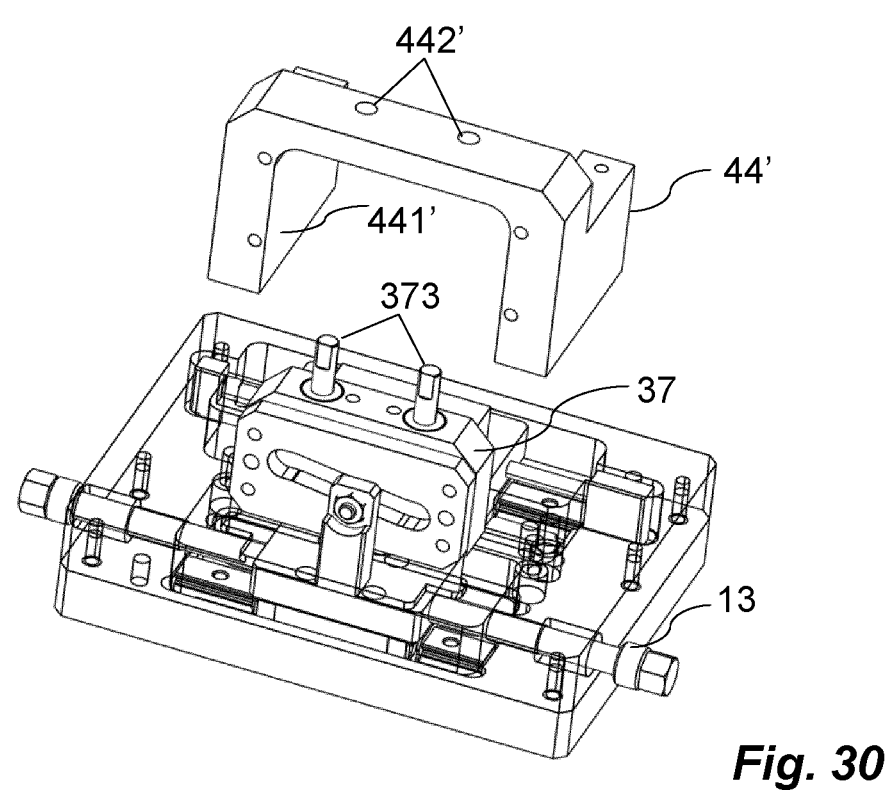

In another example, as shown in FIG. 29-30, the inclined surface 372 is a part of the elevating member 37. The elevating member 37 in this example will also act as the driven member of the actuated assembly. The driver 36 is fixed to the extending element 13. The driver 36 extends in the Z-axis direction between a first end 361 and a second end 362. In a preferred embodiment, the extending element 37 comprises a guide track 371 and the inclined surface 372 is a part of the guide track 371. The first end 361 of the driver 36 is at least partially arranged within the guide track 371 and adjacent to the inclined surface 372. In this example, the base 4' comprises a block 44'. The block 44' can be arranged on a second base portion or as an independent element attached to the base 4'. In a preferred example, the block 44' comprises an inner frame 441' configured to at least partially enclose the extending element 37, so that a movement of the extending element 37 in the X-axis direction is blocked. As mentioned above, when the linear actuator 5' moves relative to the base 4' in the X-axis direction (together with the second carriage 2b), the extending element 13 will be pushed by the second end 52'; 52" of the linear actuator 5', so that the first end 361 of the driver 36 moves along the inclined surface 372, such that the elevating member 37 is therefore moved in the Z-axis direction.

The elevating member 37 may comprise a protrusion 373 as shown in FIG. 30, and the block 44' may comprise an opening 442', so that when the elevating member 37 moves in the Z-axis direction, the protrusion 373 will protrude from the opening 442'.

Also, the inclined surface can also be replaced by a cam surface for being either a part of the driver or a part of the driven member, depending on the demand of the manufacturing/assembling process.

It should be noted that the linear actuator 5' may comprises two or more actuator bodies 50'; 50". All of the actuator bodies 50'; 50" comprise a first end 51'; 51" and a second end 52'; 52". In this example, if the linear actuator 5' is attached to the carriage guide rail with multiple carriages with multiple bases 4' the linear actuator 5' is slidable relative to the bases. One of the second ends 52' of the linear actuator is configured to act on the extending element. The first extending element of the actuated assembly attached to one of the bases may be adjacent to a cogwheel of the actuated assembly, and the set of ratchet teeth on the driver of that actuated assembly is meshed with the cogwheel. Due to the mesh between the set of ratchet teeth and the cogwheel, the linear movement of the linear actuator causes the cogwheel and therefore the rotator 7 to rotate. On the other side of the linear actuator 5', the other base may comprise the actuated assembly with an inclined surface that is a part of the elevating member. The driver is fixed to the extending element. The driver extends in the Z-axis direction between a first end and a second end. When the linear actuator moves relative to the base in the X-axis direction, the extending element 13 will be pushed by another second end 52" of the linear actuator 5', so that the first end of the driver moves along the inclined surface, such that the elevating member is therefore moved in the Z-axis direction.

In other word, the linear actuator 5' comprises two or more actuator bodies 50'; 50" that can provide one or multiple actions to participate in the manufacturing/assembling process, and all of the actions provided by the tool assembly can be initiated by a relative linear movement between the carriage that the linear actuator 5' is attached to, and another two or more carriages on the carriage guide rail 1, preferably along the X-axis, by moving the linear actuator back and forth in the X-axis direction.

Because the linear actuator 5; 5' is configured to interact with one or more actuated assemblies or the tool sets received or carried by one or more base; and the linear actuator is also configured to control (by the multiple second ends of the linear actuator) one or more actions of the actuated assemblies or the tool sets received or carried by the base by the relative movement along the X-axis between the linear actuator and the one or more bases as mentioned above.

Further, the extending element 13 may comprise a compression spring or tension spring arranged between the extending element 13 and the base 4' in along the X-axis direction, so that when the linear actuator 5' contacts the extending element 13 to therefore initiate a rotational/translational motion of the actuated assembly carried by the base 4'; and when the linear actuator 5' moves away from the extending element 13, the extending element 13 will be moved to the original position by the spring and therefore generate a second rotational/translational motion of the actuated assembly.

In another example, as shown in FIGS. 37-40, the extending element 13' is configured to releasably attach to the linear actuator 5". It should be noted that, in this example, most of the components of the tool assembly are similar to those previously described, e.g. the connector, the driver, and the driven member. Furthermore, most of the structures of the base as described below are similar to the base 4' as previously described; most of the structures of the extending element 13' as described below are similar as the previously described extending element 13, and most of the structures of the linear actuator 5" as described below are similar to the previously described linear actuator 5'. Only a connection between the extending element 13' and the actuator body 50''' as described below is different to the previous description.

Figures 36, 37:
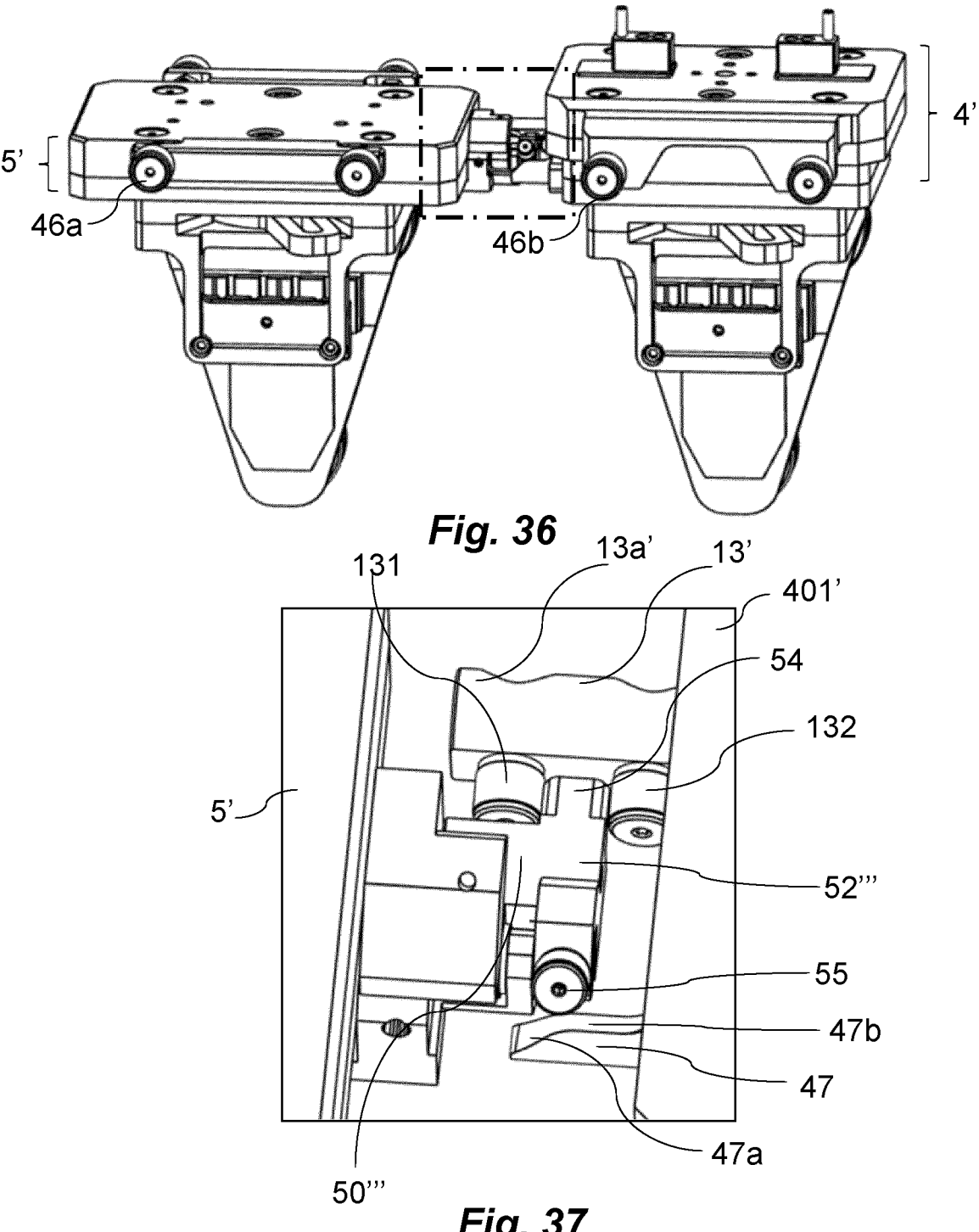
FIG. 36 schematically shows a perspective view of another example of the base attached to the first carriage of FIG. 2 and the linear actuator attached to the second carriage of FIG. 2.
FIG. 37 schematically shows a perspective view of a connection between the linear actuator of FIG. 36 and an extending element on the base of FIG. 36.

In this example, at least one of the first end or the second end of the extending element 13' protrudes from the first base portion 401' in the X-axis direction. The at least one of the first end or the second end of the extending element 13' that protrudes from the first base portion 401' (the first end 13a', as shown in FIG. 37, for example) comprises a first transverse protrusion 131 and a second transverse protrusion 132. In a preferred example, the first transverse protrusion 131 comprises a wheel rotatable around a central axis of the first transverse protrusion and the second transverse protrusion 132 comprises a wheel rotatable around a central axis of the first transverse protrusion. Optionally, the base 4' comprises a guide arm 47 extending in the direction of the X-axis. The guide arm 47 comprises a first surface 47a and a second surface 47b. In one example, the first surface is inclined relative to the XY-plane and the Z-axis; in another example, the first surface 47a is a curved surface and extends in the direction of the Z-axis from a position that is closer to the first connector 3a; 3a' to a position that is further away to the first connector in the direction of the Z-axis. In one example, the second surface is parallel to the XY-plane; in another example the second surface is formed between a first edge parallel to the Y-axis and a second edge parallel to the Y-axis, the first edge is offset relative to the second edge in the direction of the Z-axis; preferably, the second surface in this example is a curved surface curving between the first edge and the second edge.

Figure 40:
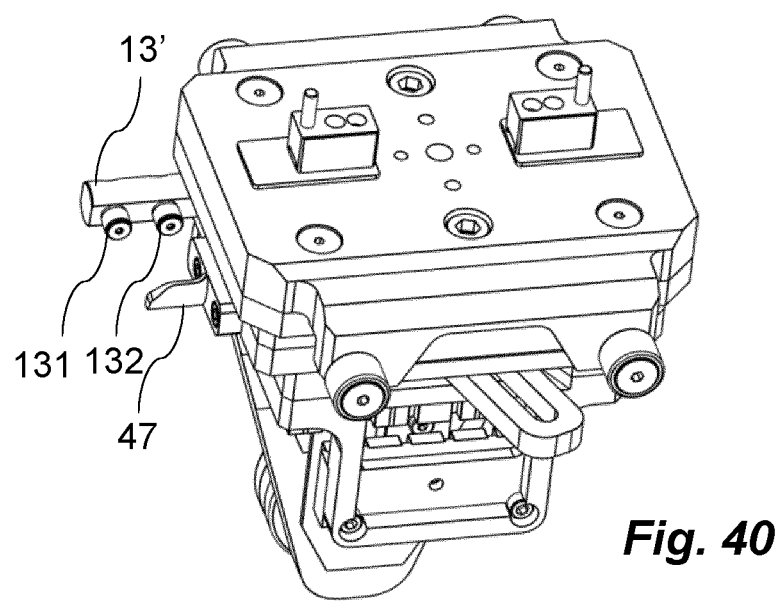
FIG. 40 schematically shows a perspective view of the extending element of FIG. 37 on the base of FIG. 36.

In one example where the base 4' comprises the guide arm 47, the first transverse protrusion 131 extends in the direction of the Y-axis towards the guide arm 47. The second transverse protrusion 132 extends in the direction of the Y-axis towards the guide arm 47. In one example where the extending element 13' comprises both the first transverse protrusion 131 and the second transverse protrusion 132, the first transverse protrusion 131 and the second transverse protrusion 132 are offset in the direction of the X-axis and are lined up in the direction of the Z-axis, as shown in FIG. 37 and FIG. 40.

Figure 39:
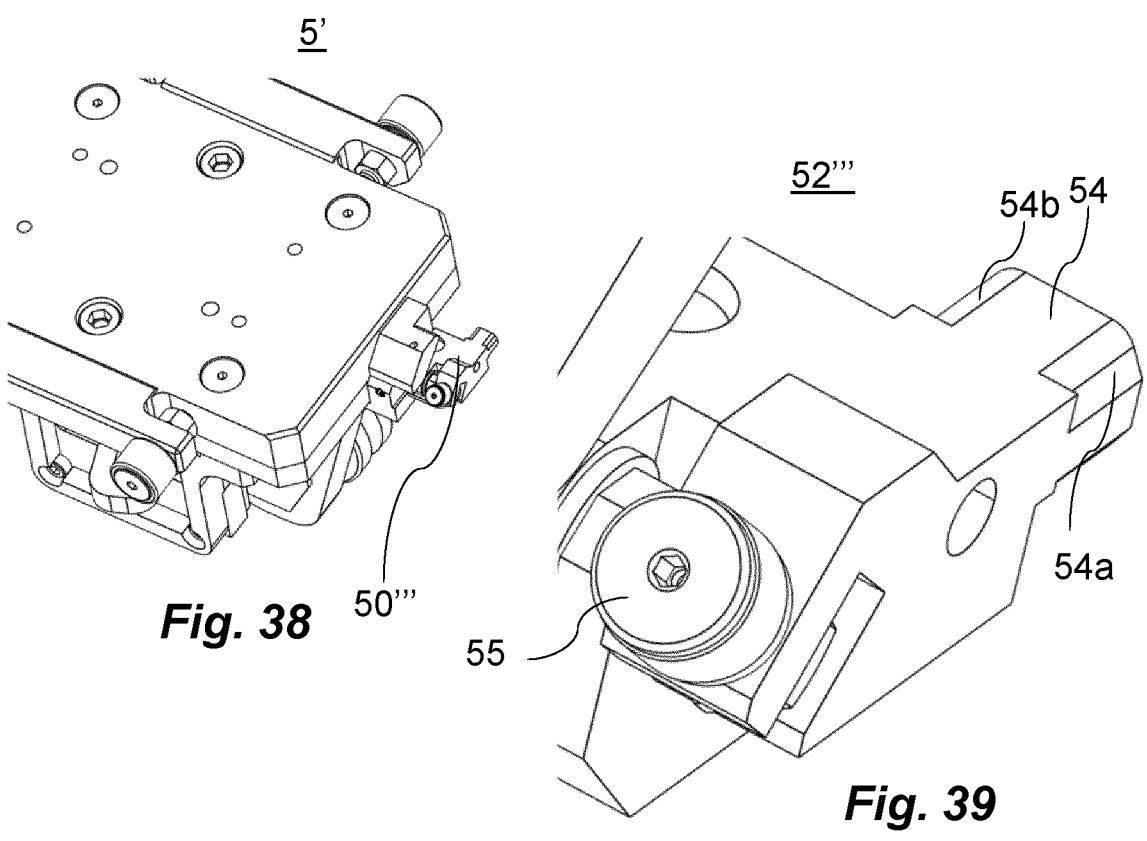

As shown in FIGS. 37-39, the second end 52''' of the actuator body 50''' comprises a first counter transverse protrusion 54 and optionally a guide protrusion 55. The first counter transverse protrusion 54 is configured to be situated between the first transverse protrusion 131 and the second transverse protrusion 132 in the direction of the X-axis, as shown in FIG. 37.

In a preferred example, the first counter transverse protrusion 54 comprises at least one of a first inclined surface 54a angled relative to the XY-plane and the Z-axis and facing towards the base 4'; and a second inclined surface 54*b* angled relative to the XY-plane and the Z-axis and facing towards the linear actuator 5'.

The optional guide protrusion 55 is configured to move along the first surface 47*a* of the guide arm 47 and the second surface 47*b* of the guide arm 47 when the linear actuator 5' moves towards the base 4' along the X-axis. In a preferred example, the guide protrusion 55 comprises a wheel rotatable around a central axis of the guide protrusion 55. In a preferred example, the guide protrusion 55 extends in a direction angled relative to both the XY-plane and the YZ-plane, as shown in FIG. 39.

In one example where the first transverse protrusion 131 comprises the wheel, when the linear actuator 5' moves towards the base 4', the first counter transverse protrusion 54 can move along with the wheel that is rotated by the first counter transverse protrusion 54, so that the either the base 4' or the linear actuator 5' can be moved in the direction of the Z-axis away from the first or second connector by an engagement between the first counter transverse protrusion 54 and the first transverse protrusion 131. Thereby, the first counter transverse protrusion 54 moves into a position between the first transverse protrusion 131 and the second transverse protrusion 132 in the direction of the X-axis. Thereby, the actuator body 50''' is attached to the extending member 13' in the direction of the X-axis, and the movement of the linear actuator 5' along the X-axis can thereby pull and push the extending member 13' via an engagement between the first counter transverse protrusion 54 and the first transverse protrusion 131, and an engagement between the first counter transverse protrusion 54 and the second transverse protrusion 132.

The actuator body 50''' can be detached from the extending member 13' in the direction of the X-axis by either move the linear actuator 5' in the direction of the X-axis with a predetermined velocity away from the base 4' or moving the extending member 13' into a stop position in the direction of the X-axis, namely, the movement of the extending member 13' in the direction of the X-axis towards the linear actuator 5' is blocked by a part of the base 4'. Thereby, the first counter transverse protrusion 54 can move along with the wheel that is rotated by the first counter transverse protrusion 54 in the direction of the X-axis away from the base 4', so that the either the base 4' or the linear actuator 5' can be moved in the direction of the Z-axis by an engagement between the first counter transverse protrusion 54 and the first transverse protrusion 131, so that the linear actuator 5' moves apart from the base 4'.

The first inclined surface 54*a* and the second inclined surface 54*b* are configured to make the movement of the base 4' or the linear actuator 5' in the direction of the Z-axis away from the first or the second connector by the first counter transverse protrusion 54 and the first transverse protrusion 131 easier, as the first inclined surface 54*a* and the second inclined surface 54*b* both have elevations in the direction of the Z-axis. In one example where the first inclined surface 54*a* and the second inclined surface 54*b* are facing in a direction away from the second connector 3*b*; 3*b'* in the direction of the Z-axis, as shown in FIG. 39, the base 4' is configured to be lifted in the direction of the Z-axis by the engagement between the first counter transverse protrusion 54 and the first transverse protrusion 131. This enables attachment and detachment of the linear actuator 5' from the base 4'.

The guide arm 47 and the guide protrusion 55 are configured to make the movement of the base 4' or the linear actuator 5' in the direction of the Z-axis by the first counter transverse protrusion 54 and the first transverse protrusion 131 easier, as the guide arm 47 extends in the direction of the Z-axis. In one example where the first surface 47*a* is the curved surface and moves in the direction of the Z-axis from the position that is closer to the first connector 3*a*; 3*a'* to the position that is further away to the first connector in the direction of the Z-axis, the base 4' is configured to be moved in the direction of the Z-axis away from the first or the second connector by the engagement between the first counter transverse protrusion 54 and the first transverse protrusion 131. This enables attachment and detachment the linear actuator 5' from the base 4'.

Figure 41:
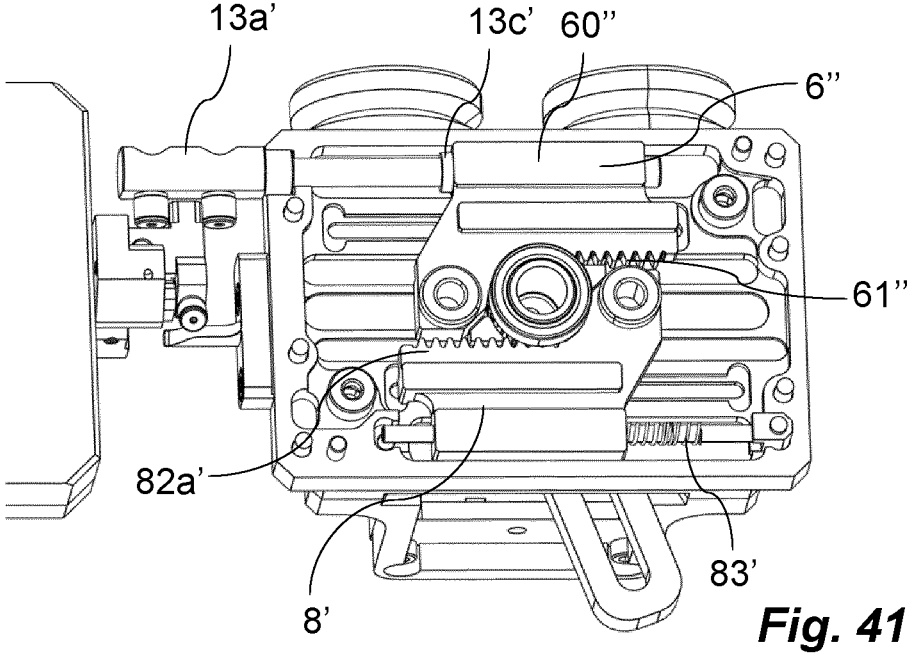
FIGS. 41-42 schematically show perspective views of the extending element of FIG. 37 on the base of FIG. 36 and the driver in another example.
Figure 42:
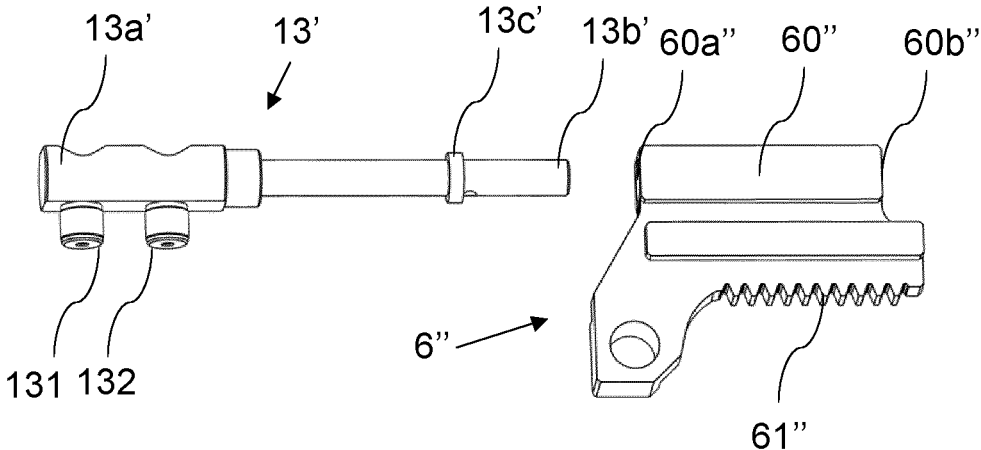

In this example, the driver 6'; 16; 26; 36 can be arranged between the first end and the second end of the extending element 13', as described above. Alternatively, the driver 6" can be arranged pushed and/or pulled by the extending element 13'. For example, as shown in FIGS. 41-42, the extending element 13' comprises a first end 13*a'* and a second end 13*b'*. In a preferred example, the driver body 60" of the driver 60" comprises a tubular section. The tubular section extends either between an open end 60*a"* and a closed end 60*b"*, or a first open end 60*a"* and a second open end 60*b"* in the direction of the X-axis. In this example, the first end 13*a'* of the extending element 13' is configured to be pushed and/or pulled by the actuator body 50''' as described above. The second end 13*b'* of the extending element 13' is situated within the tubular section of the driver body 60" through the open end/first open end 60*a"*. In one example, the extending element 13' comprises a flange 13*c'*. The flange 13*c'* is configured to abut the open end/first open end 60*a"* of the driver body 60". In one example where the driver 6" is designed to only be pushed by the extending element 13', the flange 13*c'* of the extending element 13' is configured to abut the open end/first open end 60*a"* in the direction of the X-axis with a surface facing towards the open end/first open end 60*a"* of the driver 6". In one example where the driver 6" is designed to be pushed and pulled by the extending element, the flange 13*c'* is immovable relative to the driver body 60" in the direction of the X-axis. In this example, the flange can be situate within a recess in a wall of the driver body 60", with the wall forming the tubular section of the driver body 60". In an example where the tubular section of the driver body comprises a closed end 60*b"*, the second end 13*b'* of the extending element 13' is configured to abut the closed end 60*b'* of the driver body 60", so that the extending element 13' can push the driver 6". In another example, the second end of the extending element is snap fitted into the tubular section of the driver body 60", so that the extending element can push and pull the driver 6". Furthermore, in one example where the driver body doesn't have a tubular section, the extending element is configured to push on the driver body directly for moving the driver. It should be noted that the example as shown in FIGS. 41-42 uses the driver 6" with the set of ratchet teeth 61" for explaining the interaction between the driver 6" and the extending element 13"; this described interaction is also applicable for those above-mentioned exemplified drivers 16; 26; 36.

In another example, the linear actuator 5; 5' and/or the base 4; 4' comprise one or more bearing wheels 46*a*, 46*b*. The bearing wheel is configured to ride on a platform usually situated on one or both side of the carriage guide rail (arranged in the direction of the Y-axis). The bearing wheel is configured to lift a part of the base or the linear actuator when the bearing wheel is on the platform. Thereby, if the linear actuator 5; 5' and/or the base 4; 4' bear a force applied in the direction of the Z-axis towards the first and/or second connector 3*a*, 3*b* (e.g. when carrying a heavy item, or when carrying an item that will be pressed by another assembling tool) the force will not pass to the carriage guide rail so that the damage of the carrier guide rail can be prevented.

The inventive concept has mainly been described above with reference to a few examples. However, as is readily appreciated by a person skilled in the art, other embodiments than the ones disclosed above are equally possible within the scope of the inventive concept, as defined by the appended claims.

Some aspects of the present disclosure are described in the clauses below.

1. A tool assembly for attaching to two carriages of a carriage guide rail system; wherein the two carriages are movable along the carriage guide rail relative to one another, the tool assembly comprising:
    a base and a linear actuator movable relative to the base;
    wherein the base comprises a first connector for attaching to one of the two carriages;
    wherein the linear actuator comprises a second connector for attaching to the other one of the two carriages;
    wherein the base comprises a first base portion attached to the first connector;
    wherein the first base portion is arranged between at least a part of the linear actuator and the two connectors in a direction perpendicular to the carriage guide rail.

2. The tool assembly as described in clause 1, wherein the first base portion is configured to carry an actuated assembly or a tool set; wherein the at least a part of the linear actuator is configured to act on the actuated assembly or the tool set; and wherein when one of the two carriages moves relative to the other one of the two carriages, the base moves relative to the linear actuator so that a rotational and/or translational motion of at least a part of the actuated assembly or the tool set relative to the carriage guide rail is initiated by the at least a part of the linear actuator.

3. The tool assembly as described in clause 1 or 2, wherein the linear actuator extends along a direction parallel to the carriage guide rail between a first end and a second end.

4. The tool assembly as described in clause 3, wherein the second end of the linear actuator is configured to act on the actuated assembly or the tool set when one of the two carriages moves relative to the other one of the two carriages.

5. The tool assembly as described in clause 3 or 4, wherein the first base portion comprises a slot extending in a direction parallel to the carriage guide rail and in a direction perpendicular to the carriage guide rail; wherein the linear actuator comprises a support attached to the first end of the linear actuator; and wherein the support of the linear actuator extends movably within the slot.

6. The tool assembly as described in any one of the preceding clauses, wherein at least a part of the linear actuator is adjacent to the first base portion.

7. The tool assembly as described in any one of the preceding clauses, wherein the linear actuator is spaced apart from the base.

8. The tool assembly as described in any one of the preceding clauses, wherein the base comprises a second base portion; wherein the second base portion is attached to the first base portion; and wherein the linear actuator is arranged between the first base portion and the second base portion.

9. The tool assembly as described in any one of preceding clauses, wherein the first connector comprises a central passage, a first portion, a second portion, a locking base and a locking controller; wherein the locking controller is pivotable relative to the central passage between a locked position and a unlocked position; wherein the locking base comprises a locking unit; wherein the locking controller comprises a locking frame enclosing the locking unit.

10. The tool assembly as described in any one of preceding clauses, wherein the second connector comprises a central passage, a first portion, a second portion, a locking base and a locking controller; wherein the locking controller is pivotable relative to the central passage between a locked position and an unlocked position; wherein the locking base comprises a locking unit; wherein the locking controller comprises a locking frame enclosing the locking unit.

11. The tool assembly as described in clause 9 or 10, wherein the least one of the base and the linear actuator comprises a connecting part; wherein the connecting part comprises a neck portion; and wherein the neck portion is adjacent a locking opening on the locking base.

12. The tool assembly as described in clause 11, wherein when the locking controller is in the unlocked position, the locking unit is spaced apart from the neck portion of the connecting part; and wherein when the locking controller in the locked position, the locking unit is engaged with the neck portion.

13. A system comprising the tool assembly as described in any one of the preceding clauses, wherein the system comprises an actuated assembly; and wherein the actuated assembly comprises a driven member engaged with a driver.

14. The system as described in clause 13, wherein the actuated assembly is arranged on the base and is configured to be actuated by the linear actuator when the linear actuator moves relative to the base in the direction of a transfer path defined by the carriage guide rail.

15. The system as described in clause 13 or 14 dependent on any one of clauses 3-6 or clauses 8-12, wherein the driver is attached to the second end of the linear actuator.

16. The system as described in clause 13 or 14 dependent on any one of clauses 3-5 or clauses 7-12, wherein the actuated assembly comprises an extending element; wherein the extending element extends along the direction parallel to the carriage guide rail between a first end and a second end; and wherein the extending element comprises the driver arranged between the first end and the second end.

17. The system as described in clause 13 or 14 dependent on any one of clauses 3-5 or clauses 7-12, wherein the actuated assembly comprises an extending element; wherein the extending element extends along the direction parallel to the carriage guide rail between a first end and a second end; and wherein the extending element is connected to the driver in the direction of the transfer path defined by the carriage guide rail.

18. The system as described in clause 16 or 17, wherein the extending element is configured to be releasably attached to the linear actuator.

19. The system as described in clause 18, wherein the extending element is configured to be pushed or pulled by an actuator body of the linear actuator when the linear actuator is attached to the extending element and the linear actuator moves relative to the base.

20. The system as described in any of clauses 17-19, wherein at least one of the first end or the second end of the extending element comprises a first transverse protrusion and a second transverse protrusion.

21. The system as described in clause 20, wherein the first transverse protrusion comprises a wheel rotatable around a central axis of the first transverse protrusion; and wherein the second transverse protrusion comprises a wheel rotatable around a central axis of the first transverse protrusion.

22. The system as described in clause 19, or any of clauses 20-21 when dependent on clause 19, wherein the actuator body comprises a first counter transverse protrusion; wherein the first counter transverse protrusion is configured to be situated between the first transverse protrusion and the second transverse protrusion in the direction of a transfer path defined by the carriage guide rail.

23. The system as described in clause 22, wherein the base comprises the guide arm; and wherein the actuator body comprises a guide protrusion that is configured to move along the guide arm when the linear actuator moves towards the base.

24. The system as described in clause 22 or 23, where the first counter transverse protrusion comprises at least one of a first inclined surface angled relative to a plane parallel to the transfer path defined by the carriage guide rail and a direction perpendicular to the plane parallel to the transfer path defined by the carriage guide rail and facing towards the base; and a second inclined surface angled relative to the transfer path defined by the carriage guide rail and the a direction perpendicular to the plane parallel to the transfer path defined by the carriage guide rail and facing towards the linear actuator.

25. The system as described in any of clauses 15-24, wherein the actuated assembly comprises a rotator attached to the first base portion; wherein the rotator comprises a circular body; and wherein the driven member is arranged on an outer surface portion of the circular body; wherein the outer surface portion is spaced apart from a rotation axis that the rotator is configured to rotate around.

26. The system as described in clause 25, wherein the driven member is a cam, and wherein the cam radially extends from the outer surface portion of the circular body.

27. The system as described in clause 25, wherein the driven member is a protrusion protruding from the outer surface portion of the circular body.

28. The system as described in clause 25, wherein the driven member comprises a cogwheel; and wherein the driver comprises a set of ratchet teeth meshed with the cogwheel.

29. The system as described in clause 25 to 28, wherein the actuated assembly comprises a linear actuator follower; wherein the rotator comprises a transmission member; wherein the linear actuator follower comprises a counter transmission member; and wherein the transmission member is engaged with the counter transmission member.

30. The system as described in a combination of clause 29 and clause 14, wherein the transmission member is a plurality of ratchet teeth; wherein the cogwheel is the transmission member; wherein the plurality of ratchet teeth is meshed with the cogwheel.

31. The system as described in clause 29, wherein the rotator is arranged between the set of ratchet teeth of the driver and the plurality of ratchet teeth of the linear actuator follower.

32. The system as described in clause 29 or 31, wherein the linear actuator follower extends along the direction parallel to the carriage guide rail between a first end and a second end; wherein the linear actuator follower is movably attached to the first base portion in the direction parallel to the carriage guide rail; and wherein the plurality of ratchet teeth is attached to the second end of the linear actuator follower.

33. The system as described in any one of clauses 13-32, wherein the actuated assembly comprises: a first gripper with a first gripper surface; a second gripper with a second gripper surface faced towards the first gripper surface; wherein the second gripper is configured to protrude from the base in a direction perpendicular to the carriage guide rail; and wherein the first gripper surface is movable relative to the second gripper surface along the direction parallel to the carriage guide rail.

34. The system as described in clause 33, wherein the first gripper is fixedly attached to the linear actuator.

35. The system as described in the combination of clause 33 and any one of clauses wherein the first gripper is fixedly attached to the base.

36. The system as described in any one of clauses 33-33, wherein the second gripper is fixedly attached to the base.

37. The system as described in any one of clauses 34-36, dependent on clause 17, wherein the second gripper is attached to the linear actuator follower.

38. The system as described in any of clauses 14-24, wherein the actuated assembly comprises an elevating member extending along a direction perpendicular to the carriage guide rail between a first end and a second end.

39. The system as described in clause 38, wherein the elevating member is the driven member.

40. The system as described in clause 39, wherein the second end of the elevating member is closer to the second end of the linear actuator than the first end of the elevating member; and wherein the driven member is on the second end of the elevating member.

41. The system as described in any one of clauses 38-40, wherein at least one of the driver and the driven member comprises an inclined surface extending in the direction parallel to the carriage guide rail and the direction perpendicular to the carriage guide rail between a first end and a second end; and wherein the second end is offset relative to the first end both in the direction parallel to the carriage guide rail and the direction perpendicular to the carriage guide rail.

42. The system as described in any one of clauses 38-40, wherein at least one of the driver and the driven member comprises a cam surface.

43. The system as described in any one of clauses 40-42, wherein one of the driver and the driven member comprises a guide track; wherein the inclined surface forms a part of the guide track; and wherein the driven member is attached to the second end of the elevating member, and wherein the driven member is positioned in the guide track.

44. The system as described in any one of clauses 13-43 dependent on clause 8, wherein the second base portion comprises a base opening and wherein at least a part of the actuated assembly is arranged between the first base portion and the second base portion.

45. The system as described in any one of clauses 25-32, dependent on clause 8, wherein the circular body of the rotator comprises a central shaft, wherein the central shaft comprises a protruding end protruding through the opening of the second base portion; and wherein a spinner is attached to the protruding end of the circular body.

46. The system as described in clause 44, dependent on any one of clauses 38-43, wherein the elevating member is arranged between the first base portion and the second base portion; wherein the first end of the elevating member protrudes through the opening of the second base portion; and whereby the elevating member is immovable relative to the base in a direction parallel to the carriage guide rail.

47. The system as described in clause 44 when dependent on any one of clauses 38-43, wherein the second base portion comprises a block; and wherein the first end of the elevating member is adjacent to the block, whereby the elevating member is immovable relative to the base in a direction parallel to the carriage guide rail.

48. A carriage guide rail system comprising the tool assembly as described in any one of the clauses 1-12; wherein the carriage guide rail system comprises a carriage guide rail extending along an X-axis;

a first carriage and a second carriage;

wherein the first carriage is movable relative to the second carriage along the X-axis on the carriage guide rail; and wherein the first connector is only attached to the first carriage, and the second connector is only attached to the second carriage.

49. A carriage guide rail system comprising the system as described in any one of clauses 13-47; wherein the carriage guide rail system comprises a carriage guide rail extending along an X-axis;

a first carriage and a second carriage;

wherein the first carriage is movable relative to the second carriage along the X-axis on the carriage guide rail; and wherein the first connector is only attached to the first carriage, and the second connector is only attached to the second carriage.

50. A method of operating the tool assembly as described in any one of the preceding clauses, the method comprising the steps of:

attaching the first connector to one of the two carriages of the carriage guide rail system;

attaching the second connector to the other one of the two carriages of the carriage guide rail system;

moving the two carriages along the carriage guide rail relative to one another; and carrying out one or more rotational and/or translational motions of the actuated assembly or the tool set relative to the carriage guide rail, in response to the movement between the two carriages along the carriage guide rail, by a contact between the at least a part of the linear actuator and the actuated assembly or the tool set.

The invention claimed is:

1. A tool assembly for attaching to two carriages of a carriage guide rail system; wherein the two carriages are movable along the carriage guide rail relative to one another, the tool assembly comprising:

a base; and a linear actuator movable relative to the base;

wherein the base comprises a first connector for attaching to one of the two carriages;

wherein the linear actuator comprises a second connector for attaching to the other one of the two carriages;

wherein the base comprises a first base portion attached to the first connector;

wherein one of the first connector and the second connector comprises a central passage, a first portion, a second portion, a locking base and a locking controller;

wherein the locking controller is pivotable relative to the central passage between a locked position and an unlocked position.

2. The tool assembly as claimed in claim 1, wherein the first base portion is arranged between at least a part of the linear actuator and the two connectors in a direction perpendicular to the carriage guide rail.

3. The tool assembly as claimed in claim 1, wherein the first base portion is closer to the two connectors than at least a part of the linear actuator in a direction perpendicular to the carriage guide rail.

4. The tool assembly as claimed in claim 1, wherein the first base portion is configured to carry an actuated assembly or a tool set; wherein the at least a part of the linear actuator is configured to act on the actuated assembly or the tool set; and wherein when one of the two carriages moves relative to the other one of the two carriages, the base moves relative to the linear actuator so that a rotational and/or translational motion of at least a part of the actuated assembly or the tool set relative to the carriage guide rail is initiated by the at least a part of the linear actuator.

5. The tool assembly as claimed in claim 1, wherein the linear actuator extends along a direction parallel to the carriage guide rail between a first end and a second end; and wherein the second end of the linear actuator is configured to act on the actuated assembly or a tool set when one of the two carriages moves relative to the other one of the two carriages.

6. The tool assembly as claimed in claim 1, wherein the locking base comprises a locking unit; and wherein the locking controller comprises a locking frame enclosing the locking unit.

7. The tool assembly as claimed in claim 6, wherein the least one of the base and the linear actuator comprises a connecting part; wherein the connecting part comprises a neck portion; and wherein the neck portion is adjacent a locking opening on the locking base.

8. The tool assembly as claimed in claim 7, wherein when the locking controller is in the unlocked position, the locking unit is spaced apart from the neck portion of the connecting part; and wherein when the locking controller in the locked position, the locking unit is engaged with the neck portion.

9. A system comprising the tool assembly as claimed in claim 1, wherein the system comprises an actuated assembly; wherein the actuated assembly comprises a driven member engaged with a driver.

10. The system as claimed in claim 9, wherein the driver is attached to the second end of the linear actuator.

11. The system as claimed in claim 9, wherein the actuated assembly comprises an extending element; wherein the extending element extends along the direction parallel to the carriage guide rail between a first end and a second end; and wherein the driver is arranged between the first end and the second end of the extending element.

12. The system as claimed in claim 11, wherein the extending element is configured to releasably attach to the linear actuator.

13. The system as claimed in claim 11, wherein at least one of the first end or the second end of the extending element comprises a first transverse protrusion and a second transverse protrusion.

14. The system as claimed in claim 11, wherein the actuator body comprises a first counter transverse protrusion; wherein the first counter transverse protrusion is configured to situate between the first transverse protrusion and the second transverse protrusion in the direction of a transfer path defined by the carriage guide rail.

15. The system as claimed in claim 11, wherein the base comprises the guide arm; and wherein the actuator body comprises a guide protrusion is configured to move along the guide arm when the linear actuator moves towards the base.

16. The system as claimed in claim 9, wherein the actuated assembly comprises an extending element; wherein the extending element extends along the direction parallel to the carriage guide rail between a first end and a second end; and wherein the extending element is connected to the driver in the direction of the transfer path defined by the carriage guide rail.

17. A carriage guide rail system comprising the tool assembly as claimed in claim 1; wherein the carriage guide rail system comprises a carriage guide rail extending along an X-axis;

a first carriage and a second carriage;

wherein the first carriage is movable relative to the second carriage along the X-axis on the carriage guide rail; and wherein the first connector is only attached to the first carriage, and the second connector is only attached to the second carriage.

18. A tool assembly for attaching to two carriages of a carriage guide rail system, where the two carriages are movable along the carriage guide rail relative to one another, the tool assembly comprising:

a base; and a linear actuator movable relative to the base, wherein the base comprises a first connector for attaching to one of the two carriages, wherein the linear actuator comprises a second connector for attaching to the other one of the two carriages, wherein the base further comprises a first base portion attached to the first connector, wherein one of the first connector and the second connector comprises a central passage, a first portion, a second portion, a locking base and a locking controller, wherein the locking controller is pivotable relative to the central passage between a locked position and an unlocked position, and wherein the linear actuator extends along a direction parallel to the carriage guide rail between a first end and a second end.

19. The tool assembly as claimed in claim 18, wherein the locking base comprises a locking unit and the locking controller comprises a locking frame enclosing the locking unit and wherein the least one of the base and the linear actuator comprises a connecting part comprising a neck portion adjacent a locking opening on the locking base.

\* \* \* \* \*